April 13, 1954    B. A. WITTKUHNS ET AL    2,674,929
MACHINE FOR PREPARING PAPER CONTAINER BLANKS
Filed April 6, 1949      26 Sheets-Sheet 2

INVENTORS
BRUNO A. WITTKUHNS
BY H. GEORGE D. NUTTING
GILBERT F. HILL

Austin, Wilhelm & Carlson
ATTORNEYS.

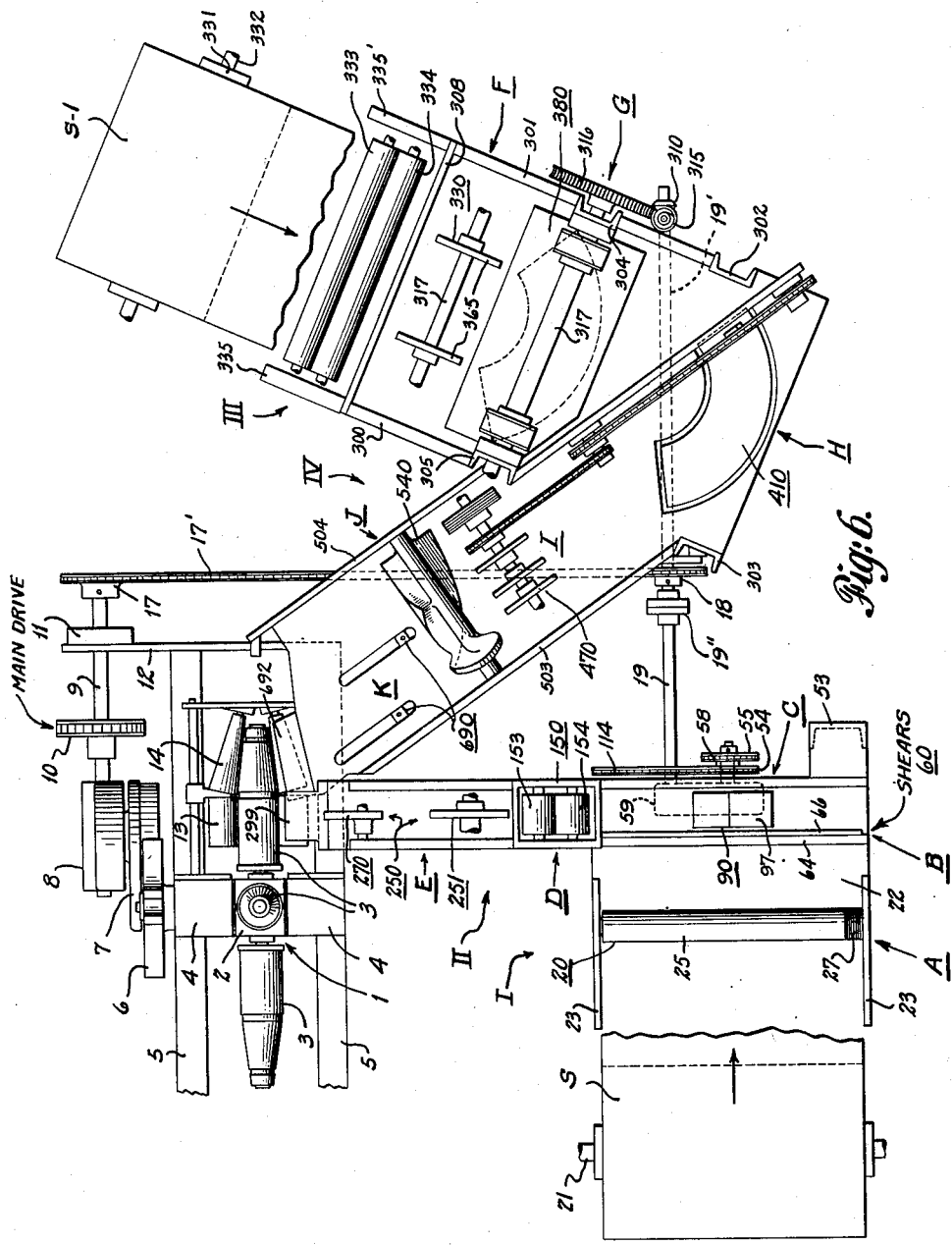

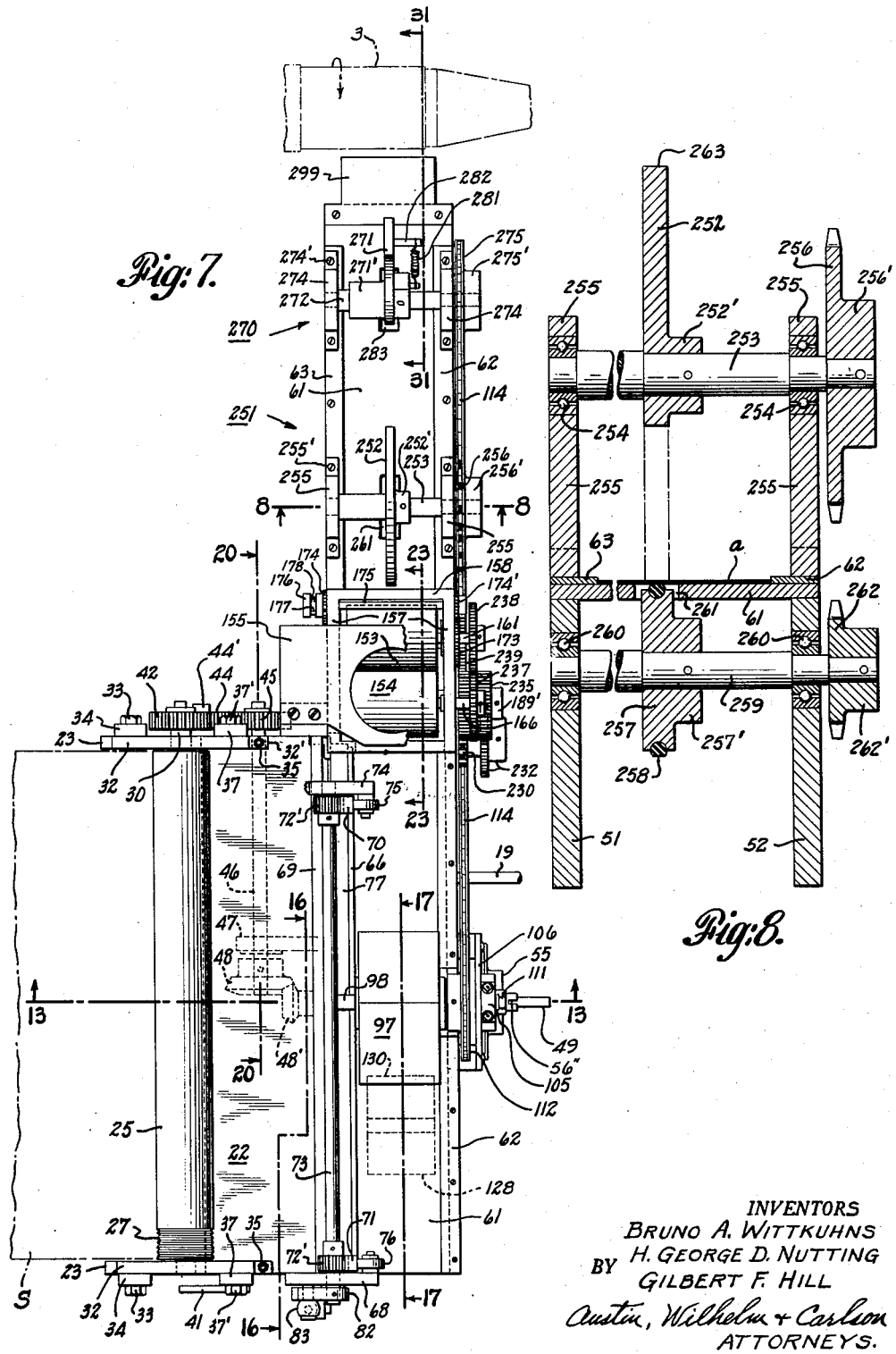

April 13, 1954  B. A. WITTKUHNS ET AL  2,674,929
MACHINE FOR PREPARING PAPER CONTAINER BLANKS
Filed April 6, 1949  26 Sheets-Sheet 5
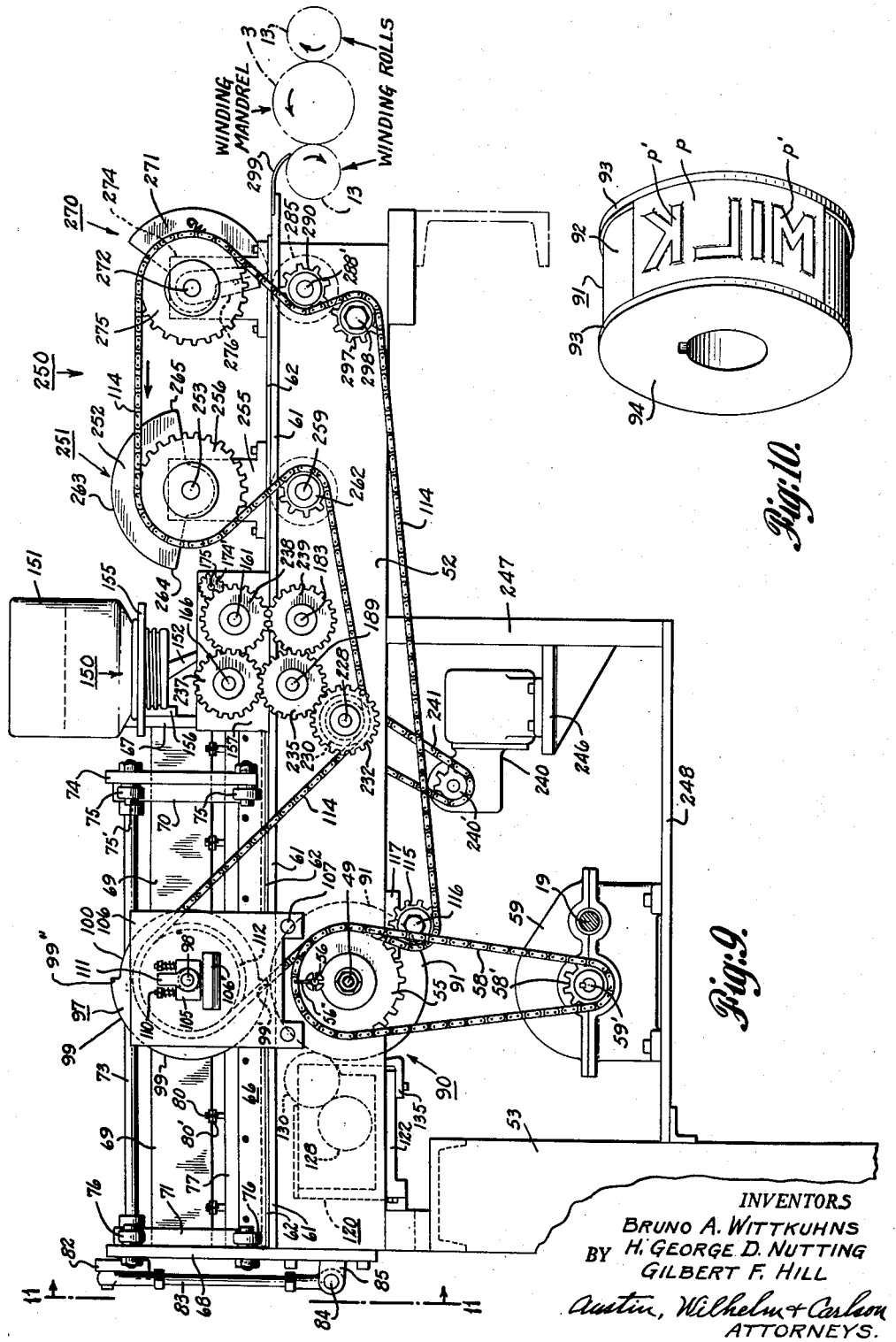
INVENTORS
BRUNO A. WITTKUHNS
BY H. GEORGE D. NUTTING
GILBERT F. HILL
Austin, Wilhelm + Carlson
ATTORNEYS.

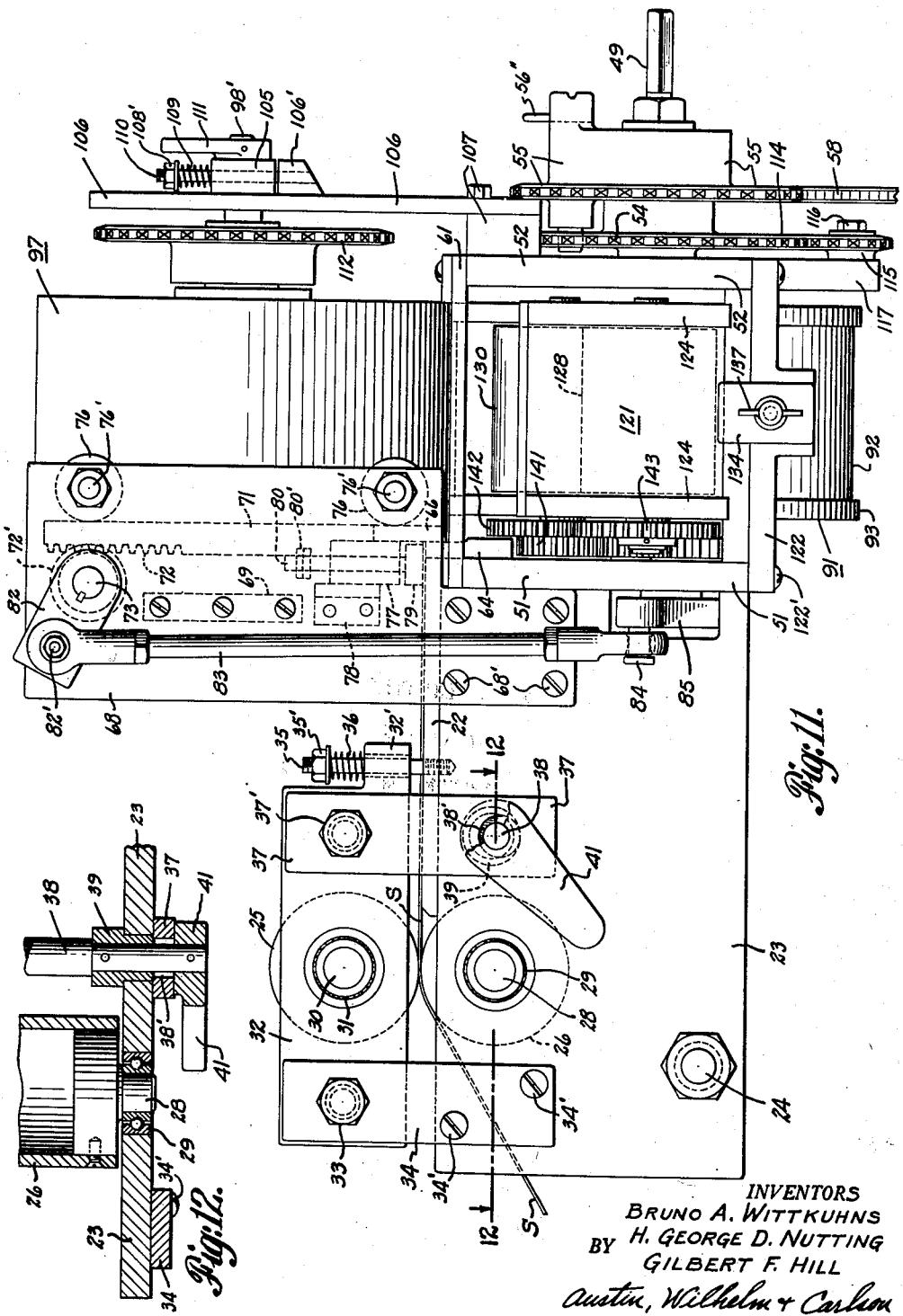

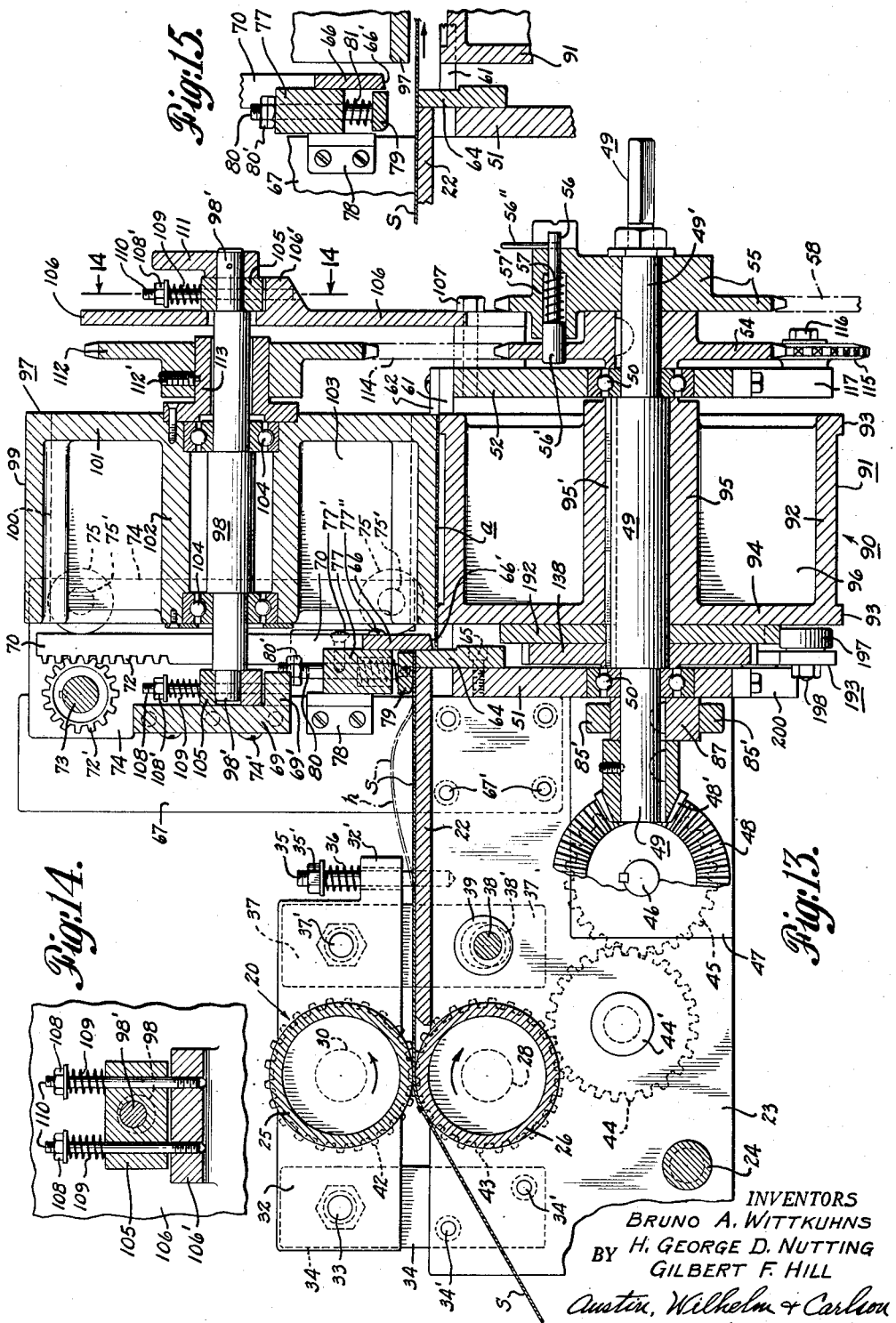

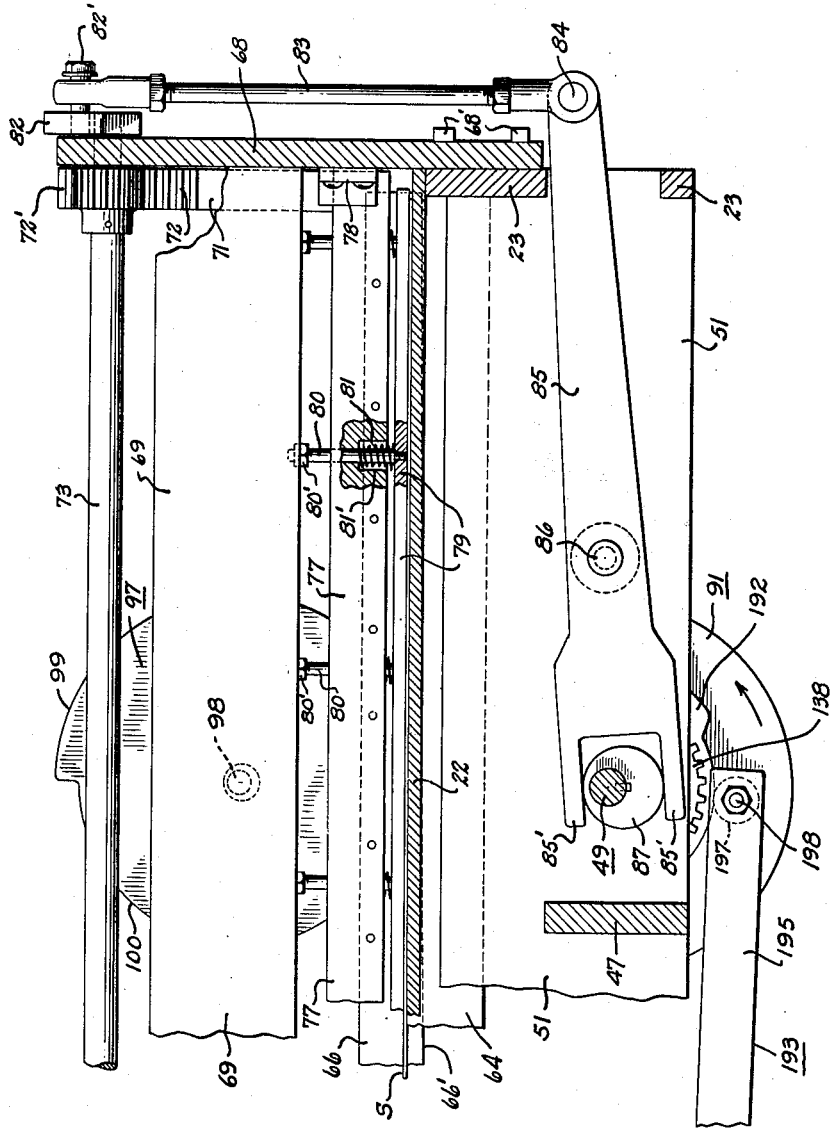

April 13, 1954  B. A. WITTKUHNS ET AL  2,674,929
MACHINE FOR PREPARING PAPER CONTAINER BLANKS
Filed April 6, 1949  26 Sheets-Sheet 9
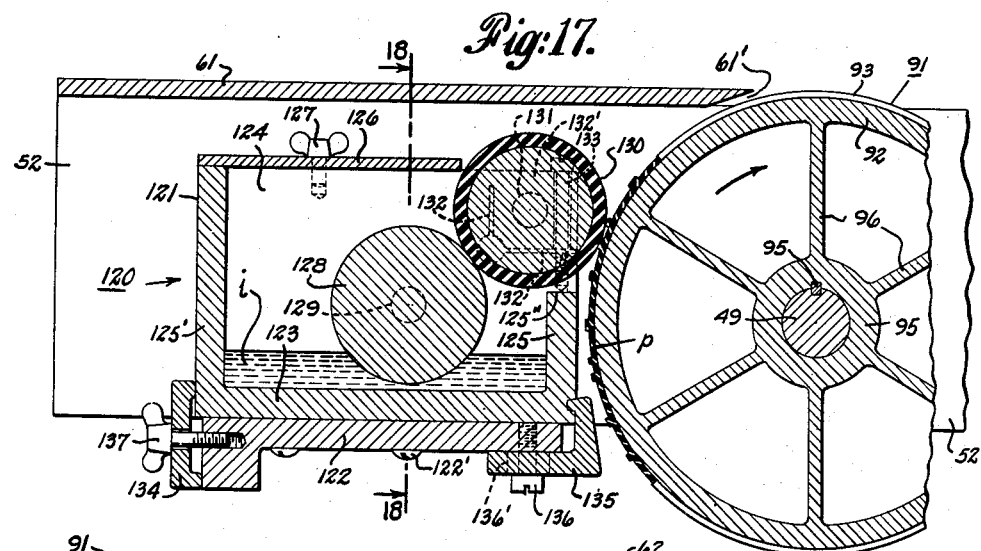
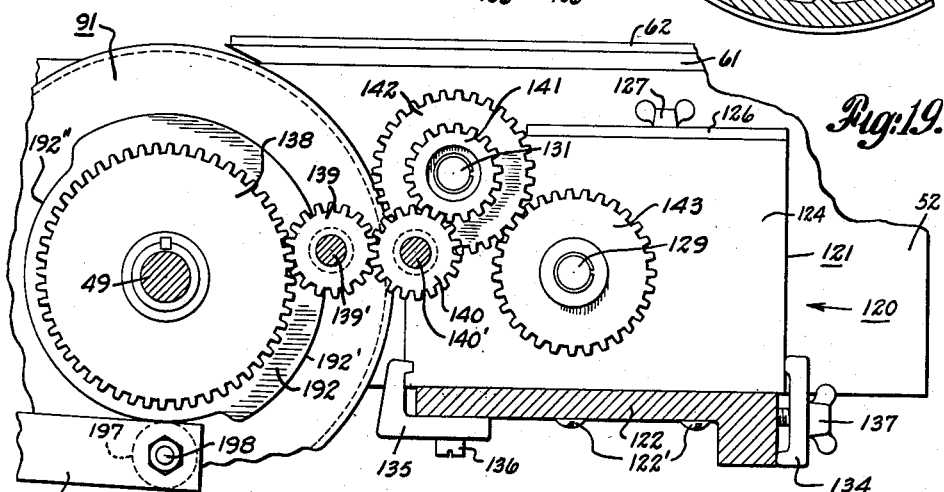
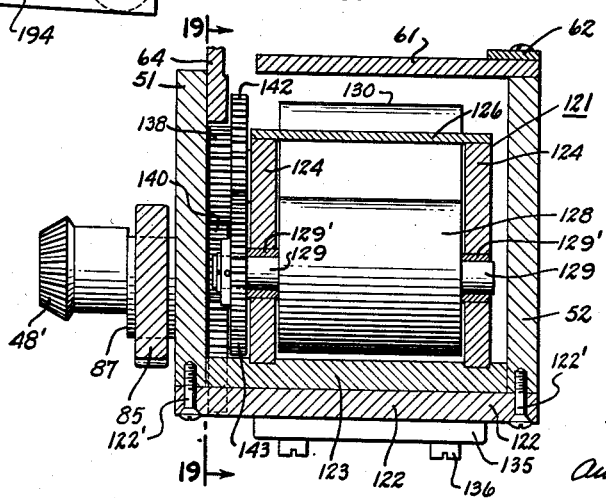
INVENTORS
BRUNO A. WITTKUHNS
H. GEORGE D. NUTTING
GILBERT F. HILL
BY Austin, Wilhelm + Carlson
ATTORNEYS.

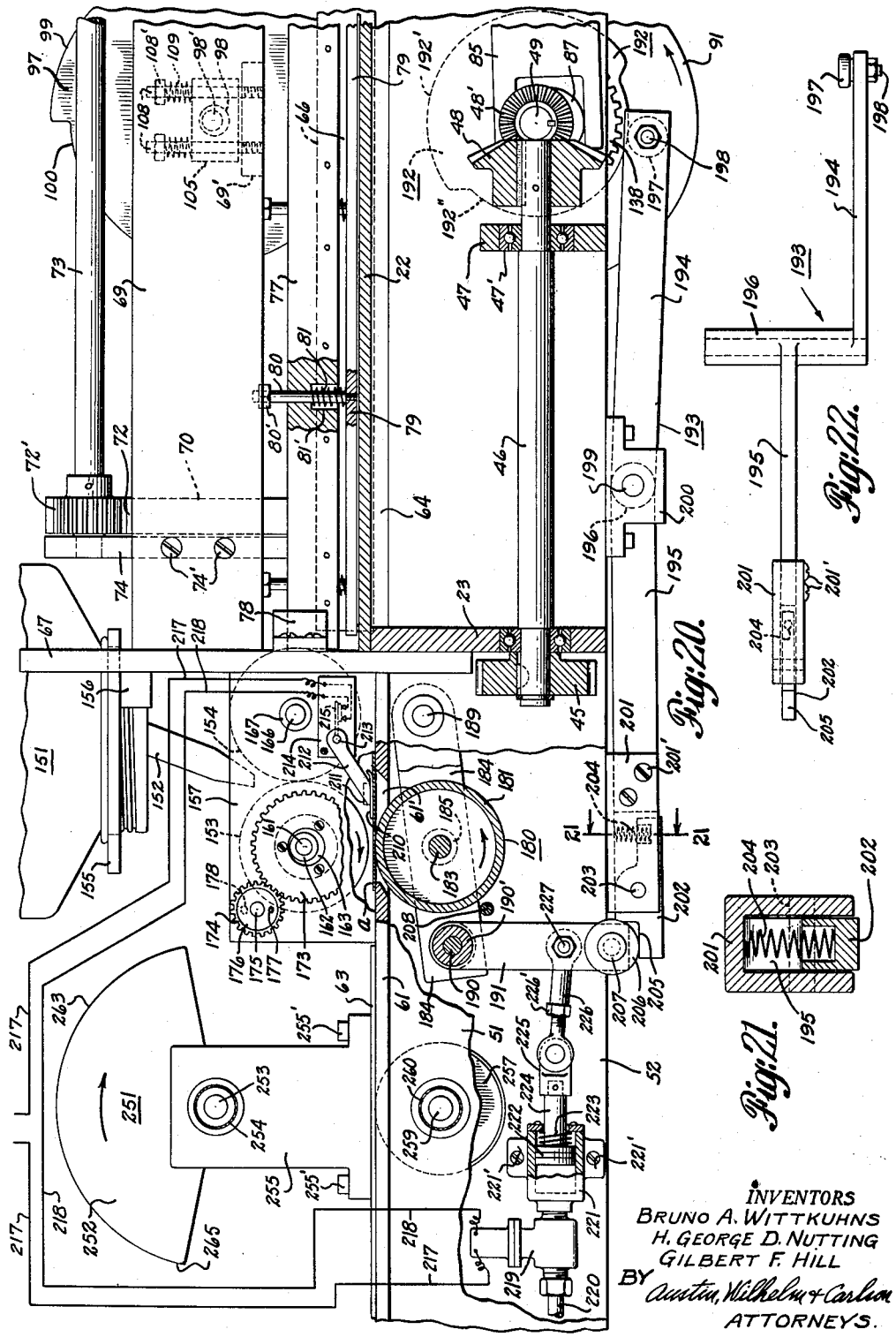

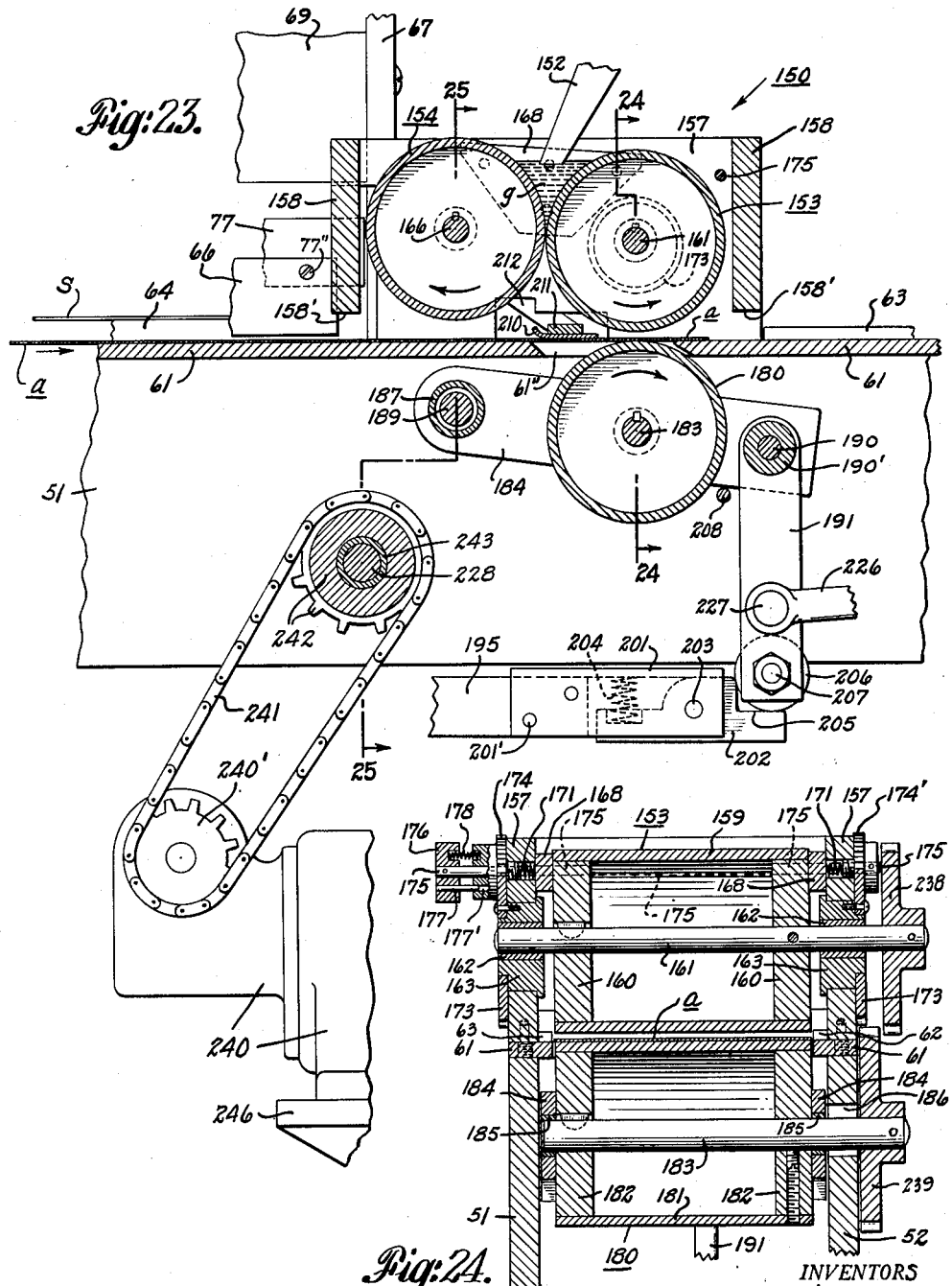

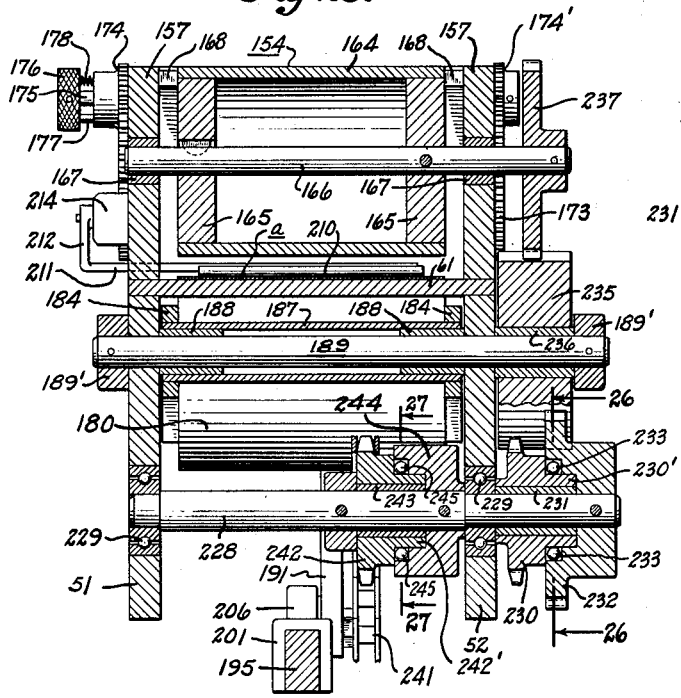
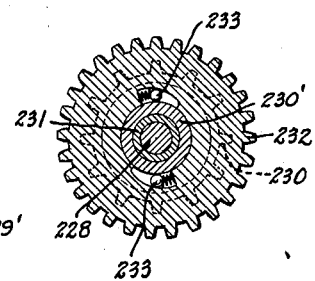
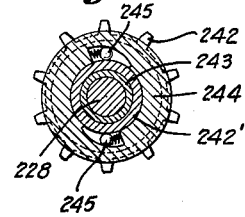
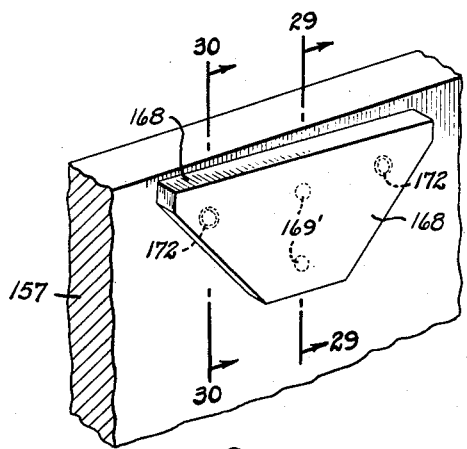
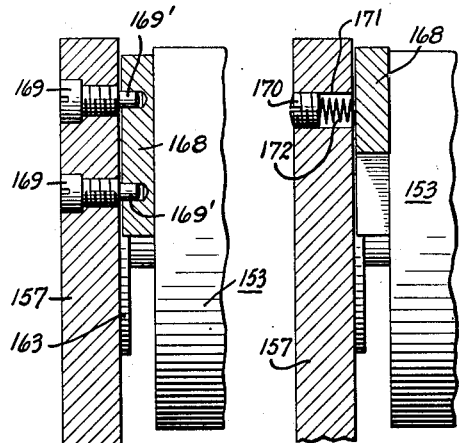

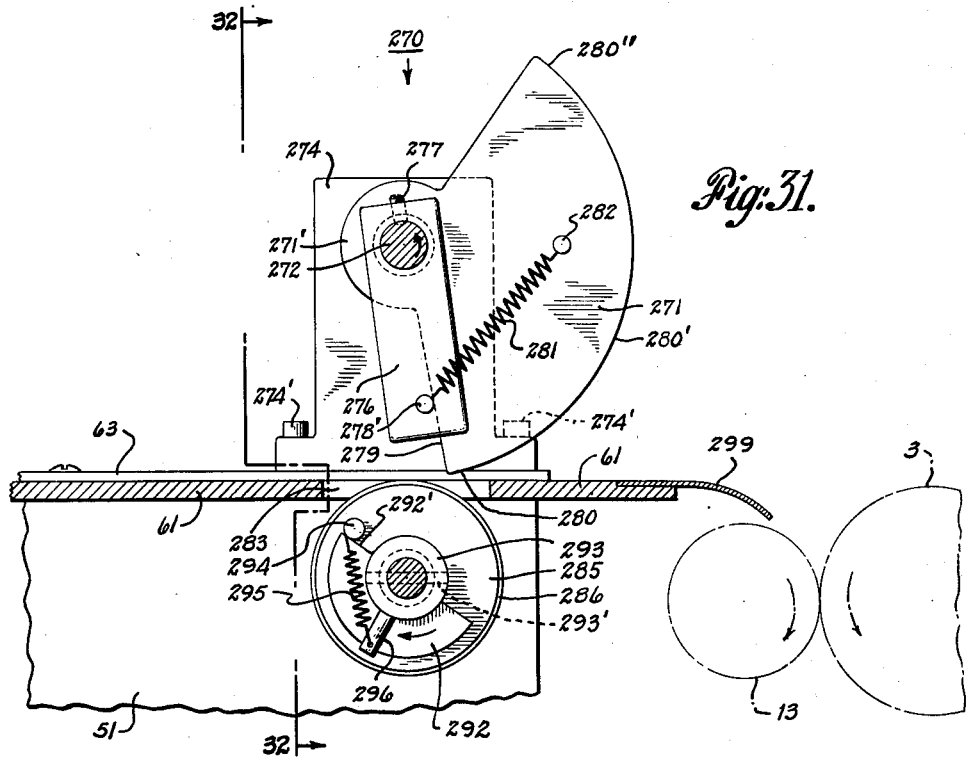
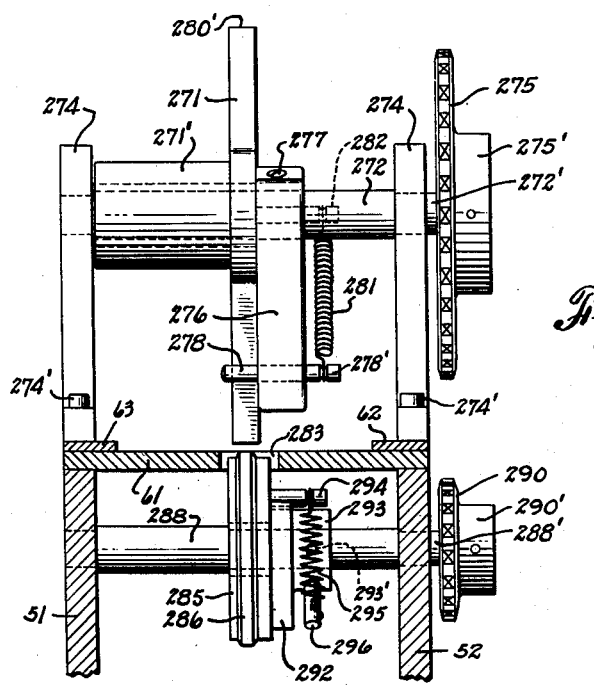

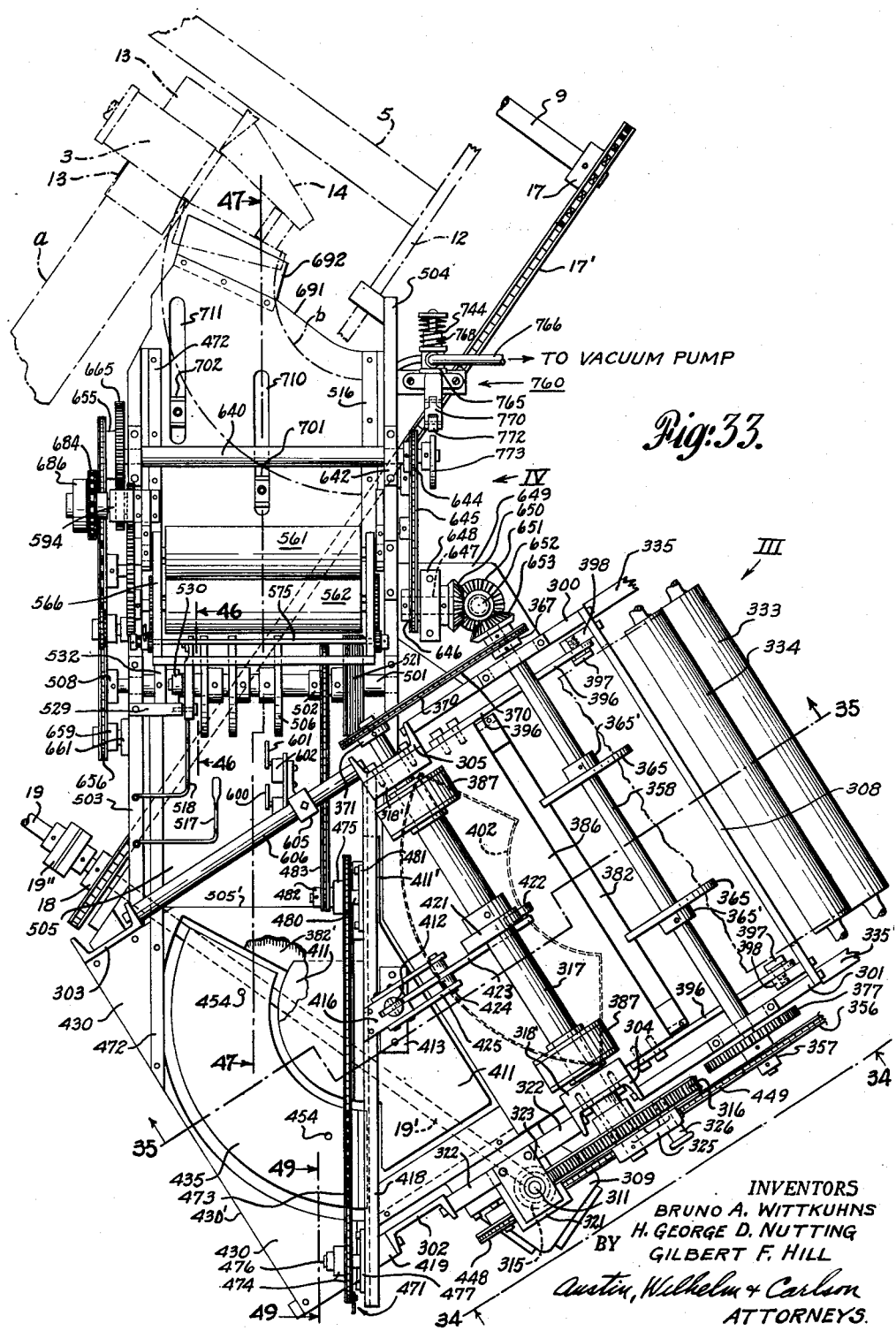

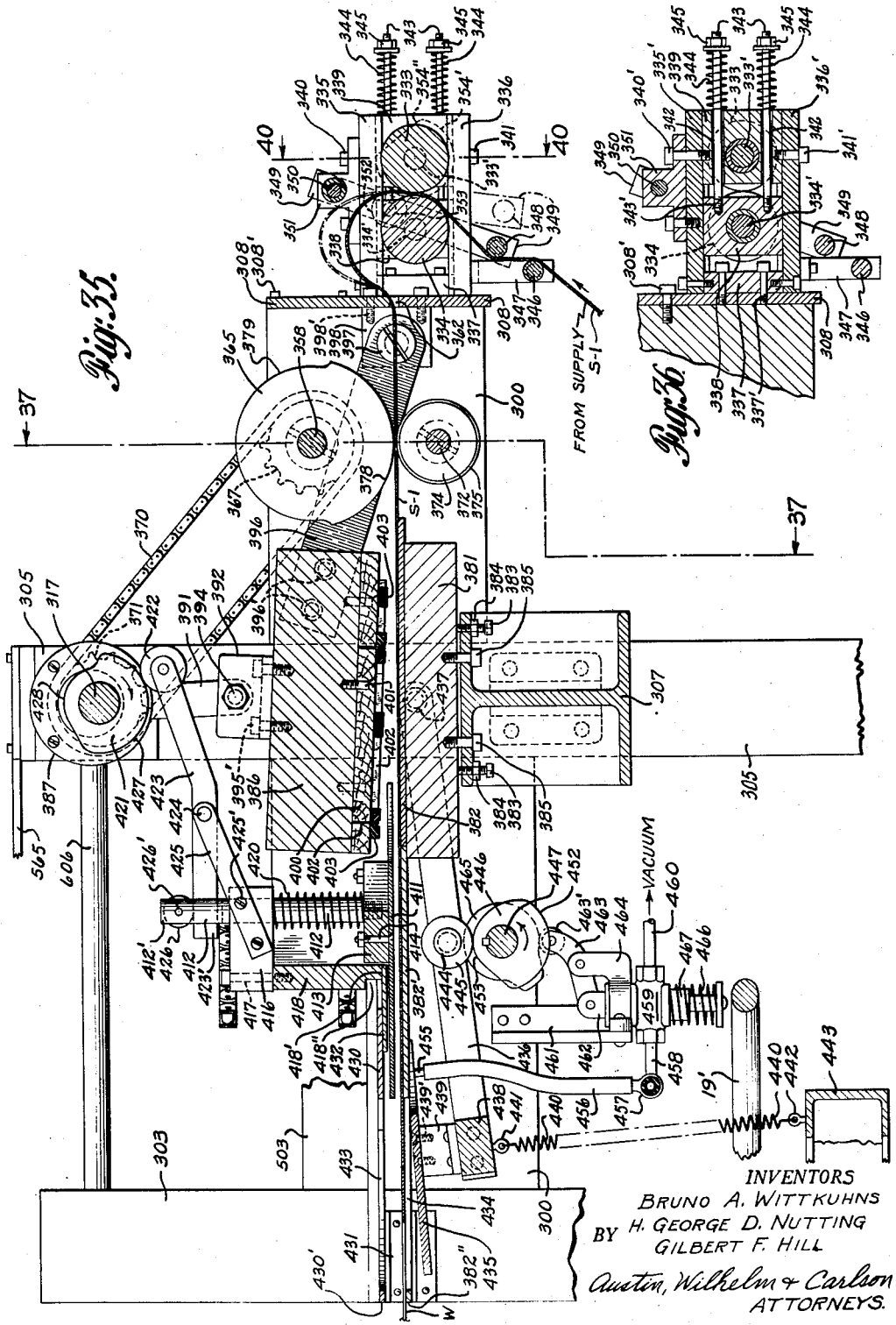

April 13, 1954    B. A. WITTKUHNS ET AL    2,674,929
MACHINE FOR PREPARING PAPER CONTAINER BLANKS
Filed April 6, 1949    26 Sheets-Sheet 17
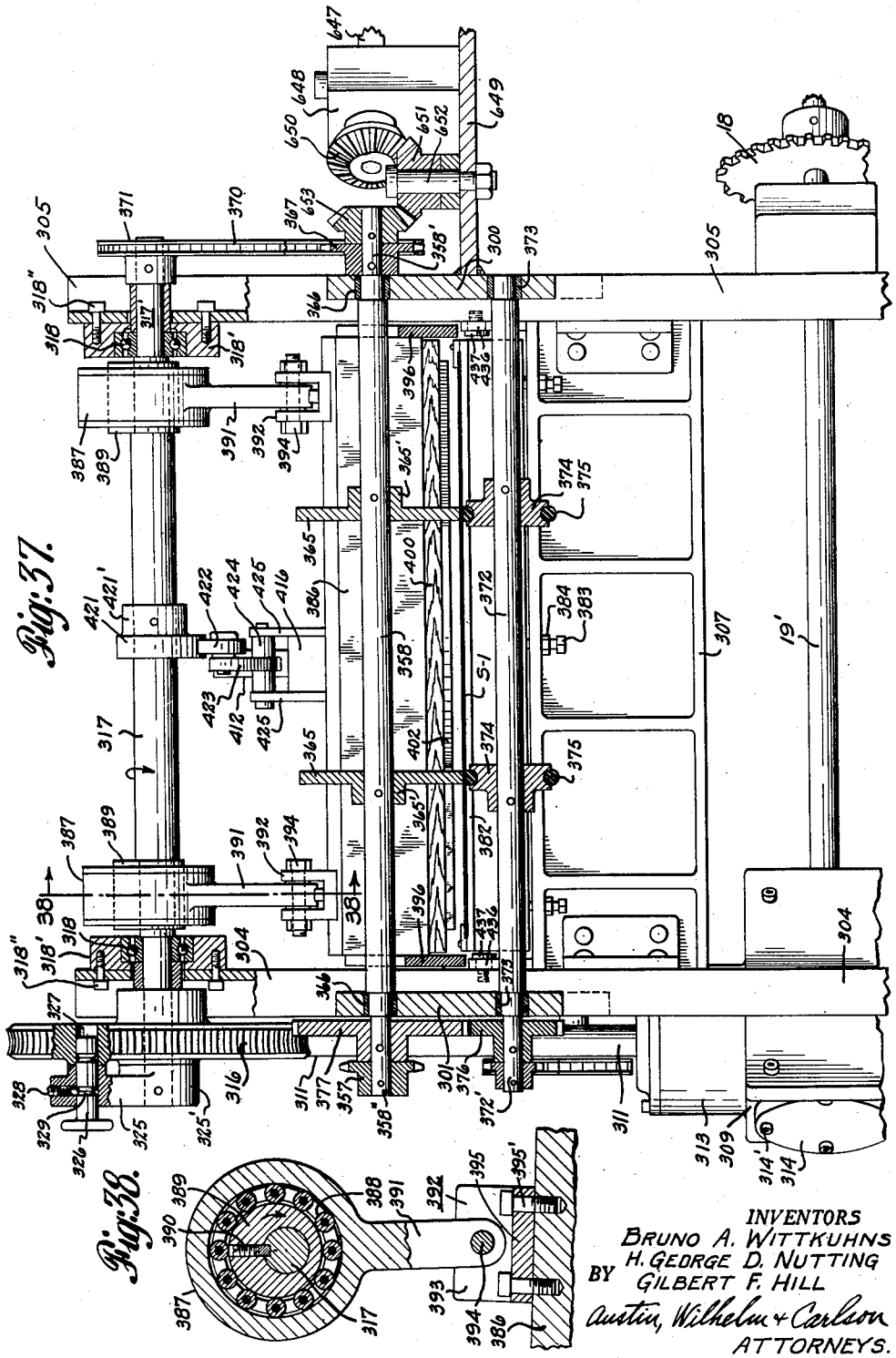
INVENTORS
BRUNO A. WITTKUHNS
H. GEORGE D. NUTTING
GILBERT F. HILL
BY
Austin, Wilhelm + Carlson
ATTORNEYS.

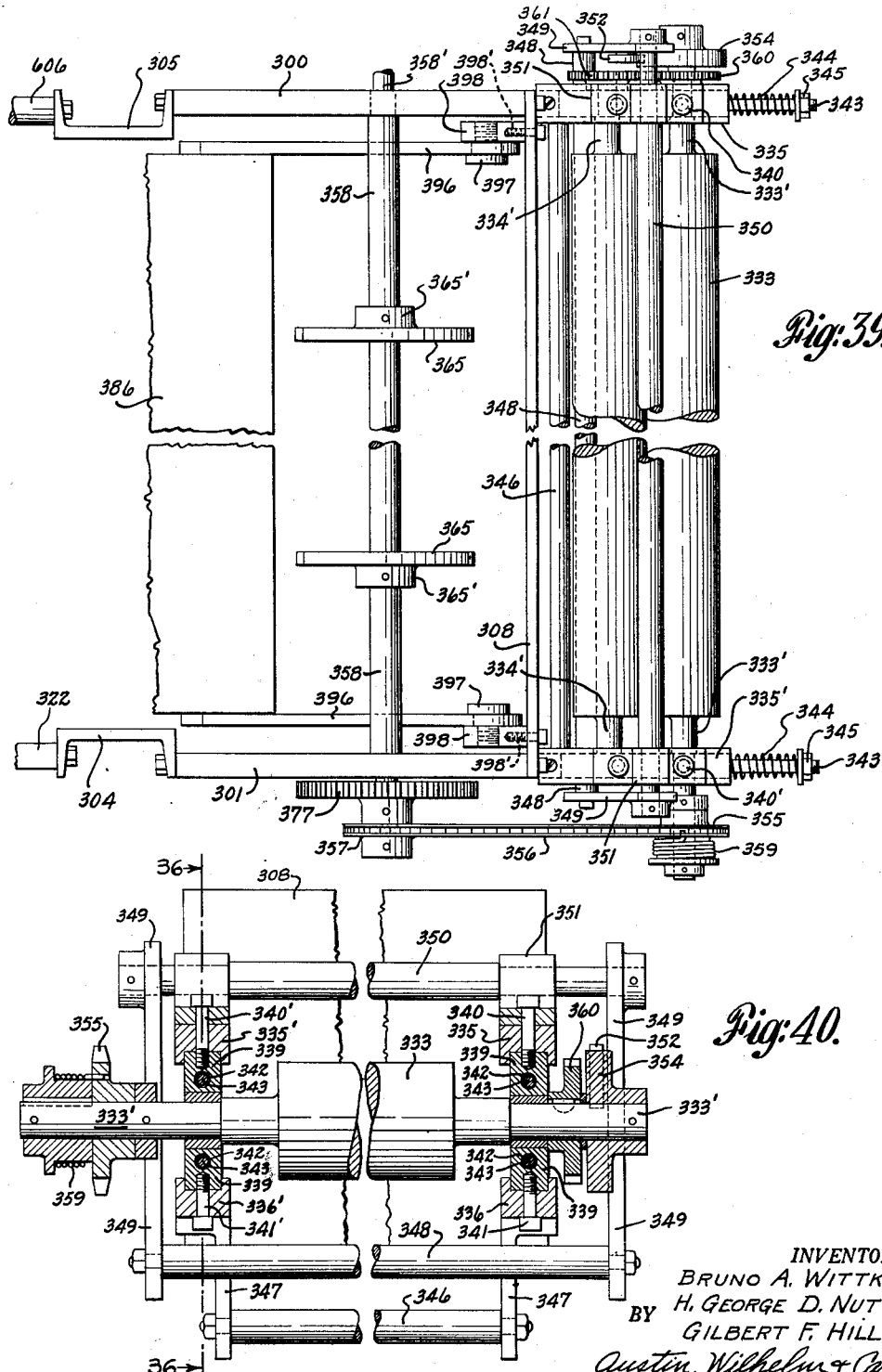

April 13, 1954   B. A. WITTKUHNS ET AL   2,674,929
MACHINE FOR PREPARING PAPER CONTAINER BLANKS
Filed April 6, 1949   26 Sheets-Sheet 19
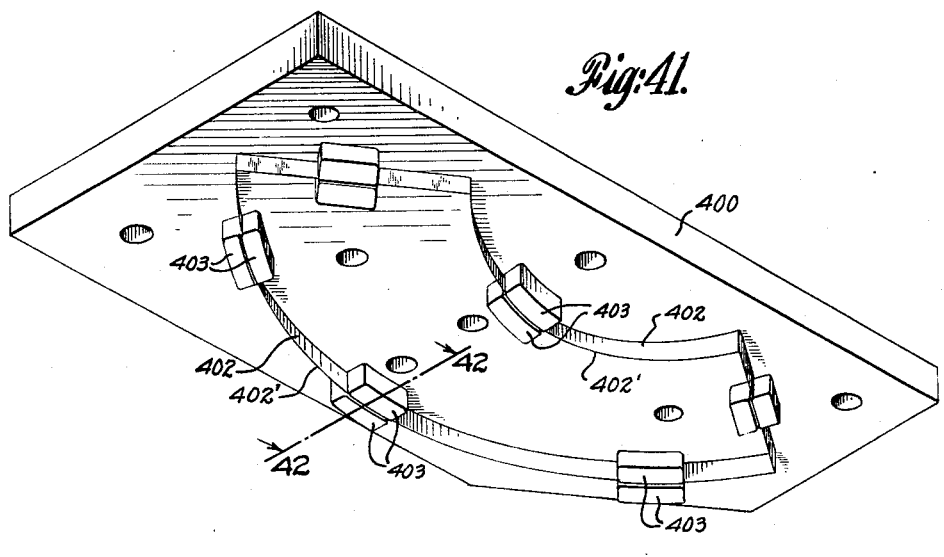
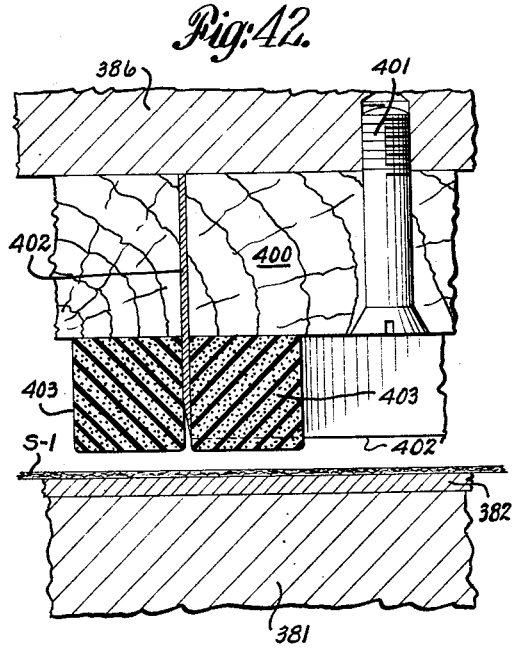
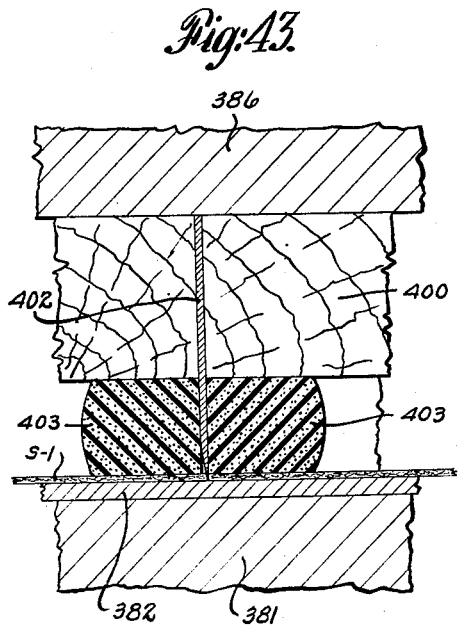
INVENTORS
BRUNO A. WITTKUHNS
H. GEORGE D. NUTTING
GILBERT F. HILL
BY Austin, Wilhelm & Carlson
ATTORNEYS April 13, 1954    B. A. WITTKUHNS ET AL    2,674,929
MACHINE FOR PREPARING PAPER CONTAINER BLANKS
Filed April 6, 1949    26 Sheets-Sheet 20
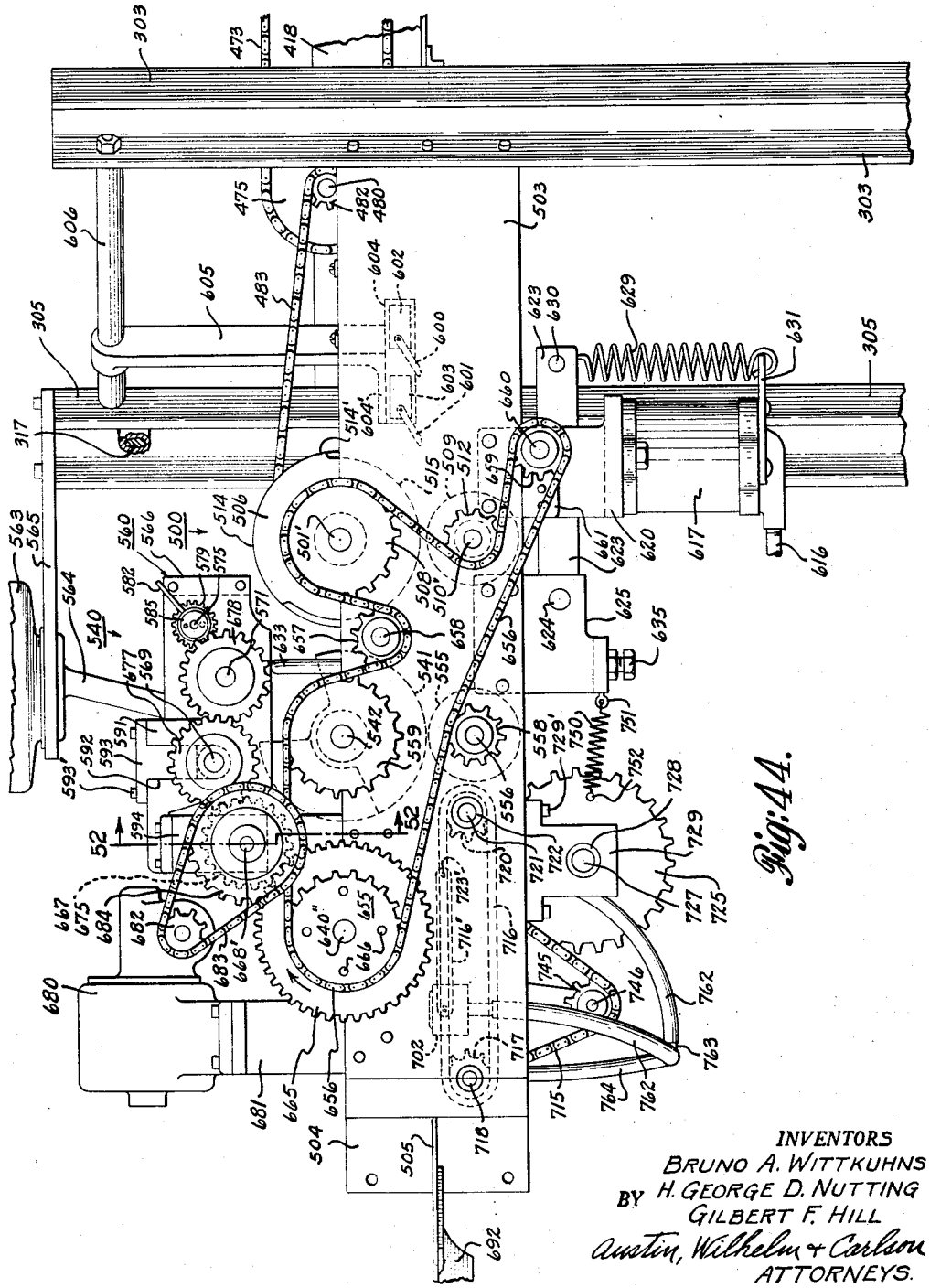
INVENTORS
BRUNO A. WITTKUHNS
BY H. GEORGE D. NUTTING
GILBERT F. HILL
Austin, Wilhelm + Carlson
ATTORNEYS.

April 13, 1954   B. A. WITTKUHNS ET AL   2,674,929
MACHINE FOR PREPARING PAPER CONTAINER BLANKS
Filed April 6, 1949   26 Sheets-Sheet 21
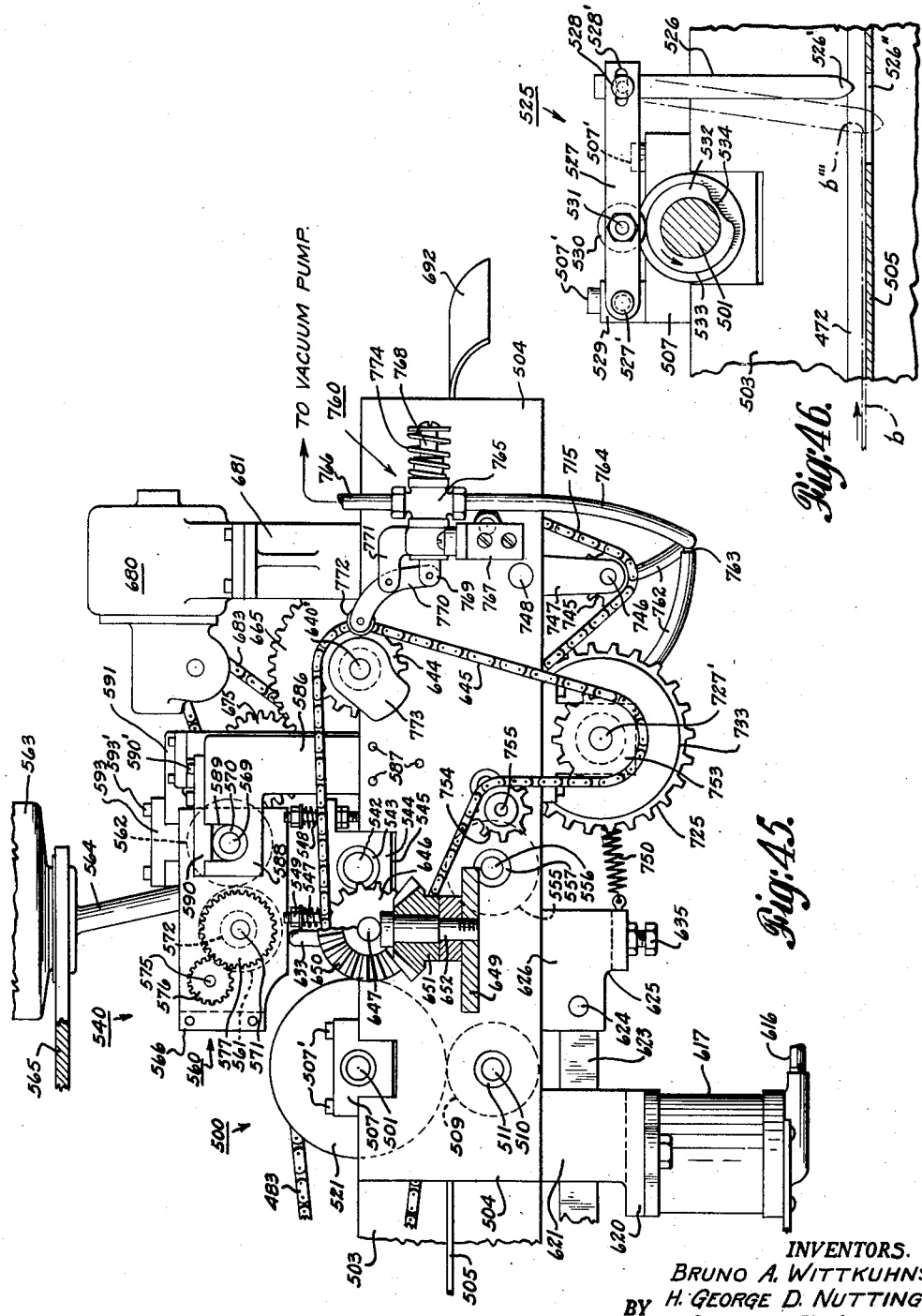
INVENTORS.
BRUNO A. WITTKUHNS
BY H. GEORGE D. NUTTING
GILBERT F. HILL
Austin, Wilhelm & Carlson
ATTORNEYS.

April 13, 1954   B. A. WITTKUHNS ET AL   2,674,929
MACHINE FOR PREPARING PAPER CONTAINER BLANKS
Filed April 6, 1949   26 Sheets-Sheet 22

INVENTORS.
BRUNO A. WITTKUHNS
H. GEORGE D. NUTTING
GILBERT F. HILL
BY Austin, Wilhelm + Carlson
ATTORNEYS.

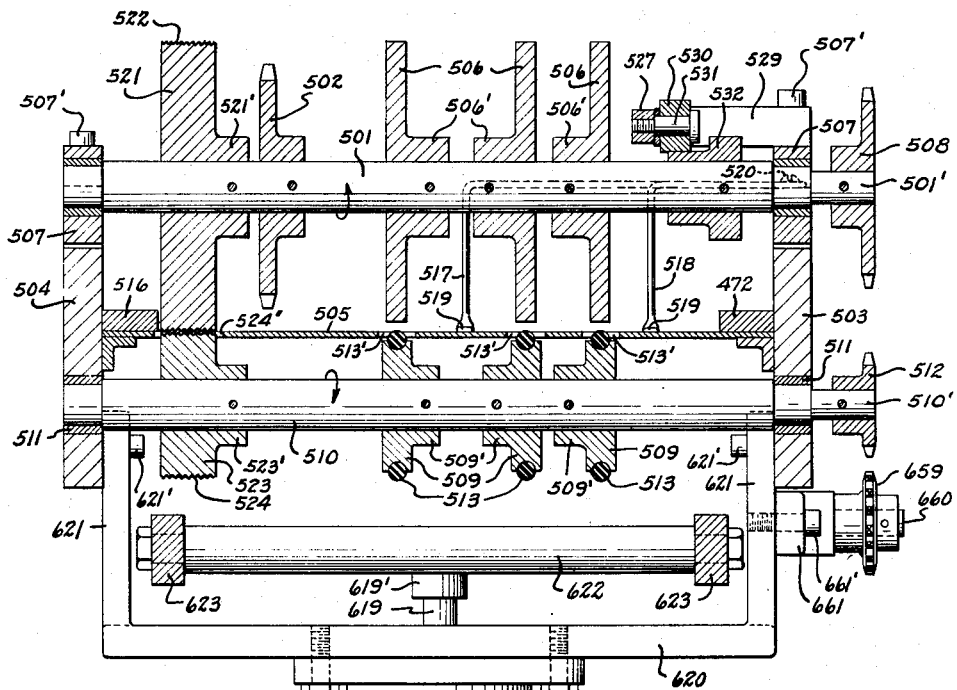
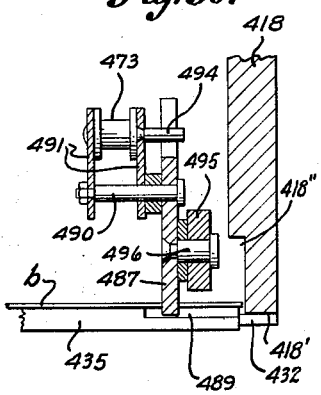
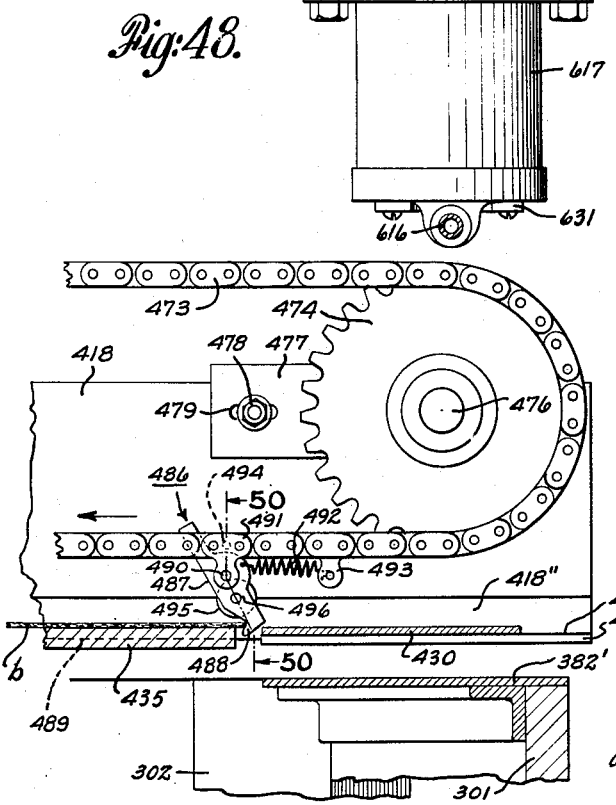
INVENTORS
BRUNO A. WITTKUHNS
H. GEORGE D. NUTTING
GILBERT F. HILL
BY Austin, Wilhelm & Carlson
ATTORNEYS.

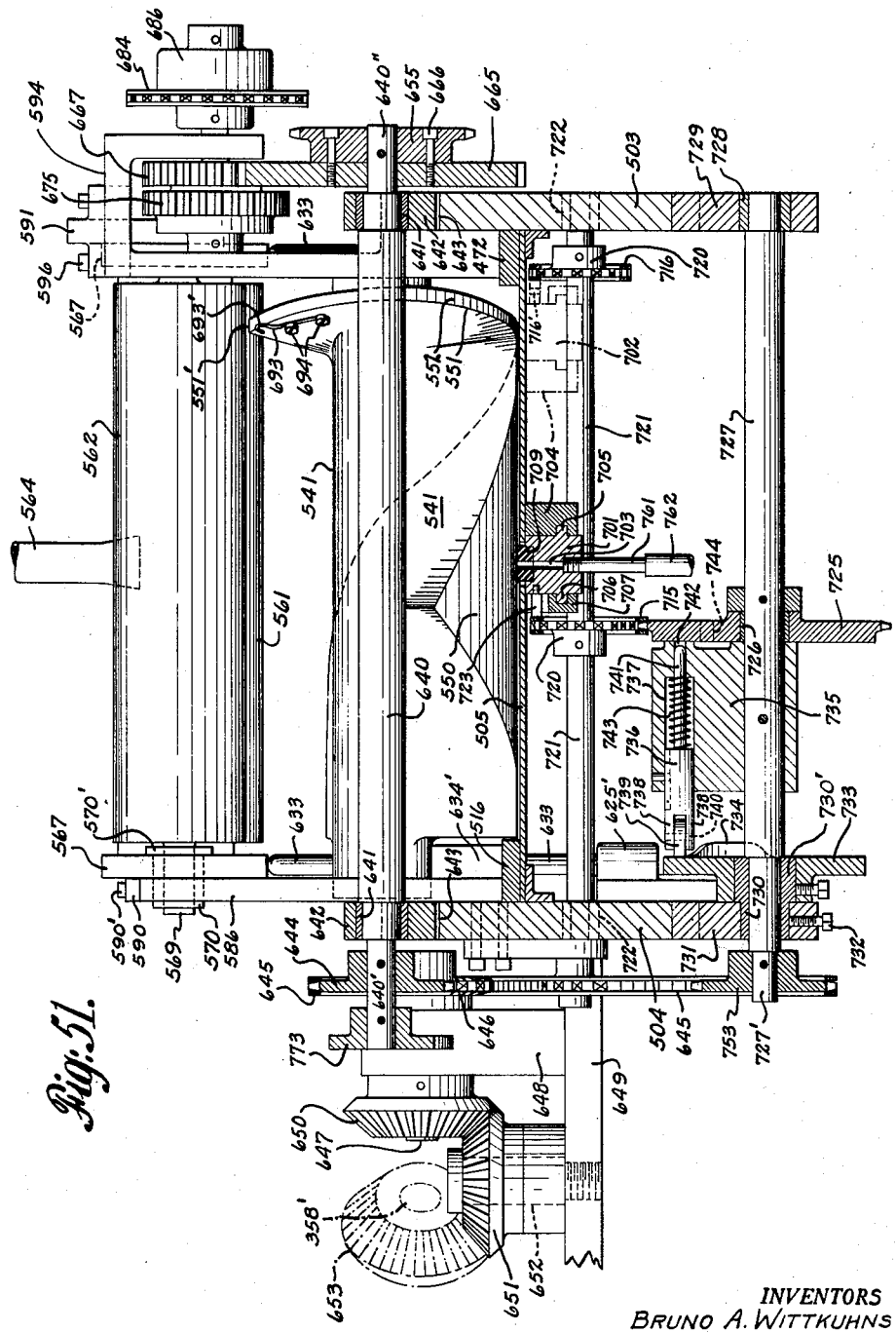

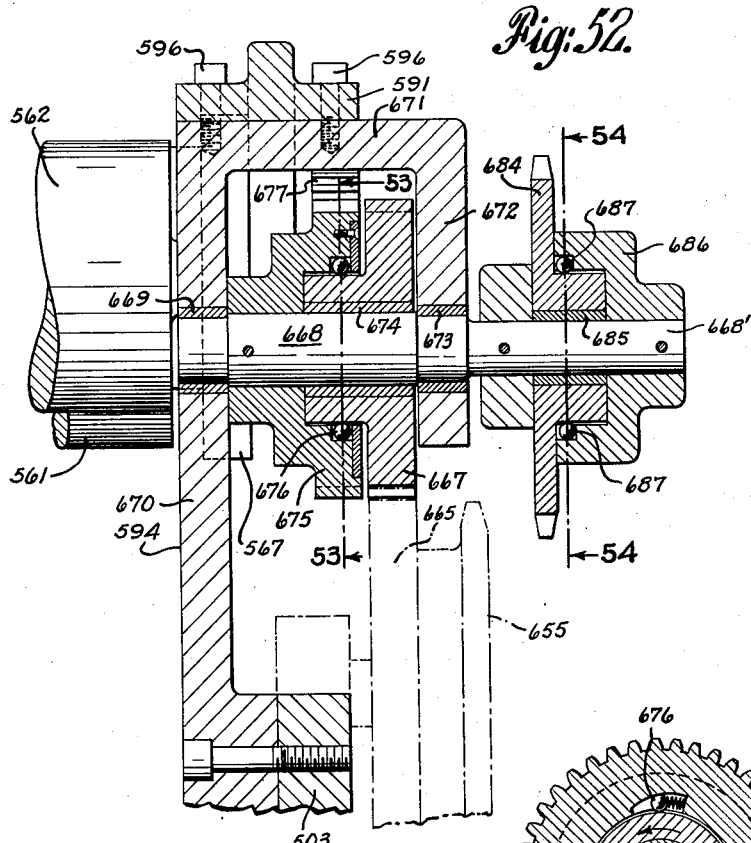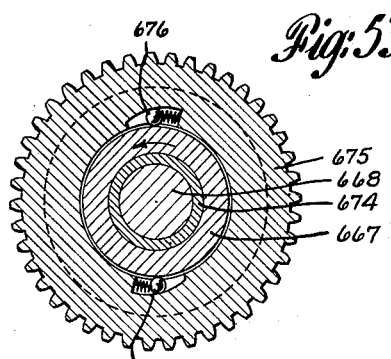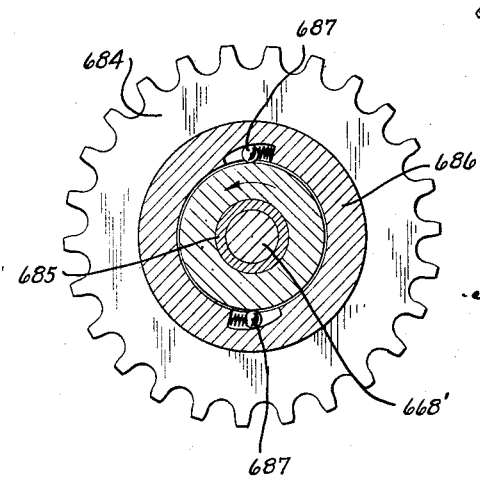

April 13, 1954  B. A. WITTKUHNS ET AL  2,674,929
MACHINE FOR PREPARING PAPER CONTAINER BLANKS
Filed April 6, 1949  26 Sheets-Sheet 26
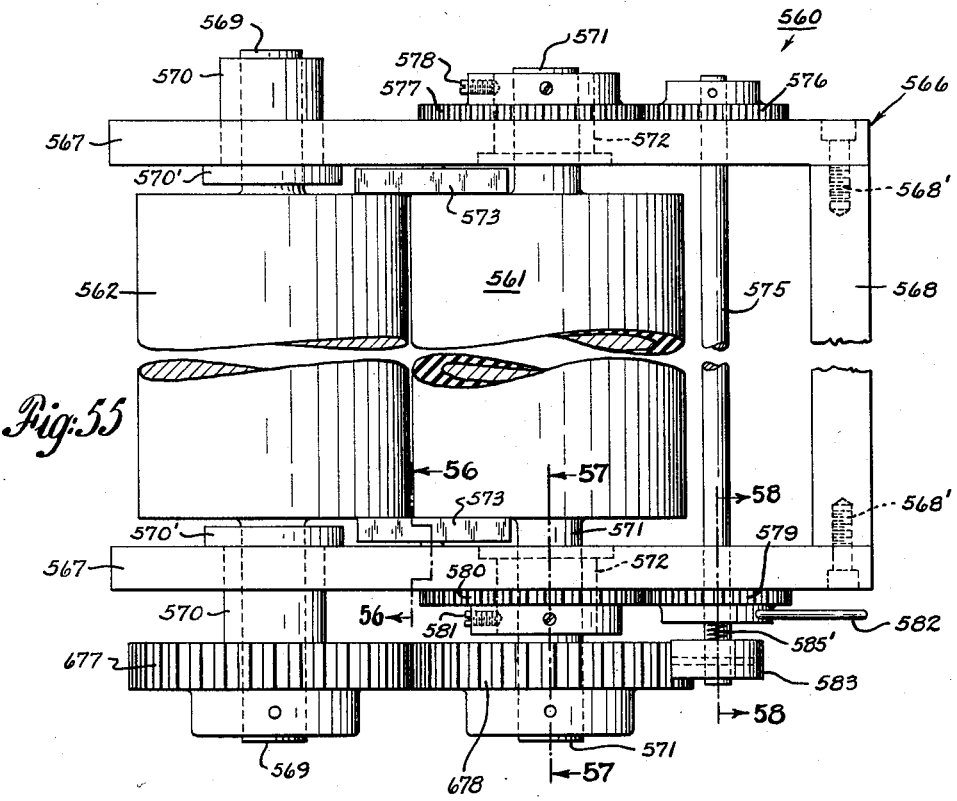
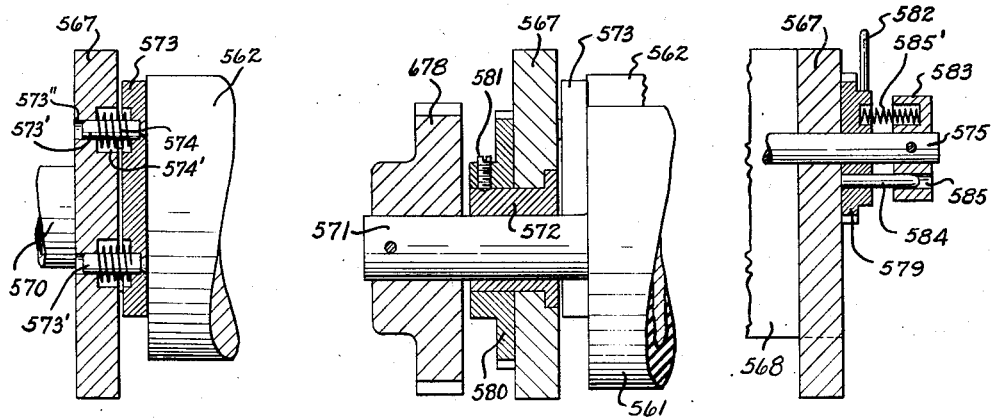
INVENTORS
BRUNO A. WITTKUHNS
BY H. GEORGE D. NUTTING
GILBERT F. HILL
Austin, Wilhelm & Carlson
ATTORNEYS.

Patented Apr. 13, 1954

2,674,929

UNITED STATES PATENT OFFICE 2,674,929

MACHINE FOR PREPARING PAPER CONTAINER BLANKS

Bruno A. Wittkuhns and H. George D. Nutting, Summit, and Gilbert F. Hill, Madison, N. J., assignors to National Paper Bottle Co. Inc., New York, N. Y., a corporation of New York Application April 6, 1949, Serial No. 85,783

14 Claims. (Cl. 93—36)

This invention relates to a machine for preparing paper container blanks, and more particularly to an improved machine embodying mechanisms for cutting, printing, gluing and feeding one piece blanks or two piece paper blanks of predetermined shape and contour, adapted to be operated in synchronism with an associated machine which forms container bodies from the prepared blanks.

Paper containers have heretofore been made in various shapes and forms for the packaging of milk, juices and other liquid and free flowing materials. Paper containers having the general form of glass bottles, and presenting a cylindrical part from which a truncated part extends, are particularly convenient and desirable for the packaging and transportation of milk and other liquid products since they are suited for filling on standard glass bottle filling equipment and may be conveniently grasped and carried from the truncated neck portion thereof.

Paper containers simulating glass bottles may be formed from paired paper blanks comprising a substantially rectangular blank paired with a generally arcuate shaped blank, the two blanks being wound together to form a container body of double-ply construction, with the plies of the conical part wound together and interleavened with the plies of the cylindrical part in a manner to form a mid-sectional joint. The bottom end of the container body may be closed by a bottom member presenting a closure skirt which may be glued in position, the skirt and the lower end of the container body being rolled together to form a supporting bead inset within the lower end of the container body as formed.

This invention embodies mechanisms designed to cut, print, glue and feed one piece blanks or paired two piece blanks of predetermined shape and contour into a container body forming machine, and has special application to the cutting, printing and gluing of rectangular and arcuate blanks and the feeding of such blanks in uniform paired relationship into the winding mechanism of the container making machine disclosed in our Patent Nos. 2,642,784 and 2,642,785.

Machines constructed in accordance with this invention may be made to advance a paper stock sheet, drawn from a stock sheet roll, to mechanism designed to cut successive container blanks therefrom, which blanks may be of any desired size and contour; thence to advance the successive blanks to printing mechanism where any desired printing information or designs may be imprinted thereon; thence to advance the successive printed blanks to gluing mechanism operative to apply glue patches or glue strips to the successive blanks over precisely defined areas thereof, and thence to automatically feed the successive prepared blanks into engagement with the winding mechanism of an associated container forming machine.

The improved blank preparing machine of this invention may be constructed in two divisions, which may be operated to separately prepare and feed successive blanks to separate container body forming machines, or the divisions may be operated in synchronism from a common power source to feed the successive blanks as processed in each division into paired arrangement so that the paired blanks may be wound as paired units into container body form.

One division of the machine is designed to prepare and process blanks in the form of a strip of generally rectangular outline. This division embraces a stock sheet feeding station having mechanism for advancing a stock sheet to a cutting station. The cutting station embraces mechanism for transversely severing successive rectangular blanks from the advancing stock sheet in a manner to insure the production of blanks substantially identical in size and contour. This machine division also embraces a printing station having mechanism for printing selected information and designs on one side of the successive rectangular blanks as cut from the stock sheet, and mechanism for controlling the advance movement of the successive printed blanks to a gluing station in a manner so that the gluing mechanism at the gluing station will precisely apply a glue patch to a predetermined area only of the successive printed blanks. The printed and glued blanks are then advanced to a feeding station having mechanism for automatically drawing the successive blanks through the gluing mechanism and then to automatically feed the successive printed and glued blanks into engagement with the winding mechanism of a container body forming machine in timed synchronism therewith.

The rectangular blank processing division of the machine also incorporates adjustable means associated with the stock sheet advancing mechanism for insuring a positive advancing grip on the stock sheet, and devices for crimping a side edge of the stock sheet so that the blank cut therefrom presents scored crimps at each end thereof. The printing mechanism also embraces means for regulating the contact pressure between the blank and the printing mat of the printing cylinder, and means for regulating the application of ink to the printing mat.

Devices are provided operative to manipulate certain parts of the glue applicator mechanism in a manner to prevent glue gumming of certain parts of the gluing mechanism which should carry no glue when no rectangular blank has been advanced to receive the glue. An auxiliary drive is provided which automatically takes over and rotates the glue transfer rolls and the glue applicator roll to prevent glue hardening on the contact surfaces thereof when the primary drive therefor is temporarily disconnected to permit adjustments. The glue applicator mechanism also embraces devices for regulating the thickness of the glue film which is to be applied to the successive blanks.

The blank feeding mechanism embraces a device for gripping the glue-free portion of each blank and drawing the successive blanks through the gluing mechanism in timed synchronism therewith in a manner to insure precise application of the glue patches to the successive blanks. The blank feeding mechanism also incorporates a second blank feeding device operative to automatically grip the unglued portion of the blank when the first feeding device has released its grip, and thence to positively feed the successive prepared blanks into engagement with the container winding mechanism of a container forming machine.

The various mechanisms and devices associated with the rectangular blank processing division are driven in timed synchronism to insure performance of the successive processing steps at high speed and with precision uniformity, with substantially no attention on the part of the operator. Driving controls are provided to selectively halt the operating movement of the various blank processing mechanisms as may be desired to permit selective adjustments as desired.

The second machine division is designed to process blanks of irregular outline and to feed such blanks separately, or in paired relationship with the blanks processed by the first machine division, into the winding mechanism of a container body forming machine. The second machine division embraces a stock sheet feeding station having mechanism for intermittently advancing predetermined sectional lengths of the stock sheet to a cutting station. The cutting station embraces mechanism for cutting successive blanks of predetermined shape and contour from the intermittently advanced sections of the stock sheet. The second machine division also embraces a stripping station having mechanism operative to remove the successive cut blanks from the stock sheet and to discharge the stock sheet waste. A blank advancing station is provided having mechanism for advancing the stripped blanks forwardly to a gluing station.

The gluing station embraces mechanism operative to precisely apply a glue patch and a glue strip to predetermined areas only of the successive advancing blanks. Devices located adjacent the gluing station are automatically operated to insure precise gluing registry of the successive advanced blanks with the glue applicator surfaces of the gluing mechanism. A device is provided for automatically halting glue transfer to the glue applicator roll in the event that no blank is advanced to gluing position. Devices are also provided for regulating the thickness of the glue film to be applied to the blank, and for positively peeling the successive glued blanks from the glue applicator roll. The successive glued blanks are advanced to a feeding station employing reciprocating suction devices for positively feeding the successive glued blanks into engagement with the winding mechanism of a container body forming machine.

The second machine division also embraces devices for applying scoring to the trailing end of the successive blanks as they approach the gluing mechanism, and guide means for insuring uniform travel of the blanks to the container forming machine. Primary driving devices are also employed which are so interrelated as to insure operation of the various processing mechanisms and devices in timed and correlated synchronism. Means are also provided for controlling the operation of the primary driving devices. An auxiliary driving device is provided which automatically takes over to continue the rotative movement of the glue transfer rolls at the gluing station when rotation of the primary power driven glue applicator roll is halted. Thus hardening of the glue on the glue transfer rolls is prevented during temporary shut down of the primary driven mechanisms for adjustment purposes.

The primary and secondary divisions of the machine may be arranged and driven in synchronism so that the successive blanks as intermittently advanced through the processing mechanisms of each division will finally move together in paired arrangement, with one blank overlapping and cemented to a predetermined edge or area of a companion blank, so that both blanks may be fed as a unit into engagement with the winding mechanism of a container body forming machine. The machine divisions may be adaptably driven in timed synchronism from a common power source and may be coupled to the main drive of the container body forming machine.

The machine divisions may also be operated separately as individual blank processing units, with each division designed to process successive blanks of predetermined shape and form. Thus, the rectangular blank processing division may be independently operated to cut, print, glue and feed successive blanks of generally rectangular shape into the winding mechanism of a container body forming machine to form container bodies of generally cylindrical form. The arcuate blank processing division may also be independently operated to cut, glue and feed successive arcuate shaped blanks to the winding mechanism of a container body forming machine to provide container bodies of generally conical or truncated-conical form. By arranging and driving both divisions of the machine as a unit, successively prepared and paired blanks may be fed to the winding mechanism of the container body forming machine to provide container bodies having a generally cylindrical lower portion adhesively bonded to a generally truncated-conical upper portion. Container bodies of various sizes and shapes may thus be made from blanks which have been automatically cut, printed, glued and fed by the blank preparing divisions constructed in accordance with this invention.

An object of this invention is to provide an improved machine for cutting, gluing and feeding successive blanks of predetermined shape and form into a container body forming machine which operates automatically and economically at high production speeds.

Another object of this invention is to provide an improved machine operative to automatically cut container forming blanks of predetermined uniform size and shape from a stock sheet, and to automatically and precisely apply adhesive patches to only selected predetermined areas of the cut blanks.

Another object of this invention is to provide an improved machine for automatically cutting, printing, gluing and feeding successive container forming blanks to a container body forming machine with precision accuracy and at high production speeds.

Another object of this invention is to provide an improved machine for preparing appropriate blanks from which container bodies may be formed which includes, mechanism for feeding successive sections of a stock sheet to blank cutting mechanism, mechanism for precisely applying glue patches to only predetermined surface areas of the successive blanks, and mechanism for feeding the successive glued blanks into the winding mechanism of a container body forming machine.

Another object of this invention is to provide an improved machine for preparing appropriate blanks from which cylindrical container bodies may be formed which includes, mechanism for feeding successive sections of a stock sheet into cutting position, cutting mechanism operative to uniformly cut successive blanks of predetermined size and form from the stock sheet, mechanism for automatically printing the successive cut blanks, mechanism for precisely applying a glue patch to only a predetermined surface area of the successively printed blanks, and mechanism for feeding the successively printed and glued blanks into the winding mechanism of a container body forming machine.

Another object of this invention is to provide improved mechanism for shearing successive blanks from a stock sheet, and having means associated therewith for precisely controlling the size and shape uniformity of the successively cut blanks.

Another object of this invention is to provide an improved paper blank preparing machine having mechanism for printing container forming blanks, operating in correlated synchronism with blank cutting mechanism and blank advancing mechanism.

Another object of this invention is to provide an improved paper blank preparing machine having mechanism for the precise application of a glue patch to only a predetermined area of successive container forming blanks, operating in correlated synchronism with mechanism for advancing the successive blanks through the gluing mechanism.

Another object of this invention is to provide improved mechanism for automatically applying a predetermined patch of adhesive to successive container forming blanks, having automatic means associated therewith for rendering the gluing mechanism inoperative in event no blank is advanced to gluing position.

Another object of this invention is to provide automatic mechanism for applying a predetermined patch of adhesive to successive container forming blanks which includes, a glue applicator roll for applying predetermined adhesive patches to the successive blanks, glue transfer rolls operative to transfer a film of adhesive to the glue applicator roll, and means for precisely regulating the thickness of the glue film to be applied to the successive container forming blanks.

Another object of this invention is to provide an improved mechanism for positively advancing successive container forming blanks through gluing mechanism and in accurate registry with the glue applicator surfaces thereof, and for feeding the glued blanks in precise predetermined relation to one another and into engagement with the winding mechanism of a container body forming machine.

Another object of this invention is to provide an improved device for feeding successively glued blanks into engagement with the winding mechanism of a container body forming machine, which feeding device is resiliently flexible to the pull exerted on the blanks when engaged by the winding mechanism.

Another object of this invention is to provide an improved mechanism for feeding successive container forming blanks each having a glue patch covering a predetermined area thereof comprising, a plurality of spaced feeding devices operative to grip and engage only a predetermined unglued area of the successive glued blanks, said blank feeding devices being driven into correlated synchronism to intermittently advance the successive glued blanks in predetermined spaced relation into engagement with the winding mechanism of a container body forming machine.

Another object of this invention is to provide improved mechanism for intermittently advancing predetermined sectional lengths of a stock sheet into engagement with blank cutting mechanism, and means for operating said mechanisms in timed synchronism.

Another object of this invention is to provide improved mechanism for cutting successive arcuate shaped blanks from successive sections of a stock sheet which includes, a cutting platen carrying a cutting blade which defines the contour of the blank, operating in conjunction with a blank supporting anvil and a driving device for reciprocating the cutting platen with a rocking movement, said cutting mechanism operating in synchronism with mechanism for intermittently advancing predetermined sectional lengths of the stock sheet onto the supporting anvil of the cutting mechanism.

Another object of this invention is to provide improved mechanism for stripping cut blanks from a stock sheet and lifting the removed blanks from the plane of travel of the stock sheet, said stripping mechanism including automatic means for firmly holding the cut stock sheet in accurate registry with the stripping mechanism during the stripping operation, and means for manipulating the stripping mechanism and stock sheet holding means in timed synchronism with the intermittent advance movement of the stock sheet.

Another object of this invention is to provide improved stripping mechanism for removing successive cut blanks from the stock sheet, said stripping mechanism having means for automatically elevating the removed blanks above the plane of travel of the stock sheet and suction means for automatically retaining the removed blank on the platform of the stripping mechanism during elevating movement of the blank.

Another object of this invention is to provide improved gluing mechanism operative to apply a glue patch to a predetermined area and a glue strip to a predetermined edge of successive arcuate blanks, including automatic means for achieving precise registration of the successive arcuate blanks with the glue applicator surfaces of the gluing mechanism, all operating in synchronism with mechanism for intermittently advancing the blanks through the gluing mechanism.

Another object of this invention is to provide improved gluing mechanism comprising a glue applicator roll and a glue transfer roll with means for automatically elevating the glue transfer roll out of glue transferring contact with the glue applying surfaces of the glue applicator roll in the event no blank is advanced to gluing position.

Another object of this invention is to provide improved gluing mechanism having a glue applicator roll and a glue transfer roll, a primary drive operative to drive the glue applicator roll and the glue transfer roll in timed synchronism with mechanism for intermittently advancing successive blanks through the gluing mechanism, and an auxiliary drive for the glue transfer roll operative to automatically continue the rotation of the glue transfer roll in the event driving movement of the primary drive is halted.

Another object of this invention is to provide an improved mechanism for positively and automatically advancing successive blanks from a glue applying station into engagement with the winding mechanism of a container body forming machine, which mechanism includes, reciprocating devices operative to apply a suction grip to each blank to insure positive advance thereof, means for automatically releasing the suction grip when the leading end of each blank has been advanced into engagement with the winding mechanism, means to automatically returning the reciprocating devices to starting position, and means for driving the blank advancing mechanism in timed synchronism with the operation of glue applying mechanism at the gluing station.

Another object of this invention is to provide improved mechanism for applying predetermined patches of adhesive to predetermined areas only of successive container forming blanks, said gluing mechanism having means associated therewith for automatically peeling and separating each glued blank from the glue applicator surfaces thereof.

Another object of this invention is to provide improved blank feeding mechanisms operative to feed two separate streams of glued container forming blanks into paired relationship for joint winding into container body form, said mechanism being operative to automatically overlap an edge of one blank onto the adjacent glued edge of a companion blank whereby the thus paired blanks may be jointly wound into container form, and means for driving said feeding mechanisms in timed synchronism.

Other objects of this invention will become apparent as the disclosure proceeds.

Although the characteristic features of the invention will be particularly pointed out in the claims, the invention itself, and the manner in which it may be carried out, may be better understood by referring to the following description taken in connection with the accompanying drawings forming a part thereof, in which Fig. 1 is a diagrammatic plan view showing the relative positions and path of travel of the paper stock and container forming blanks cut therefrom in relation to the mandrel of the winding mechanism upon which the paired container forming blanks are wound.

Fig. 6 is a diagrammatic plan view of the machine as assembled in relation to the body winding mechanism, this view showing the frame outlines and functional arrangement of the operating stations thereof.

Fig. 7 is a plan view of the rectangular blank processing division of the machine which operates to feed the stock sheet and to cut, print, glue and feed successive rectangular blanks into the winding mechanism to form the cylindrical part of successive container bodies.

Fig. 8 is an enlarged cross sectional view showing certain details of the blank feeding mechanism as the same would appear when viewed along lines 8—8 of Fig. 7.

Fig. 9 is a side elevational view of the rectangular blank processing division showing further details of the blank cutting, printing, gluing and feeding mechanisms as the same would appear when viewed from the right hand side of Fig. 7.

Fig. 10 is a perspective view of the printing drum associated with the printing mechanism of the machine division shown in Fig. 9.

Fig. 11 is an enlarged elevational view showing further details of the mechanisms for feeding the stock sheet and for blanking and printing the successive rectangular blanks as the same would appear when viewed in the direction of the arrows 11—11 of Fig. 9.

Fig. 12 is a sectional detail showing the eccentric device which may be employed to relieve the feed roll pressure when inserting the advance end of the paper stock, this view being taken along line of 12—12 of Fig. 11.

Fig. 13 is a sectional view of the machine as viewed along lines 13—13 of Fig. 7, this view showing further details of the stock feed rolls, the blanking mechanism, the printing mechanism and associated drive connections.

Fig. 14 is a sectional detail of the pillow block in which the blank advancing cylinder of the printing mechanism is eccentrically journalled, this view being taken along line 14—14 of Fig. 13.

Fig. 15 is a sectional view showing a fragmentary detail of the upper and lower blanking shears as they appear when in non-shearing position.

Fig. 16 is a sectional view of the machine as viewed along line 16—16 of Fig. 7, this view showing further details of the blanking shears and associated actuating mechanism.

Fig. 17 is a sectional view of the machine as viewed along line 17—17 of Fig. 7, the view showing certain details of the printing drum and associated ink fountain.

Fig. 18 is another sectional detail of the ink fountain as the same would appear when viewed along line 18—18 of Fig. 17.

Fig. 19 is a side elevational view, partly in section, showing certain details of the driving devices for the ink transfer rolls by means of which the ink is applied to the printing drum, this view being taken along line 19—19 of Fig. 18.

Figure 1:
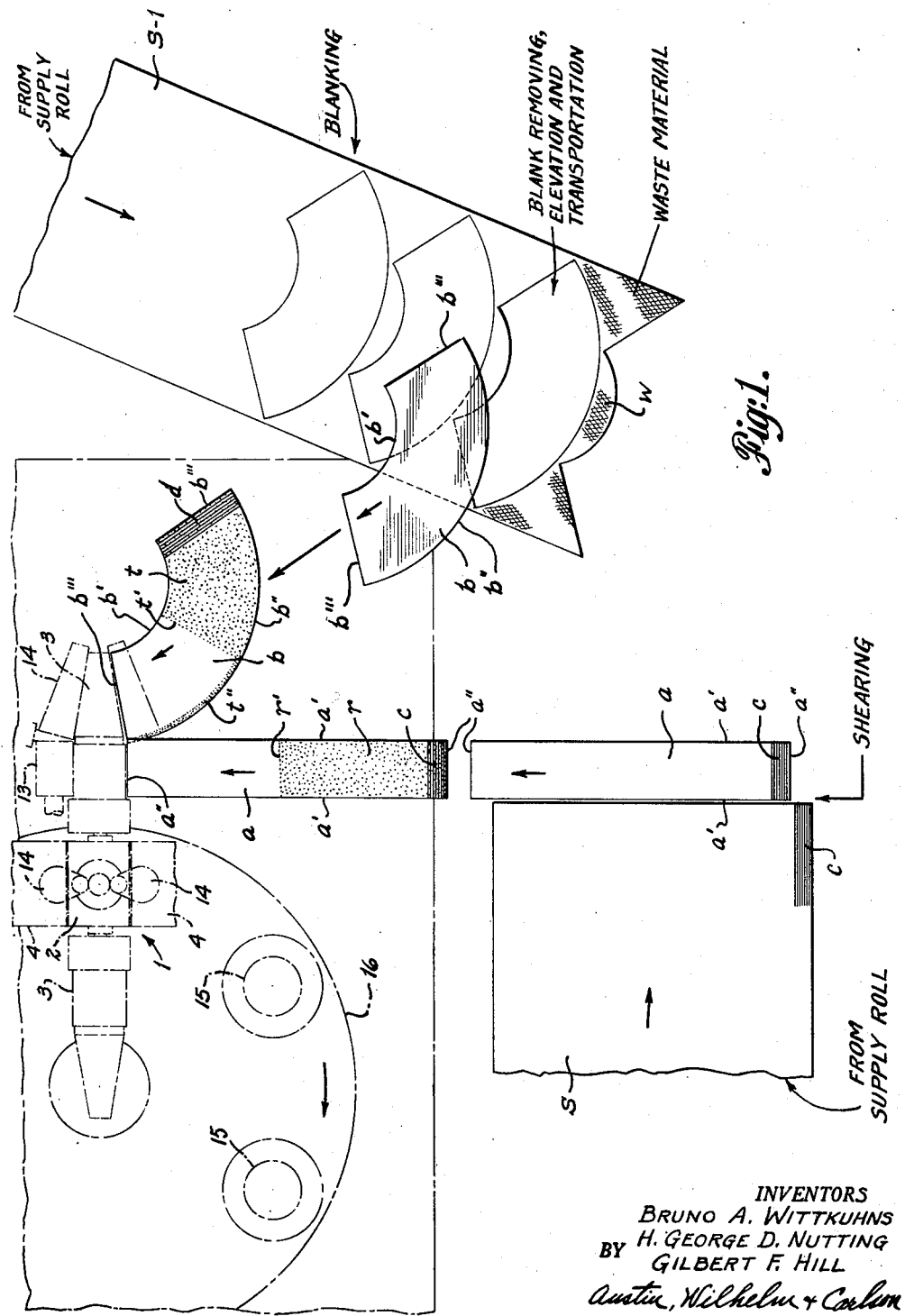

Fig. 20 is a side elevational view of the rectangular blank processing division as viewed along line 20—20 of Fig. 7, this view showing further details of the blanking shears, the glue applicator roll, the associated blank supporting roller and the mechanism for manipulating the blank supporting roller so as to render the glue applicator roll inoperative in the event that no blank is advanced to the gluing station.

Fig. 21 is a sectional detail of a part of the manipulating device which insures the imposition of a predetermined resilient pressure between the glue applicator roll and the blank supporting roller, this view being taken along line 21—21 of Fig. 20.

Fig. 22 is a plan view of the cam lever forming a part of the device which manipulates the blank supporting roller into and out of gluing position.

Fig. 23 is a sectional view taken along line 23—23 of Fig. 7, this view showing further details of the glue fountain and associated glue holding and applicator rolls, including certain details of the mechanism for insuring continuous rotation of the glue rolls to avoid glue hardening on the rolls when the rest of the machine is temporarily shut down.

Fig. 24 is a sectional view of the glue applicator roll and associated blank elevating roller, this view also showing further details of the device employed for establishing the correct thickness of the glue film before application to the blank advanced thereunder, this view being taken along line 24—24 of Fig. 23.

Fig. 25 is a sectional view taken along line 25—25 of Fig. 23, showing one of the glue rolls in section, the blank elevating roller, and certain details of the driving mechanism therefor.

Fig. 26 is a cross sectional detail taken along line 26—26 of Fig. 25, this view showing one of the slip clutches associated with the supplementary drive shaft of the glue applicator mechanism.

Fig. 27 is a cross sectional detail taken along line 27—27 of Fig. 25, this view showing another slip clutch associated with the supplementary drive shaft of the glue applicator mechanism.

Fig. 28 is a perspective detail of a side wall of the glue pot and attached shoe which forms one end of the glue pocket defined between the adjacent glue rolls as shown in Fig. 23.

Fig. 29 is a cross sectional detail of the glue roll shoe as supported by the side wall of the glue pot and pressed against the end face of the glue rolls as the same would appear when viewed along line 29—29 of Fig. 28.

Fig. 30 is another cross sectional detail of the glue roll shoe particularly showing the resilient means for maintaining the face of the shoe in pressure contact with the adjacent ends of the glue rolls, this view being taken along the line of 30—30 of Fig. 28.

Fig. 31 is a longitudinal cross sectional view of the rectangular blank processing division as viewed along line 31—31 of Fig. 7, this view showing the last and final rectangular blank advancing device by means of which the successive rectangular blanks are advanced into synchronized engagement with the winding mechanism.

Fig. 32 is a transverse sectional view showing further details of the final rectangular blank advancing device as the same would appear when viewed along line 32—32 of Fig. 31.

Figure 2:
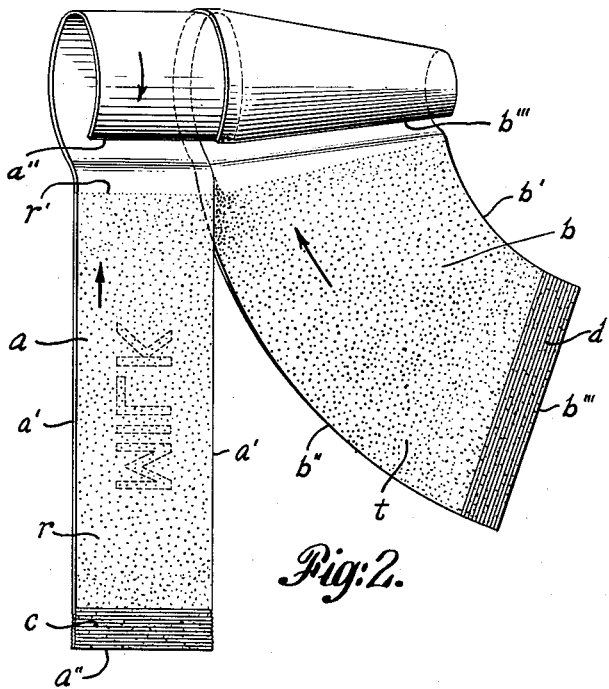
Fig. 2 is a plan and perspective view of the rectangular blank paired with the arcuate blank as the same appear when in process of winding on the winding mandrel to form the container body.

Fig. 33 is a plan view of the rectangular blank processing division which operates to feed the stock sheet, and to cut, strip, advance, glue and feed the successive arcuate blanks in rapid succession and in timed relation with the operation of the rectangular blank processing division, so that paired blanks as shown in Fig. 2 may be successively wound on the body winding mandrels during residence at the winding station.

Figure 34:
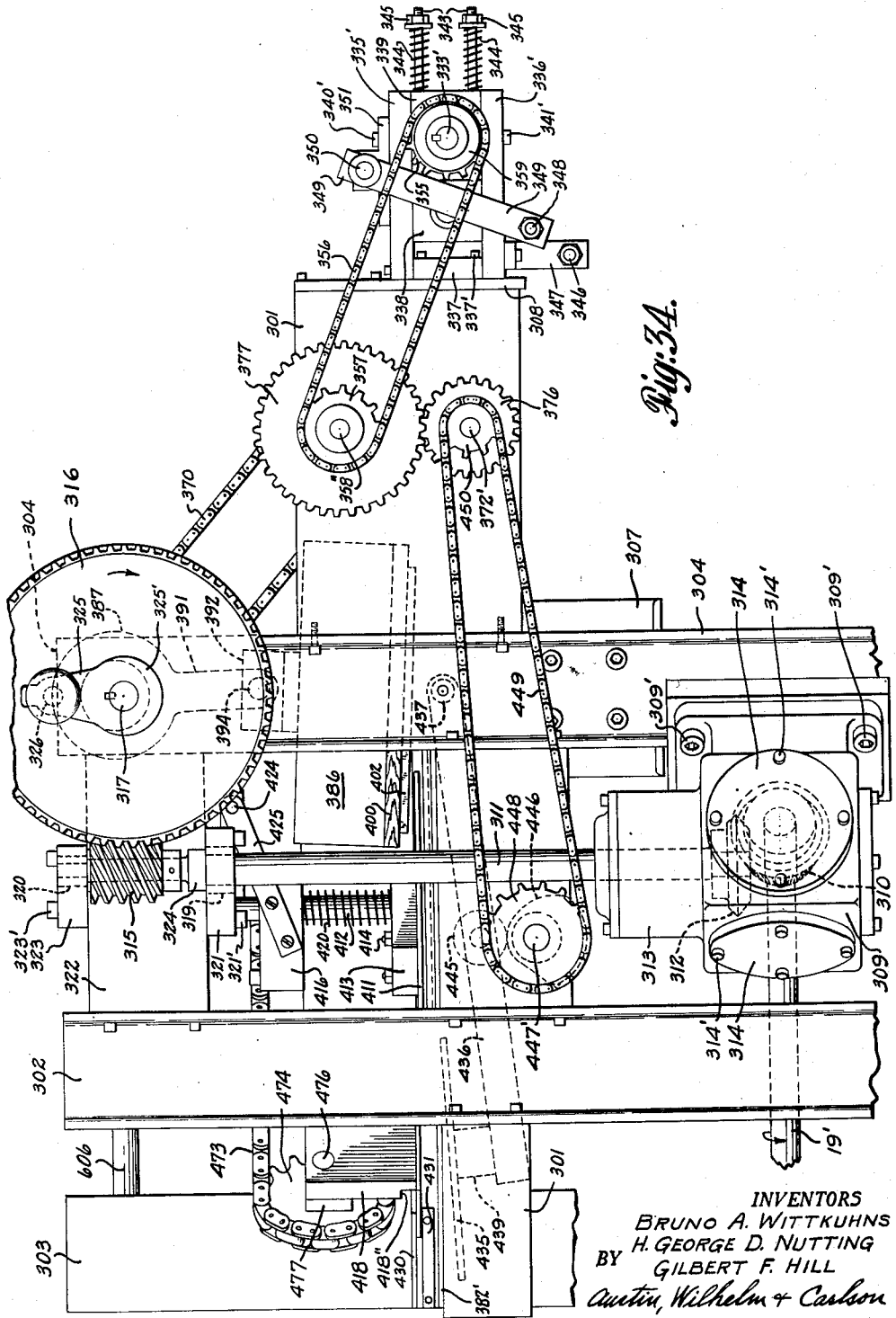

Fig. 34 is a side elevational view of the first section of the arcuate blank processing division, as the same would appear when viewed in the direction of the arrows 34—34 of Fig. 33, this view showing certain details of the drives employed in advancing the stock sheet, and in cutting and stripping the arcuate blanks.

Fig. 35 is a sectional view of the first section of the arcuate blank processing division as viewed along line 35—35 of Fig. 33, this view showing further details of the mechanism for feeding the paper stock and the mechanism for cutting and stripping the arcuate blanks.

Fig. 36 is a sectional detail of the journal blocks and supports for the paper stock feed rolls as the same would appear when viewed along lines 36—36 of Fig. 40.

Fig. 37 is a transverse cross sectional view of the first section of the arcuate blank processing division as viewed along line 37—37 of Fig. 35, this view showing certain details of the paper stock advancing mechanism and the blank cutting mechanism, together with certain details of the driving means therefor.

Fig. 38 is a sectional detail of the eccentric which supports and actuates the blank cutting block as viewed along line 38—38 of Fig. 37.

Fig. 39 is a fragmentary plan view of a part of the first section of the machine division shown in Fig. 35, this view showing the paper stock feeding rollers and adjacent stock feeding discs, including the mounting and drives therefor.

Fig. 40 is a fragmentary sectional detail as viewed along line 40—40 of Fig. 35, this view showing one of the paper stock feed rollers, its bearing mounting and driving means therefor, including parts of the device for insuring a slack section of the paper stock below the feed rollers.

Fig. 41 is a perspective view of the cutting knife associated with the underside of the cutting platen which serves to cut the arcuate blank from the paper stock sheet.

Fig. 42 is an enlarged sectional view showing a fragmentary detail of the blanking platen in raised non-blanking position above the paper stock sheet as it rests on the supporting anvil directly below the cutting platen, this section being taken along line 42—42 of Fig. 41.

Fig. 43 is another sectional detail of the cutting platen and blank supporting anvil as the same appears when the platen is in blank cutting position, this section also being taken along line 42—42 of Fig. 41.

Fig. 44 is a side elevational view of the second section of the arcuate blank processing division as the same would appear when viewed from the left hand side of Fig. 33, this view showing a part of the mechanism for advancing the arcuate blanks, and the mechanism for gluing and feeding the successive arcuate blanks, including a part of the drives therefor.

Fig. 45 is another side elevational view of the second section of the arcuate blank processing division as the same would appear when viewed from the right hand side of Fig. 33, this view showing further details of the blank gluing and feeding mechanisms, and certain parts of the drives therefor.

Fig. 46 is a fragmentary detail of the device employed to control the intermittent advance of the arcuate blanks and assure precise registry of the successive arcuate blanks with the glue applicator surface of the gluing mechanism during the cyclic operation thereof, whereby accurate application of the glue patches to the successive arcuate blanks is assured.

Figure 47:
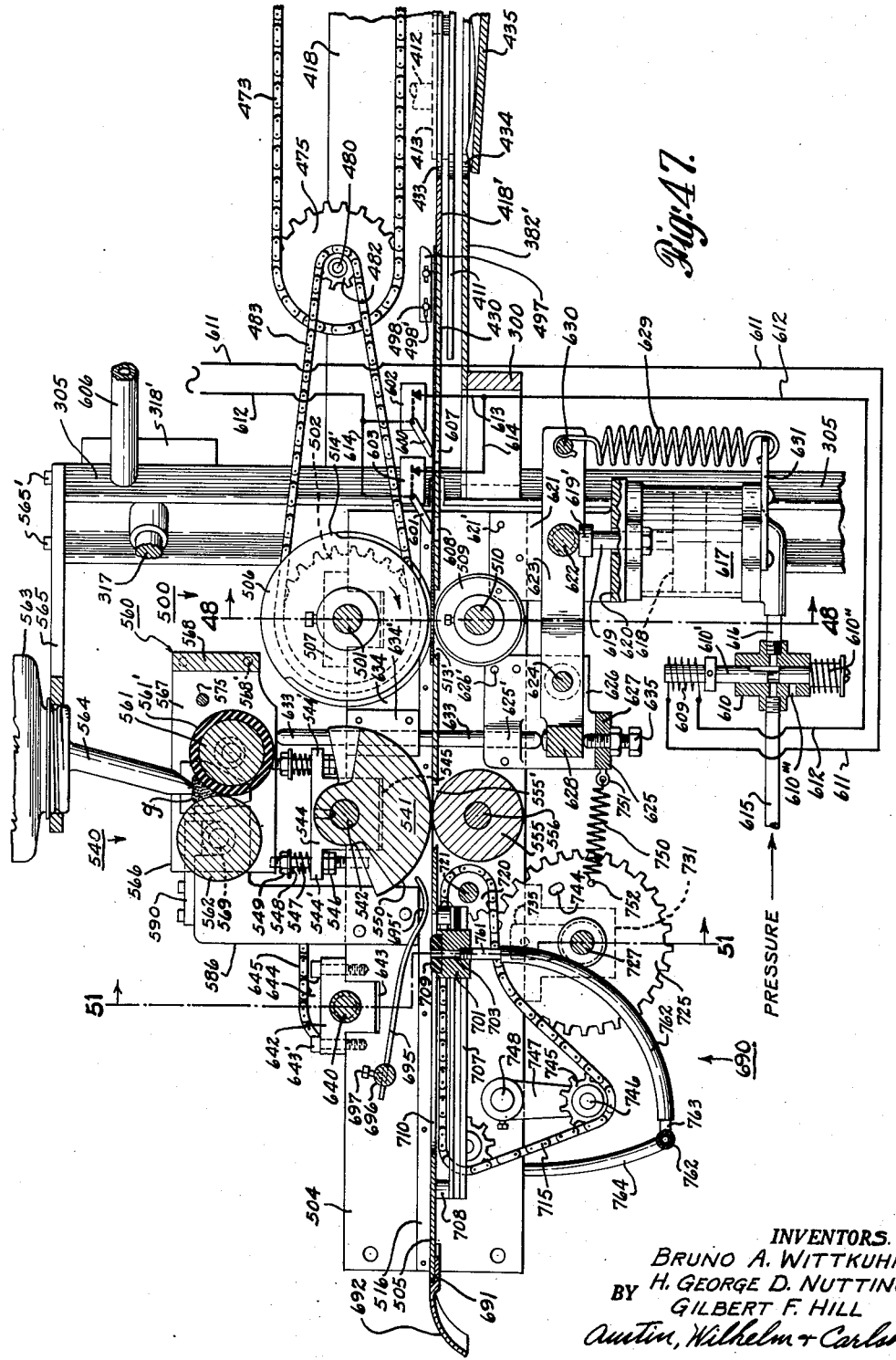

Fig. 47 is a longitudinal sectional view of the second section of the arcuate blank processing division as viewed along line 47—47 of Fig. 33, this view showing further details of the blank advancing mechanism, the gluing mechanism and the blank feeding mechanism, and the device employed to lift the glue transfer roll out of the path of rotation of the glue applicator roll in the event that no blank has been advanced to gluing position.

Fig. 48 is a transverse sectional view taken along line 48—48 of Fig. 47, this view showing certain details of the second blank advancing device for intermittently advancing the arcuate blanks to the gluing mechanism.

Fig. 49 is a fragmentary elevational view taken along line 49—49 of Fig. 33, this view showing the first blank advancing device comprising an advancing chain and associated blank gripping dog which operates to engage the rear edge of the arcuate blank and initially advance the blank to a position for engagement by the second blank advancing device shown in Fig. 48.

Fig. 50 is a sectional detail taken along line 50—50 of Fig. 49, this view showing further details of the blank pusher dog associated with the blank advancing chain.

Fig. 51 is a transverse cross sectional view of the second section of the arcuate blank processing division as viewed along lines 51—51 of Fig. 47, this view showing further details of the glue applicator mechanism and associated glue transfer rolls, and the intermittent blank feeding mechanism which follows the glue applicator mechanism.

Fig. 52 is a sectional detail of the supplemental drive associated with the glue transfer rolls as viewed along line 52—52 of Fig. 44, said supplemental drive insuring continuous non-caking rotation of the glue transfer rolls during periods when no blanks are being advanced.

Fig. 53 is a cross sectional detail showing one of the slip clutches associated with the supplemental drive as the same appears when viewed along line 53—53 of Fig. 52.

Fig. 54 is a sectional detail of another slip clutch associated with the supplemental drive as the same appears when viewed along line 54—54 of Fig. 52.

Fig. 55 is a plan view of the glue supply unit associated with the arcuate blank processing division, this view showing particularly the glue transfer rolls, the associated drives therefor, and the device for regulating the glue film thickness.

Fig. 56 is a sectional detail of the spring pressed shoe plate which provides the end wall for the glue pocket defined between the glue transfer rolls as the same would appear when viewed along line 56—56 of Fig. 55.

Fig. 57 is a sectional detail taken along line 57—57 of Fig. 55, this view showing the eccentric mounting for one of the glue transfer rolls whereby the thickness of the glue film as formed between the transfer rolls may be regulated as desired; and Fig. 58 is a cross sectional detail taken along line 58—58 of Fig. 55, this view showing the hand manipulated device for adjusting one of the glue transfer rolls to establish the glue film thickness.

Similar reference characters refer to similar parts throughout the several views of the drawings and specification.

The blank formations

A full understanding of the construction and operation of this blank preparing and feeding machine, may be facilitated by first considering certain typical container forming blanks which may be cut, printed, glued and fed by this machine for formation into a container body. For example, to produce a container body of the type shown in Figs. 3, 4 and 5, a substantially rectangular blank $a$ is prepared to provide the cylindrical part of the container body, and an arcuate shaped blank $b$ is prepared to provide the truncated conical part of the container body.

As shown in Fig. 1, a paper stock sheet S, provided in the form of a large sheet or roll of appropriate quality for the manufacture of paper containers, is advanced to a position to be severed transversely into successive strips, each providing a rectangular blank $a$ of proper size. The stock sheet S is scored to provide a scored edge $c$ so that each rectangular blank as cut will present a scored end portion. The transverse width of the stock sheet S is such as to conform with the longitudinal length of the rectangular blank $a$ between the ends $a''$ thereof. The rectangular blank $a$ is so severed that the side edges $a'$ thereof are truly parallel and the proper distance apart to form the cylindrical part of a container of the desired height.

After severance of the rectangular blank $a$ from the stock sheet S, suitable printing is applied to the underface of the blank as the blank is advanced in a direction normal to the direction of advance of the stock sheet S.

Figure 4:
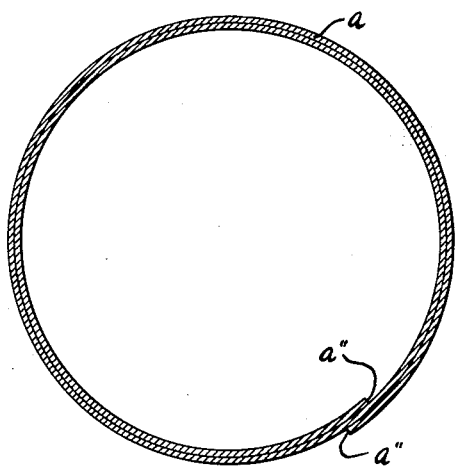
Fig. 4 is an enlarged transverse cross sectional view of the container body as the same appears when viewed along line 4—4 of Fig. 3.

As the rectangular blank continues its advance, a coating of adhesive is applied to the upper face of the rectangular blank over the area $r$, extending from the crimped end of the blank to a transverse line $r'$ at approximately the mid-section of the blank. The blank then proceeds to a winding mandrel on which the rectangular blank is wound to a double ply thickness as shown in Fig. 4, with the adhesive interleavened between the adjacent faces of the twice wound blank so as to firmly cement the paper plies together. The scored end portion $c$ insures close hugging contact of the wound trail end of the blank against the underlying paper ply.

The arcuate blanks $b$ are cut from a paper stock sheet S-1 of selected quality as the stock sheet travels forwardly at an obtuse angle towards the line of travel of the stock sheet S from which the rectangular blanks $a$ are severed. The stock sheet S-1 has a width to permit the cutting of complete arcuate blanks $b$ therefrom with a minimum of stock waste $w$. Each arcuate blank $b$ as cut presents an inner arcuate edge $b'$ of small diameter and an outer arcuate edge $b''$ of larger diameter and extending substantially concentric with the inner arcuate edge $b'$. The ends $b'''$ of the arcuate blank are cut substantially straight so that when the arcuate blank is double wound to form the truncated part of the container body, the ends $b'''$ will define substantially vertical inner and outer seams.

After the arcuate blank $b$ has been severed from the stock sheet S-1, the arcuate blank is moved toward the winding mandrel at an acute angle to the direction of travel of the stock sheet S-1. Transverse scoring $d$ is applied to the trailing end of the advancing arcuate blank. As the arcuate blank continues to advance, a layer of adhesive is applied to the upper face of the arcuate blank over area $t$ thereof, extending from the crimped end $d$ to a transverse line $t'$ located at the approximate mid-section of the arcuate blank. In addition, a narrow tail or strip $t''$ of adhesive is applied to the larger arcuate edge of the blank, and extends from the main glue patch $t$ to the leading edge of the blank, as shown in Fig. 1.

The machine comprises a rectangular blank processing division and an arcuate blank processing division which present the blanks in paired arrangement as they approach the winding mandrel. The feeding and aligning mechanism of these machine divisions is such as to align the leading end of the rectangular blank with the leading end of the arcuate blank and in a manner to overlap a side edge of the rectangular blank on to the glued edge strip $t''$ of the arcuate blank.

Figure 3:
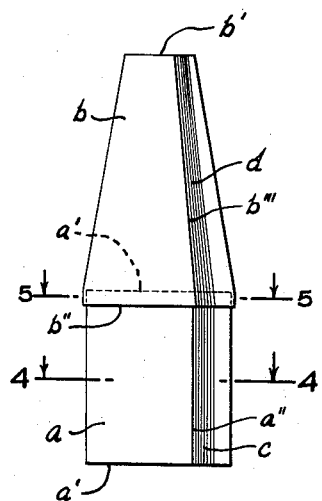
Fig. 3 is a side elevational view of the container body as formed after the mandrel winding operation of the paired blanks shown in Fig. 2.
Figure 5:
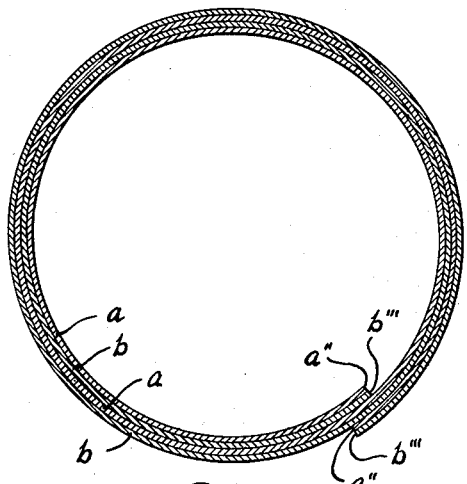
Fig. 5 is another enlarged mid-sectional view of the container body as the same appears when viewed along line 5—5 of Fig. 3.

When the rectangular blank and the arcuate blank as thus paired and then wound on the mandrel to form the container body as shown in Figs. 3, 4, and 5, the upper edge of the rectangular blank will be interleavened between the lower edge of the arcuate blank to provide a container of four ply thickness at the mid-section thereof, and of double ply thicknes above and below the mid-section thereof. A strong and leak proof container body is thus provided.

The machine organization

The blank preparing machine forming the subject matter of this invention is particularly adapted for the cutting, scoring, printing, gluing and feeding of rectangular and arcuate blanks in paired arrangement and in rapid succession to the winding mechanism of a container making machine of the type described in our Patent No. 2,642,785 and with which the divisions of this blank preparing machine may be driven in timed synchronism from a common power source.

To facilitate a better understanding of this invention, Figs. 1 and 6 show the improved blank preparing machine in general association with the winding mechanism of a container making machine. The container making machine includes winding mechanism generally comprising a mandrel supporting turret 1 having a hollow hub section 2 upon which a plurality of radially arranged winding mandrels 3 are rotatably mounted. The hollow hub section 2 is rotatably supported in bearing blocks 4 which may be fixed to suitable frame members 5. The mandrel supporting turret is intermittently rotated by a Geneva gear 6 which is driven by a continuously rotating Geneva driving member 7.

The Geneva driving member 7 is continuously driven by suitable gearing contained in housing 8 from a drive shaft 9 to which the main drive sprocket 10 for the machine is attached. The drive shaft 9 may be supported by a bearing block 11 fixed to a support 12 attached to the adjacent frame members 5.

The winding mandrels 3 are intermittently rotated into winding position at a winding station where the mandrel remains in residence for a short dwelling period of sufficient duration to permit winding of the paired blanks $a$ and $b$ thereon. Winding application of the blanks to the mandrel at the winding station is facilitated by a pair of pressure rolls 13 and 14, each presenting a cylindrical section and truncated section which are shaped to exert resilient pressure against the winding mandrel when in residence therebetween.

After winding at the winding station, the tubular container body is carried by its mandrel to dwelling position at successive operating stations where pressing and mouth beading operations are performed thereon. The container body is then stripped from its supporting mandrel into one of a plurality of receiving cells 15 of a turntable 16, as diagrammatically illustrated in Fig. 1.

The rectangular and arcuate blank processing divisions of this machine are driven in synchronism with each other and with the mechanism associated with the mandrel supporting turret 1 from a main sprocket wheel 17 attached to the main drive shaft 9 and over which a drive chain 17', as shown in Fig. 6 is trained. The drive chain 17' drives a sprocket wheel 18 attached to the main drive shaft of this blank preparing machine. The main drive shaft presents a drive shaft section 19 which extends to and drives the rectangular blank processing division, and a drive shaft section 19' which extends to and drives the arcuate blank processing division, the shaft sections 19 and 19' being preferably connected together by a universal joint coupler 19''.

The rectangular blank processing division of the machine may be conveniently referred to as comprising a first section I extending generally at a right angle to a second section II as shown in Fig. 6. The first section I incorporates a stock sheet advancing station A having mechanism 20 for intermittently advancing the head end of the stock sheet to a shearing station B having mechanism 60 which operates to shear off the rectangular blanks $a$ from the intermittently advancing end of the paper stock sheet S. The second section II of the rectangular blank processing division incorporates a printing station C which embraces mechanism 90 for printing the under face of the advancing rectangular blanks, a gluing station D embracing mechanism 150 for applying an adhesive coating to the prescribed area of the rectangular blank, followed by a feeding station E employing mechanism 250 for intermittently feeding the rectangular blanks in paired relation to the feeding movement of the arcuate blanks, so that the paired rectangular and arcuate blanks are in accurate alignment and registry for winding on the winding mandrels during their period of residence at the winding station.

The arcuate blank processing division of the machine may be considered as comprising a first section III extending at an obtuse angle to section I, and second section IV extending at an acute angle to section II, as shown in Fig. 6. The first section III incorporates a stock sheet advancing station F having mechanism 330 for intermittently advancing the head end of the stock sheet S-1 to a blank cutting station G having mechanism 380 for cutting the arcuate blanks from the intermittently advanced stock sheet S-1, followed by a stripping station H embracing mechanism 410 for stripping and removing the arcuate blanks from the stock sheet S-1. The second section IV presents a blank advancing station I incorporating blank advancing mechanism 470 for advancing the arcuate blanks to a gluing station J having mechanism 540 for applying adhesive to the areas $t$ and $t''$ of the arcuate blanks, followed by a feeding station K incorporating mechanism 690 for feeding the successive arcuate blanks into paired registry with the adjacent rectangular blanks so that the paired blanks can be wound together as a unit on each winding mandrel as they successively reside at the winding station.

The construction and operation of the rectangular blank processing division will now be described in greater detail.

*Stock feed for the rectangular blanks*

The stock feeding mechanism 20 at station A, which operates to advance the paper stock sheet S into position to be severed by the shearing mechanism 60 at the rectangular blank shearing station B, is illustrated generally in Figs. 6 and 7 and in more detail in Figs. 11, 12, and 13. The stock sheet S may be drawn from a paper stock roll rotatably supported on suitable trunnion shaft 21. The advance end of the stock sheet is drawn onto a table plate 22 supported at a convenient elevation by a pair of parallel apron frames 23 attached to suitable supporting legs, the apron frames 23 being connected and strengthened by suitable tie bars 24.

The stock sheet S is drawn off from the stock roll by a pair of cooperating pinch rolls 25 and 26 positioned immediately adjacent the entry end of the table plate 22. One end of the pinch rolls 25 and 26 are provided with cooperating crimping grooves 27 which serve to form the crimps c along one longitudinal edge of the stock sheet S as indicated in Fig. 1.

The lower pinch roll 26 has a stub shaft 28 extending from each end thereof which is rotatably supported in a bearing assembly 29 mounted in the adjacent frame plate 23 as shown in Figs. 11 and 12. The upper pinch roll 25 is likewise provided with a stub shaft 30 at each end thereof rotatably mounted in a bearing assembly 31. Each of the upper bearing assemblies 31 are mounted in a yoke plate 32. One end of each yoke plate 32 is secured by a pivot bolt 33 attached to a vertical strut 34 secured as by screws 34' to the adjacent frame plate 32. The other end of each yoke plate 32 is provided with a lug extension 32' through which a bolt 35 extends, the end of the bolt being threaded into the adjacent edge of the table plate 22. Each bolt 35 carries a compression spring 36 whose ends bear against the lug extensions 32' and the bolt nut 35'. The compression springs 36 serve to resiliently press the upper pinch roll downwardly against the paper stock sheet so as to establish the desired pinching and driving grip on the stock sheet threaded between the upper and lower pinch rolls 25 and 26.

Eccentric means are provided for conveniently lifting the upper pinch roll 25, as would be desirable when the leading end of a fresh stock sheet is to be inserted between the pinch rolls. The eccentric means, as shown in Figs. 7, 11, 12 and 13, comprises a vertical strut 37 hinged to each yoke plate 32 as by hinge bolt 37'. The lower end of each strut 37 is provided with a bore hole 38' whose axis is eccentric to the axis of a shaft 38 extending therethrough. Holes 38' have larger diameters than the diameter of shaft 38. The ends of the shaft 38 are secured in an eccentric bore in bearing sleeves 39 which are journalled in the adjacent apron frame plates 23. A handle 41 is attached to one end of the shaft 38 whereby the shaft 38 may be rotated. Rotation of shaft 38 and bearing sleeves 39 causes shaft 38 to rise with respect to frame plates 23 and makes contact with bore holes 38' in struts 37. Continued rotation then raises struts 37, yoke plates 32, and the upper pinch roll 25 supported thereby.

By a turn of the handle 41, the upper pinch roll 25 may be raised or lowered as may be necessary when making adjustments or when threading a fresh paper stock sheet S thereunder. The compression springs 36 associated with the bolts 35 otherwise normally retain the upper pinch roll 25 in resilient pressing engagement against the stock sheet, so that when the pinch rolls 25 and 26 are rotated, the head end of the stock sheet is positively and accurately advanced onto the upper surface of the table plate 22.

Means are provided for rotating the pinch rolls 25 and 26 to insure continuous advance of the head end of the stock sheet onto the table plate 22. As shown more particularly in Figs. 7 and 13, the pinch roll driving means includes an assembly of driving gears, comprising gear 42 attached to the projecting end of the stub shaft 30 extending from one end of the upper pinch roll 25, in mesh with gear 43 fixed to the projecting end of the adjacent stub shaft 28 associated with the lower pinch roll 26. An idler gear 44, rotatably mounted on a stub shaft 44' supported by the adjacent apron frame plate 23, meshes with the gear 43 associated with the lower pinch roll 26. A transmission gear 45, meshing with idler gear 44, is fixed to a shaft 46 which is journalled in the adjacent apron frame plate 23 and extends transversely under the table plate 22. The shaft 46 is additionally supported in a suitable bearing provided in a bracket plate 47 (Fig. 7) attached to the adjacent framework of the machine. The inner end of the shaft 46 carries a beveled gear 48 which meshes with a beveled driving gear 48' attached to one end of the basic drive shaft 49 of the rectangular blank processing division.

The basic drive shaft 49 is rotatably mounted in bearing assemblies 50 supported by a pair of spaced and parallel side frames 51 and 52, extending at right angles to the apron frame plates 23. The side frames 51 and 52 form part of the supporting framework for the second section II of the rectangular blank processing division. The bearing bracket 47 may be conveniently attached to the adjacent side frame 51. The shearing mechanism 60 at the shearing station B is mounted adjacent the discharge end of the table plate 22 and directly over the side frame member 51. The frame members 51 and 52, supported by a suitable leg structure 53, provide a mounting support for the printing mechanism 90 (Fig. 9), the glue patch applying mechanism 150, and the intermittent blank feeding mechanism 250 forming a part of the second section II of the rectangular blank processing division, as more particularly described hereafter.

The basic drive shaft 49 has a sprocket wheel 54 (Fig. 13) splined to the reduced end portion 49' thereof. A clutch sprocket 55 is rotatably mounted on the reduced end portion 49' of the shaft 49 and has a releasable clutch connection with the sprocket wheel 54 as shown more particularly in Figs. 9, 11 and 13. The clutch connection comprises a draw bolt 56 having an enlarged head 56' designed to extend into a receiving aperture in the side face of the sprocket wheel 54. The draw bolt 56 is urged into driving engagement with the sprocket wheel 54 by a compression spring 57 seating within a cavity 57' formed in the clutch sprocket 55. The draw bolt 56 may be provided with a suitable handle 56'' by means of which the head end of the draw bolt 56 may be manually disconnected from the sprocket wheel 54.

The clutch sprocket 55, as shown more particularly in Figs. 9 and 11, carries a sprocket chain 58 which is trained around a sprocket 58' on the low speed driven shaft 59' of a speed reducer unit 59. The high speed side of the speed reducer unit 59 is connected to the end of the main drive shaft section 19. The drive shaft section 19 thus provides the driving power for the pinch rolls 25 and 26 which advance the stock sheet S, but this driving connection may be manually released by withdrawing the clutch bolt 56 from driving engagement with the sprocket wheel 54.

*Shearing mechanism at the rectangular blank cutting station*

Shearing mechanism 60 is provided adjacent the discharge end of the table plate 22 for severing the rectangular blanks *a* in rapid succession from the advancing end of the stock sheet 5. As shown in Figs. 7, 9, 11 and 13, the parallel side frame members 51 and 52 support a secondary horizontally extending table plate 61 whose surface elevation is slightly below the surface elevation of the table plate 22. Thus the rectangular blank *a*, when severed from the advancing end of the stock sheet S, drops onto the adjacent table plate 61. The table plate 61 is provided with a pair of parallel extending guide strips 62 and 63 whose adjacent parallel edges are spaced a sufficient distance to snugly receive the parallel side edges *a'* of the rectangular blanks therebetween.

The rectangular blank *a* is severed from the stock sheet by means of a fixed lower shearing blade 64 and an upper reciprocating shearing blade 66 as shown in Figs. 7, 9, 11, 13, 16 and 20. The lower shearing blade 64 may be fixed to the adjacent side frame member 51 by a plurality of spaced securing bolts 65 (Fig. 13). The upper cutting or shearing edge 64' of the fixed shearing blade 64 extends across the full width of the table plate 22 and is flush with the upper surface elevation of the table plate 22 at the discharge end thereof, so as not to interfere with the advance movement of the head end of the stock sheet thereover. The lower shearing blade 64 and the upper shearing blade 66 are preferably made of cutlery steel to insure long life.

The upper shearing blade 66 is mounted for vertical movement to shear over the inside face of the lower shearing blade 64 as shown in Figs. 13 and 15. The upper shearing blade 66 presents a lower cutting edge 66' which is beveled to present a sharp shearing corner to the lower shearing blade 64, and longitudinally inclined, as shown in Fig. 16 to assist in proper shearing action. The upper shearing blade 66 is mounted for vertical movement between a pair of vertical strut plates 67 and 68 as shown in Figs. 7, 11, 13, 16 and 20. The strut plate 67 is rigidly secured at the lower end thereof as by screws 67' to the adjacent apron frame plate 23, and the strut plate 68 is secured at its lower end by suitable screws 68' to the other adjacent apron frame plate 23. The strut plates 67 and 68 extend vertically above the table plate 22 and are connected by a horizontal extending bar plate 69 whose lower edge is raised above the table plate 22.

The upper shearing blade 66 is secured to a horizontal pressure bar which in turn is connected to the lower ends of a pair of vertical rack bars 70 and 71, as shown in Figs. 7, 11, 13, 16 and 20. The rack bars 70 and 71 are each provided with teeth 72 which mesh with adjacent rack pinions 72' fixed to a horizontally extending shaft 73. One end of the shaft 73 extends through and is journalled in the strut plate 67 and the other end of the shaft 73 is journalled in a secondary vertical strut plate 74 which is fixedly secured as by screws 74' to the bar plate 69, as shown in Figs. 7, 13 and 20. The secondary strut plate 74 is provided with a pair of upper and lower guide rollers 75 (Fig. 9) journalled on suitable stud pins 75' extending laterally from the secondary strut plate 74. The guide rollers are arranged to roll along the flat vertical face of the rack bar 70, thereby insuring vertical movement of the rack bar 70 when the adjacent rack pinion 72' is rotated.

The other rack bar 71, as shown in Figs. 7, 11 and 16, is guided in its vertical movement by a pair of upper and lower guide rollers 76 rotatably mounted on stud pins 76' projecting from and secured to the vertical strut plate 68. The upper and lower guide rollers 76 are arranged to smoothly roll against the flat rear face of the rack bar 71 to insure smooth vertical movement of the rack bar when the adjacent rack pinion 72' is rotated.

The horizontal extending pressure bar 77 is secured to the lower ends of the rack bars 70 and 71 as by means of suitable screws 77'. The upper shearing blade 66 is secured to the horizontal pressure bar 77 as by screws 77''. The pressure bar 77 (Fig. 13) and the upper shearing blade 66 extend across the full width of the table plate 22 and are raised and lowered together by the reciprocating movement of the rack bars 70 and 71. The pressure bar 77 vertically slides along the guide faces of angle shaped guide brackets 78, secured to the vertical strut plates 67 and 68, as shown in Figs. 11, 13, 16 and 20. Thus the rack bar 70 and 71 are precisely guided in their vertical movement between the guide rollers 75 and 76 on one side thereof and the guide brackets 78 on the other side thereof, to thereby insure precise shearing movement of the upper shearing blade 66 with respect to the lower shearing blade 64.

The pressure bar 77 resiliently supports a foot bar 79 whose lower surface may be moved into and out of pressing engagement with the head end of the stock sheet S as it rests on the discharge end of the table plate 22. The foot bar 79, as shown in Figs. 11, 13, 15 and 16, is secured to the threaded end of a plurality of spaced bolts 80 slidable in vertical bolt holes in the pressure bar 79. A compression spring 81 embraces each support bolt 80 and is contained within a socket cavity 81' formed in the lower face of the pressure bar 77. The compression springs 81 normally serve to drive the foot bar 79 downwardly away from the lower edge of the pressure bar 77 to the extent permitted by the nuts 80' adjustably threaded to the upper ends of the support bolts 80. The foot bar 79 operates to resiliently press the paper stock sheet S against the discharge end of the table plate 22 during the interval that the upper blade 66 is shearing over the lower blade 64.

When the rack bars 70 and 71 are in maximum raised position, as shown in Fig. 15, the cutting edge 66' of the upper shearing blade 66 is raised some distance above the cutting edge 64' of the lower shearing blade 64, and the foot bar 79 is fully extended by the compression springs 81 to the extent permitted by the bolt nuts 80', the foot bar 79 also being raised out of contact with a head end of the stock sheet S. The mechanism for vertically manipulating the rack members 70 and 71 and the upper shearing knife 66 and pressure bar 77 attached thereto, is such as to permit movement of the advance edge of the stock sheet S to the inner edge of the guide strip 62 during the interval that the foot bar 79 is raised out of holding engagement with the stock sheet.

During the initial down-stroke movement of the rack bars 70 and 71, the foot bar 79 is first brought into pressing engagement against the head end of the stock sheet S an instant before the upper shearing blade 66 has moved into shearing position. The head end of the stock sheet S is thus prevented from further advance movement. Since the pinch rolls 25 and 26 nevertheless continue to draw additional paper stock from the paper roll, the excess stock will collect into an upwardly curving hump $h$, as shown in Fig. 13. This paper hump continues to build up during the shearing interval and the initial upstroke of the rack bars 70 and 71. During the final upstroke movement and the initial down-stroke movement of the rack bars 70 and 71, the foot bar 79 is raised out of holding engagement with the advance end of the stock sheet.

The inherent resiliency of the paper stock which has collected in the hump $p$, acts to snap the lead end of the stock sheet under the raised foot bar 79, and flattens the stock sheet on the table plate 22. The pinch rolls 25 and 26 then advance the leading edge of the stock sheet a final increment into abutment with the guide strip 62 extending along the outer edge of the secondary table plate 61. When the lead end of the stock sheet has been moved substantially into alignment with the inner guide edge of the guide strip 62, the progressive down-stroke movement of the rack members 70 and 71 will again carry the foot bar 79 into pressing engagement against the stock sheet. Continued downward movement of the upper shearing blade 66 severs the rectangular blank from the head end of the stock sheet which overlies the depressed secondary table place 61.

The rack bars 70 and 71 are vertically reciprocated in timed relation to the speed of rotation of the pinch rolls 25 and 26 by driving devices illustrated in Figs. 7, 11 and 16. One end of the pinion supporting shaft 73 projects beyond the exterior face of the vertical strut plate 68 and has a lever 82 attached thereto. The lever 82 has a stud pin 82′ projecting therefrom to which one end of a reciprocator rod 83 is connected. Reciprocating movement of the rod 83 will swing the lever 82 through a predetermined arc so as to rotate the pinion shaft 73 and rack pinions 72′ attached thereto through a predetermined arc of rotation. The lower end of the reciprocator rod 83 is hinged to a stud 84 extending from one end of pivoted lever 85 which extends through a suitable opening cut in the adjacent frame plate 23, as shown in Fig. 16.

The pivot lever 85 is pivotally mounted on a pivot pin 86 which may be suitably secured to adjacent frame member 51. The inner end of the pivot lever 85 is notched to provide spaced fingers 85′. A collar 87 is eccentrically fixed to the adjacent end of the basic drive shaft 49 (heretofore described), the eccentric collar 87 snugly rotating between the finger portions 85′ of the pivot lever 85. Thus, the basic drive shaft 49 rotates the eccentric collar 87 fixed thereto in a manner to rock the pivot lever 85. Rocking movement of the pivot lever 85 serves to reciprocate the rod 83 and thereby rotate the pinion shaft 73 back and forth through a predetermined arc, thus giving the desired raising and lowering movement to the rack members 70 and 71 and the desired stroking movement to the upper shearing blade 66 and associated foot bar 79, all in precise timed relation to the speed of rotation of the pinch rolls 25 and 26.

*Printing mechanism*

Printing mechanism 90 located at the printing station C is provided to print any desired information on the under-face of the rectangular blank $a$ which is deposited on the upper face of the secondary table plate 61. The printing mechanism is shown in general in Figs. 6, 7, and 9 and in more detail in Figs. 10, 11, 13, 17, 18 and 19 of the accompanying drawings.

The printing mechanism 90 includes a printing cylinder 91 which comprises a cylindrical wall 92 having raised rim formations 93 extending circumferentially around the marginal edges thereof, as shown more particularly in Figs. 10, 13 and 17. A flexible printing mat $p$ formed of rubber of the like, carries printing indicia $p'$. The printing mat $p$ is cemented to the outer surface of the cylindrical wall 92 and between the rim portions 93 thereof in the manner so that the printing indicia $p'$ are raised slightly above the surface of the rim portions 93. One end of the cylindrical wall 92 of the printing cylinder is joined by an end wall 94 to a hub portion 95 thereof which is secured as by means of a suitable spline 95′ to the basic drive shaft 49. Web portions 96 radiating from the hub portion 95 to the cylindrical wall 92 provide added strength.

The printing cylinder 91, fixed to rotate with the basic drive shaft 49, is positioned between the side frame members 51 and 52 adjacent to the lower shearing blade 64 with the upper portion thereof extending through an opening 61′ cut in the secondary table plate 61. Thus the under surface of the rectangular blank $a$, advanced along the secondary table plate 61, is contacted by the inked printing indicia $p'$ of the flexible printing mat $p$ as the printing cylinder 91 is rotated.

A blank feeding cylinder 97 is mounted directly above the printing cylinder 91 and is rotatably mounted upon a shaft 98. The feeding cylinder 97 has a tubular body wall presenting a raised arcuate section 99 and a depressed arcuate section 100. As the feeding cylinder 97 is rotated, the rectangular blank is compressed between the raised arcuate wall section 99 thereof and the raised rim portions 93 of the printing cylinder 91 so as to advance the blank therebetween during printing contact of the printing indicia $p'$ with the under face of the blank. The depressed arcuate section 100 is spaced from the raised rim portions 93 of the printing cylinder 91 during continued rotation of the feeding cylinder 97 to permit feeding insertion of the head end of the stock sheet S over the secondary table plate 61 when the upper shearing blade 66 is in raised non-cutting position as indicated in Fig. 15.

The raised arcuate section 99 and the depressed arcuate section 100, which together form the tubular body wall of the feeding cylinder, are connected by an end wall 101 to the hub portion 102 of the feeding cylinder. Strengthening webs 103 extend radially between the hub portion 102 and the tubular body wall of the feeding cylinder to strengthen the construction. The hub portion 102 is rotatably mounted on the normally fixed shaft 98 by ball bearing assemblies 104, as shown in Fig. 13.

Each end of the shaft 98 is supported by a pillow block 105, as shown more particularly in Figs. 13 and 14. One of the pillow blocks 105 is mounted on the inturned ledge portion 69' fixed to the adjacent horizontal bar plate 69. The pillow block 105 at the other end of the shaft 98 is supported on the ledge portion 106' of a vertical strut 106 whose lower end is secured as by suitable spacer bolts 107 to the adjacent frame member 52.

The pillow blocks 105 are provided with pairs of vertical guide bolts 108 and 110, respectively, extending therethrough. The guide bolts 108 associated with one of the pillow blocks 105 have the threaded ends thereof secured to the inturned ledge portion 69', and the guide bolts 110 associated with the other pillow block 105 are threaded at the lower ends thereof into the outturned ledge formation 106' associated with a vertical strut plate 106. The upper end of each of the guide bolts 108 and 110 is provided with a compression spring 109 telescoped thereover and compressed between the upper face of the adjacent pillow block 105 and a threaded nut 108' applied to the upper end of the bolt.

Each end of the shaft 98 is provided with a reduced neck portion 98' which is eccentric to the main body of shaft 98 and is journalled in the adjacent pillow block 105. The resiliently mounted pillow blocks 105 resiliently support the shaft 98 and the feeding cylinder 97 is rotatably mounted thereon, so that when the feeding cylinder 97 is rotated, the raised arcuate body section 99 will resiliently press the upper face of the rectangular blank $a$ against the raised rim portions 93 of the printing cylinder 91. The resilient pressure exerted against the blank $a$ by the raised arcuate section 99 of the feeding cylinder may be adjusted as desired by appropriate positioning of nuts 108'. Raising the shaft 98 to effect release of pressure between feeding cylinder 97 and printing cylinder 91 may be conveniently effected by a hand lever 111 attached to one end of the eccentric projecting ends 98' of the shaft 98.

The feeding cylinder 97 may be rotated during operation of the machine by a sprocket 112 fixed by set screw 112' to a collar 113, eccentric about the shaft 98 and fixed to the end wall 101 of the feeding cylinder 97 as by suitable screws. A suitable drive chain 114 is trained around the sprocket 112 and the sprocket wheel 54 which is splined to the basic drive shaft 49 which supports and rotates the printing cylinder 91. The drive chain 114 is also trained around an adjustable idler sprocket 115 journalled on a stub shaft 116' fixed to a supporting bracket 117 attached to lower edge of adjacent frame member 52, as shown in Figs. 9 and 13. In addition to driving the printing cylinder 91 and the blank feeding cylinder 97, the drive chain 114 may be employed to drive the glue applicator mechanism 150 and the blank feeding mechanism 250, as generally indicated in Fig. 9.

A selected printing ink $i$ is supplied to the printing mat $p$ of the printing cylinder 91 from an ink fountain 120 which is illustrated generally in Fig. 9 and in more detail in Figs. 17, 18 and 19. The ink fountain comprises an ink pot 121 mounted between the frame members 51 and 52 directly below the secondary table plate 61 and directly adjacent the printing cylinder 91. The ink pot 121 rests upon a platform plate 122 secured as by screws 122' to the lower edge of the frame members 51 and 52. The ink pot 121 is rectangular in form, presenting a bottom wall 123, side walls 124 and end walls 125 and 125'. The top of the ink pot 121 may be substantially closed by a closure plate 126 removably secured to the side walls 124 as suitable wing bolts 127.

The ink pot 121 contains a cylindrical ink pickup roll 128 having stub shafts 129 suitably journalled in bearing sleeves 129' set in the adjacent side walls 124 of the ink pot. In riding contact with the cylindrical surface of the ink pick-up roll 128, is an ink transfer roll 130 which is adjustably mounted to roll in contact with the printing indicia $p'$ of the printing mat $p$ when the printing cylinder 91 is rotated. The ink transfer roll 130 is mounted above the ink pick-up roll 128 and overhangs the upper edge 125'' of the adjacent end wall 125' of the ink pot 121.

The ink transfer roll 130 is provided with a stub shaft 131 extending from each end thereof, each suitably journalled in the adjacent side wall 124 of the ink pot 121. The pressure exerted by the cylindrical ink transfer surface of the transfer roll 130 against the printing indicia $p'$ of the printing mat $p$, may be regulated by suitable resilient means, which as shown in Fig. 17, may comprise the provision of weakening slits 132 cut in each pot side wall 124 to define a resilient block section 132' in which the stub shaft 131 of the ink transfer roll 130 is rotatably journalled. A pressure setting bolt 133 may extend through each resilient block section 132', the lower end of the bolt being threaded into the rigid section of the pot side wall 124. By a suitable adjustment of the setting bolts 133, the resilient sections 132' of the pot side walls may be sprung as desired to insure the desired contact pressure between the surface of the transfer roll 130 and the printing face of the mat $p$, and pick-up roll 128.

Means are provided for movably adjusting the ink pot 121 with respect to the printing cylinder 91 to further insure the desired contact pressure between the surface of the ink transfer roll 130 and the printing mat $p$. As shown in Figs. 17, 18 and 19, a pair of adjustable clamp brackets 134 and 135 may be provided to adjustably secure the ink pot 121 to the platform plate 122. The clamp bracket 134 is designed to engage the adjacent end wall 125' of the ink pot and is adjustably secured to the platform plate 122 by means of a pair of bolts 136 each extending through an elongated slot 136' in the horizontal leg of the clamp bracket 134. The other clamp bracket 135 is designed to press against the opposite end wall 125 of ink pot and is secured in position by a pair of wing bolts 137 each threaded into the adjacent end of the platform plate 122. Suitable adjustment of the set bolts 136 and wing bolts 137 permit movement of the ink pot 121 towards or away from the printing cylinder 91 to insure the desired effective ink transfer contact between the ink transfer roll 130 and the printing mat $p$ as mounted on the printing cylinder 91.

Driving means are provided to rotate the ink pick-up roll 128 and the ink transfer roll 130. As shown in Figs. 11, 13, 18 and 19, a driving gear 138 is attached to the basic drive shaft 49 adjacent the frame member 51. The gear 138 meshes with a small transfer gear 139 rotatably mounted on a stub shaft 139' secured to the frame member 51. The transfer gear 139 meshes with a second transfer gear 140 rotatably mounted on a stub shaft 140' also projecting from the frame member 51. The second transfer gear 140 meshes with a gear 141 attached to the adjacent stub shaft 131 extending from the end of the ink transfer roll 130. A larger gear 142 is also fixed to the stub shaft 131 adjacent the gear 141, gear 142 meshing with a gear 143 fixed to the adjacent stub shaft 129 extending from the ink pick-up roll 128.

Rotation of the basic drive shaft 49 thus rotates the ink pick-up roll 128 and the ink transfer roll 130 at relatively low speed through the chain of gears above described. The printing cylinder 91 and the blank advancing cylinder 97 are also driven from the basic drive shaft 49, but can be disconnected from the shaft 49, by an outward pull exerted on the draw bolt 56 applied to the handle 56'' secured thereto.

The driving ratio from the drive shaft 49 to the printing cylinder 91, to the blank advancing cylinder 97, to the ink transfer roll 130, and to the ink pick-up roll 128 is such as to drive these cylinders and rolls at the proper operating speeds and in synchronism with the rotation of the stock pinch rolls 25 and 26 and the reciprocation of the upper shear blade 66.

The gluing mechanism

The gluing mechanism 150 for the rectangular blank is illustrated generally in Figs. 6, 7 and 9 and in more detail in Figs. 20 to 30 inclusive. The gluing mechanism 150 includes a glue container 151 having a downwardly extending discharge spout 152 which feeds a uniform supply of glue g to a glue pocket defined between a pair of adjacent glue filming rolls 153 and 154. The glue container 151 is supported in an inverted position by a horizontal support plate 155 which may be secured in proper elevated position by a bracket 156 attached to the adjacent upright strut 67.

The glue filming rolls 153 and 154 may be contained and protected within a box-like structure having side walls 157 whose lower edges may be secured to the table plate 61 which is supported on the upper edges of the frame members 52 and 51 respectively. The side walls 157 of the glue box are connected by suitable end walls 158 whose lower ends 158' are raised above the path of travel of the blanks a, as shown in Fig. 23. The glue roll 153 comprises a cylindrical casing 159 closed by end wall members 160 fixed to a supporting shaft 161 extending therethrough. Each end of the shaft 161, as shown in Figs. 23 and 24, is rotatably mounted in a bearing sleeve 162, each bearing sleeve 162 being mounted in a collar 163 whose central axis is eccentric to the axis of the shaft 161. Each shaft supporting collar 163 is rotatably mounted in a conformed opening formed in the adjacent side wall 157 of the box structure which encases the glue filming rolls 153 and 154.

The other glue filming roll 154, as shown in Figs. 23 and 25, comprises a cylindrical shell 164 whose ends are closed by end walls 165 fixed to a supporting shaft 166. Each end of the supporting shaft 166 is journalled in a bearing sleeve 167 mounted in the adjacent side wall 157 of the glue box. The adjacent cylindrical surfaces of the glue filming rolls 153 and 154 are substantially in contact to define a V-shaped pocket for the glue g deposited therebetween. Each end of the glue pocket thus formed is closed by a triangular shaped shoe plate 168 supported from the adjacent side wall 157 of the box structure, as shown more particularly in Figs. 28, 29 and 30, by a pair of set screws 169 threaded into the side wall 157. Each set screw 169 has a pin extension 169' which extends into a conforming bore provided in the shoe plate 168. Each shoe plate 168 is thus suspended by the pin extensions 169' from the adjacent side wall 157, and is free to move laterally.

Each shoe plate 168 presents a smooth face surface which is resiliently pressed against the adjacent smooth end faces of the glue filming rolls 153 and 154, thereby substantially preventing loss of glue from the glue pocket defined therebetween. Each side wall 157 is provided with a pair of threaded set screws 170 threaded into a conforming bore 171 therein. Each bore 171 also contains a compression spring 172 which exerts resilient pressure against the shoe plate 168 when the set screw 170 is threaded into the bore 171 in the side wall 157. Thus the compression springs 172 serve to retain the smooth inside face of the shoe plate 168 in resilient pressure contact with adjacent ends of the glue filming rolls 153 and 154.

The thickness of the glue film to be deposited on the upper surface of the rectangular blank by the glue applicator roll 153, is determined by regulating the spacing between the adjacent surfaces of the glue rolls 153 and 154 at the vortex of the glue pocket defined therebetween. The means for providing this adjustment, as shown in Figs. 20, 23, 24 and 25, may comprise a gear wheel 173 fixed to each eccentric collar 163 in which the shaft 161 which supports the glue roll 153 is eccentrically journalled. Each gear wheel 173 is designed to mesh with one of a pair of smaller gear wheels 174 and 174' mounted on opposite ends of a shaft 175 extending parallel to the glue roll shaft 161, and slidably journalled in the side walls 157 of the glue box. The small gear wheel 174' has its hub portion, as shown in Fig. 24, fixed to the shaft 175.

The hub portion of the other gear wheel 174 is slidable on its end of shaft 175 so that it may be placed in and out of mesh with the adjacent larger gear wheel 173. A hand knob 176 carries a pin 177 projecting therefrom and adapted to slidably engage, at all times, an aperture 177' in the adjacent hub of gear 174, the hand knob 176 being fixed to the shaft 175.

A tension spring 178, having one end seated in knob 176 and the other end in gear 174, operates to normally maintain gear wheels 174 and 174' in mesh with the adjacent gears 173. By a rotatable adjustment of either one or both eccentric collars 163, the vortex spacing of glue roll 153 with respect to glue roll 154 may be adjusted to the desired parallel spacing. By rotating the hand knob 176 so as to rotate both of the small gear wheels 174 and 174' in unison, the desired parallel glue film spacing between the two glue rolls 153 and 154 is effected. The right hand end (Fig. 24) of the glue roll 153 may be independently adjusted as to filming thickness by drawing the small gear wheel 174 towards the adjacent hand knob 176 and out of mesh with its larger associated gear wheel 173, and then rotating the hand knob 176 so as to rotate the other larger gear wheel 173 at the right hand end of the glue roller 153 as shown in Fig. 24.

Independent adjustment of the left hand end (Fig. 24) of glue roll 153 may be made by pressing the hand knob 176 towards small gear 174, thus sliding shaft 175 and the small gear 174' fixed thereon to the right. The gear 174' is thus demeshed from its adjacent gear 173 and rotation of hand knob 176 serves only to rotate small gear 174 and adjacent gear 173 at the left end of glue roll 153. By means of the adjusting device above described, either or both ends of the glue roll 153 may be adjusted so as to place the glue filming surface thereof in the desired parallel spaced relation with the filming surface of the glue roll 154 and thereby precisely regulate the glue film thickness to be applied to the upper face of the blank $a$ as it advances thereunder.

It will be noted by referring more particularly to Fig. 1 that the patch of the adhesive $r$ must be precisely applied to the trailing half section of the rectangular blank during its advance through the gluing mechanism 150, and that no adhesive be applied to the leading half section of this blank. It will be noted by referring to Fig. 23, that the glue rolls 153 and 154 are sufficiently elevated so that the flat blank $a$ sliding along the secondary table plate 61 would normally not contact the upper face of the blank. The blank feeding cylinder 97 previously described is of such diameter that the raised arcuate section 99 thereof will grip the rectangular blank at the printing station B and advance the head end of the blank beyond the glue rolls 153 and 154 to the point where the leading end thereof will be gripped by the blank advancing mechanism 250 at the feeding station E, described more fully hereinafter.

Means are provided for elevating the blank $a$, in timed synchronism with the advance movement thereof, into contact with the rotating under surface of the glue roll 153 so as to deposit the adhesive patch $r$ on only the trailing half section thereof, beginning at the mid-line $r'$ and extending over the crimped trailing end $c$ thereof. The blank elevating means, as illustrated generally in Figs. 7 and 9 and in greater detail in Figs. 20 to 35 inclusive, comprises a blank supporting roller 180 whose upper portion is designed to be raised through an opening 61'' in the secondary table plate 6 to elevate the trailing half section of the blank into adhesive contact with the under surface of the glue applicator roll 153. The blank elevating roller 180 has a cylindrical shell 181 whose ends are closed by end walls 182 fixed to a horizontal shaft 183. A pair of yoke bars 184 are positioned between the frame members 51 and 52 of the machine. Each yoke bar 184 is provided with a bearing sleeve 185 at the approximate mid section thereof in which the shaft 183 is journalled, as shown in Figs. 23 and 24. One end of the shaft is within the adjacent frame member 51 and the other end extends through a vertical slot 186 in the other frame member 52, as shown in Fig. 24.

One end of each yoke bar 184 is fixed to a tubular sleeve 187 as shown in Figs. 23 and 25, extending between the frame members 51 and 52. The tubular sleeve 187 contains bearing sleeves 188 journalled on a shaft 189 whose ends extend through the frame members 51 and 52. The other end of the yoke bars 184, as shown in Figs. 20 and 23, are connected by a tie rod 190. The upper end of a vertical reciprocating leg 191 is connected to the approximate center of the tie rod 190 and is maintained in journalled position on the tie rod 190 between a pair of collars 190' fixed to the tie rod. It will be noted by referring to Figs. 20 and 23, that vertical reciprocating movement of the leg 191 serves to pivot the yoke bars 184 on the shaft 189 so as to raise and lower the blank supporting roller 180.

The leg 191 is reciprocated in timed synchronism with the rotation of the blank feeding cylinder 97 and is driven from the basic drive shaft 49 by a cam wheel 192 splined to the basic drive shaft 49, as shown in Figs. 13, 16 and 20. The cam wheel 192 presents a raised cam track section 192' and a depressed cam track section 192''. A pivot bar 193, as shown in Figs. 20 and 22, has arm sections 194 and 195 extending in opposite directions from a connecting bearing sleeve 196. A cam roller 197, rotatably mounted on a stub pin 198, projects from the free end of the arm section 194, the cam roller 197 being designed to roll along the track sections 192' and 192'' of the cam wheel 192. The bearing sleeve 196 is pivotally mounted on a shaft 199 whose ends are mounted in support blocks 200 fixed to the lower edge of the frame members 51 and 52. It will be noted from Fig. 22 that the arm section 194 is connected to one end of the bearing sleeve 196 and the arm 195 is connected to the approximate mid-point of the bearing sleeve so as to extend towards the lower end of the reciprocating leg 191.

The free end of the arm section 195 of the pivot bar 193 carries a U-shaped saddle member 201, as shown in Figs. 20, 21 and 22. The saddle member 201 is secured as by screws 201' to the free end of the arm section 195. A dog member 202 is pivotally mounted between the legs of the U-shaped saddle member 201 on a pin 203 fixed to and extending between the legs. The inner end of the dog 202 supports a compression spring 204 whose upper ends bears against the web portion of the saddle member 201. The other end of the dog 202 projects beyond the end of the saddle member 201 and is provided with a seat portion 205 on which a roller 206 is designed to seat. The roller 206 is rotatably mounted on a stub pin 207 projecting laterally from the lower end of the reciprocating leg 191. A stop pin 208 projecting from each of the side frames 51 and 52 support the yoke bars 184 in their lowermost position, as shown in Fig. 20.

The pivot bar 193 is given a rocking movement as the cam wheel 192 fixed to the basic drive shaft 49 is rotated. As the cam roller 197 rolls over the depressed track section 192'' of the cam wheel 192, the blank elevating roller 180 remains in the depressed position shown in Fig. 20. However, when the cam roller 197 rolls over the raised track section 192' of the cam wheel 192, the blank supporting roller 180 is elevated to press the blank with resilient pressure against the glued surface of the glue applicator roll 153.

Since the blank supporting roll 180 is raised and lowered in time synchronism with the rotation of the basic drive shaft 49, it will be appreciated that objectionable glue would be applied to the surface of the blank supporting roller 180 when in elevated position, if by chance, no blank $a$ were in gluing position between the glue transfer roll 153 and the blank supporting roller 180. Means are accordingly provided to prevent raising movement of the blank supporting roller 180 in the event that no blank is advanced to gluing position between the glue transfer roll 153 and the blank supporting roller 180.

As shown more particularly in Figs. 20, 23 and 25, a blank contact shoe 210 is positioned to overlie the opening 61'' in the secondary table plate 61 and to ride on the blank $a$ advanced thereover. The contact shoe 210 is secured to a bar 211, one end of which extends through a slot cut in the adjacent side wall 157 of the glue box. The bar 211 has an upwardly inclined arm 212 fixed to a contact pin 213 extending into a switch box 214. The contact pin 213 is fixed to a contact element 215 contained in the switch box 214. When the shoe 210 is riding in contact with the blank a positioned thereunder, the contact element 215 is in circuit contact with conventional contact points contained in the switch box 214, thereby providing a flow of current through the circuit wires 217 and 218 leading to a solenoid operated compressed air valve 219. Should no blank arrive at the gluing section, the blank riding shoe 210 will drop a short distance into the opening 61″ of the secondary table plate 61, thereby breaking the circuit between the contact element 215 and the contact points in the switch box and thus deenergizing the solenoid valve 219.

The solenoid valve 219 is supplied with a source of compressed air entering the solenoid valve through pipe line 220, as shown in Fig. 20. When the shoe 210 is supported by a blank a thereunder, the solenoid valve 219 is energized so as to permit compressed air to flow into an air cylinder 221 to drive the piston head 222 therein forwardly against the action of the compression spring 223. The air cylinder 221 may be mounted on the adjacent frame member 52 as by a bracket 221′, and is directly connected to the discharge outlet of the solenoid valve 219. The piston head 222 in the air cylinder 221 has a piston rod 224 fixed thereto which is connected by a coupling 225 to one end of an adjustable connecting rod 226. The other end of the connecting rod 226 is connected by pivot pin 227 to the reciprocating leg 191 which supports the blank supporting roller 180. The connecting rod 226 has an adjustable nut 226′ by means of which its length may be adjusted to provide the proper connection between the piston rod 224 of the air cylinder 221 and the reciprocating leg 191.

When compressed air is permitted to flow from the solenoid valve 219 into the air cylinder 221, the piston head 222 is pushed outwardly against the action of the compression spring 223 so as to maintain the cam roller 206 at the lower end of the leg 191 in seating position on the seat 205 associated with the dog 202 at the end of the pivotal bar 193. However, when compressed air flow to the air cylinder 221 is cut off by the solenoid valve 219 and the conventional valve exhaust port opened to atmosphere, as would be the case when there is no blank to support the shoe 210, the compression spring 223 will drive the piston head 222 inwardly so as to swing the cam roller 206 from its seat 205 on the dog 202. The reciprocating leg 191 is then disconnected from the pivot bar 193 so that rocking movement thereof does not raise or lower the blank supporting roller 180. However, when blank travel under the shoe 210 is restored, the solenoid valve 219 is energized so as to drive the cam roller 206 on to the dog seat 205, so that raising and lowering movement of the blank supporting roller 180 is again effected by the rocking movement of the pivot bar 193.

The glue rolls 153 and 154, and the blank elevating roller 180, are continuously rotated through a train of driving gears, as shown in Figs. 7, 9, 24, 25, 26 and 27. An auxiliary shaft 228 is rotatably mounted in suitable bearings 229 mounted in the frame members 51 and 52 below the blank elevating roller 180. One end of the auxiliary shaft 228 carries a sprocket 230 around which the drive chain 114 is trained. The drive chain 114 is also trained around the sprocket wheel 112 which drives the blank feeding cylinder 97 and around the sprocket wheel 55 which drives the printing cylinder 91 as above described. The sprocket 230 is fixed to a bearing sleeve 231 which rotates on the projecting end of the auxiliary shaft 228. The sprocket 230 has slip clutch connection with a clutch gear 232 fixed to the projecting end of the auxiliary shaft 228 as shown in Figs. 9, 25 and 26. The slip clutch connection may comprise a ball and spring clutch assembly 233 of well known construction, so that when the sprocket 230 is driven by drive chain 114, the clutch gear 232 and the auxiliary shaft 228 to which it is secured are rotated.

The clutch gear 232 meshes with a wide gear 235 having a bearing sleeve 236 which is rotatably mounted on the end of the fixed shaft 189. The fixed shaft 189 is provided with suitable collars 189′ at each end thereof which can be removed to permit removal of the fixed shaft 189. The wide gear 235 meshes with a gear 231 fixed to the end of the rotatably mounted shaft 161 to which the glue roll 154 is secured. The gear 237 in turn meshes with a gear 238 which is fixed to the shaft 161 to which the glue applicator roll 153 is secured. The wide gear 235 is also in mesh with the gear 239 fixed to the end of the shaft 183 to which the blank elevating roller 180 is secured. It will thus be appreciated that rotation of the sprocket 230 by the drive chain 114 rotates the clutch gear 232, which in turn rotates the wide gear 235, the wide gear 235 in turn rotating the gear 237 associated with the glue roll 154, with gear 237 rotating gear 238 connected to the glue roll 153. It will be noted that the gear 238 does not mesh with gear 239 associated with the blank supporting roller 180, gear 239 being rotated directly from the wide gear 235.

It is important that the glue rolls 153 and 154 be continuously rotated to prevent glue hardening, in the event that rotation of the printing cylinder 91 and the blank feeding cylinder 97 is temporarily halted for some minor adjustment (effected by disconnecting the draw bolt 56 from the sprocket 54 which drives the basic drive shaft 49 as heretofore explained). Accordingly, an auxiliary driving device is provided to rotate the glue rolls 153 and 154 at relatively low speed when movement of the drive chain 114 is halted.

As shown more particularly in Figs. 9, 25 and 26, the auxiliary driving device comprises a motor and speed reducer unit 240 whose sprocket 240′ receives an auxiliary drive chain 241 which is trained around a sprocket 242 having a bearing sleeve 243 rotatably mounted on the auxiliary drive shaft 228. The sprocket 242 has a slip clutch connection with an adjacent clutch collar 244 which is secured to the auxiliary shaft 228. A ball and spring assembly 245, as shown in Figs. 25 and 27, may provide the slip clutch connection between the free riding sprocket 242 and the clutch collar 244 which is secured to the auxiliary shaft 223.

When the draw bolt 56 of the continuously driven sprocket 55 is disconnected from the sprocket wheel 54, rotation of the clutch sprocket 230 on the auxiliary shaft 228 is halted, so that the adjacent clutch gear 232 would normally not rotate to drive the glue rolls 153 and 154 and the blank supporting roller 180. The motor and speed reducer unit 240 is however in continuous operation, and serves to rotate the clutch sprocket 242 at lower speed than the normal driving rotation of the clutch sprocket 230. The slip clutch assembly 233 between the sprocket 230 and the clutch gear 232 is so designed as to permit the sprocket 230 to remain stationary on the end portion 228' of the auxiliary shaft 228, when the auxiliary shaft 228 is directly rotated from the slower driven sprocket 242 and its associated clutch collar 244.

Thus it will be appreciated that when clutch sprocket 230 is not driven by the drive chain 114, the more slowly driven sprocket 242 and its associated clutch collar 244 take over and operate to drive the auxiliary shaft 228 and the clutch gear 232 secured thereto. The clutch gear 232 then continues to rotate at a slower speed to drive the wide gear 235 and the train of gears 237, 238 and 239 which rotate the glue rolls 154 and 153 and the blank supporting roller 180 respectively. Continuous rotation of the glue rolls 154 and 153 and the blank elevating roller 180 is thus assured, even though the basic drive shaft 49 of the rectangular blank processing division is not driven. When the complete machine is shut down, as would occur when the desired quantity of blanks have been processed, the glue $g$ is removed from the glue pocket and the glue cleaned from the cylindrical surfaces of the glue rolls 154 and 153.

The motor and speed reducer unit 240, as shown in Fig. 9, may be supported by a bracket 246 attached to legs 247 suspended from the side frames 51 and 61. The legs 247 may also be employed to support a platform 248 on which the speed reducer unit 59 is mounted.

The rectangular blank feeding mechanism

Mechanism 250 is provided at the feeding station E for intermittently feeding the printed and glued rectangular blanks to the winding station where they are wound into container body form during the dwelling interval of the successive winding mandrels 3 at the winding station. The feeding mechanism 250, as shown in Figs. 6 and 7, comprises a feeding device 251 directly adjacent the gluing station D, and a feeding device 270 adjacent the winding station, the feeding devices 251 and 270 operating in timed synchronism with the mechanisms at the stock feeding station A, the shearing station B, the printing station C and the gluing station D.

As heretofore explained, the raised arcuate wall 99 of the blank feeding cylinder 97 cooperates with the rim portions 93 of the printing cylinder 91 to advance the head end $a''$ of the severed blank to a position where it can be gripped by the initial feeding device 251 of the blank feeding mechanism, as is evident by referring more particularly to Figs. 7, 8 and 9. The first feeding device 251, as shown in Figs. 7, 8, 9 and 20, comprises a feeding disc 252 in the form of circular half section which is positioned to rotate at the approximate mid-section of the table plate 61. The semi-circular feeding disc 252 has a hub portion 252' (Fig. 8) fixed to a shaft 253 which is journalled in bearings 254 mounted in upright brackets 255 secured as by bolts 255' to the side guides 62 and 63 and the edges of the table plate 61. The semi-circular feeding disc 252 is continuously rotated by a sprocket 256 around which the drive chain 114 is trained, the sprocket 256 having a hub portion 256' fixed to the projecting end 253' of the disc supporting shaft 253. The semi-circular disc 252 is thus continuously rotated by the driving movement of the drive chain 114 which is trained around its sprocket 256.

As shown more particularly in Fig. 8, a cooperating friction wheel 257 is positioned directly below the semi-circular feeding disc 252, the friction wheel 257 having a rubber tire 258 extending around its circular perimeter. The upper section of the blank gripping tire 258 extends into a slot opening 261 cut in the table plate 61 directly below the semi-circular feeding disc 252. As is indicated in Fig. 8, the blank gripping tire 258 is positioned to press against the under face of blank $a$ as it rests on the table plate 61 between the table guide strips 62 and 63.

The blank gripping wheel 257 has a hub portion 257' which is secured to a horizontal shaft 259 whose ends are journalled in bearings 260 mounted on the parallel extending side frames 51 and 52 of the second section II of the rectangular blank processing division. A sprocket 262, around which the drive chain 114 is trained, has a hub portion 262' fixed to the projecting end 259' of the shaft 259. It will be noted, by referring to Fig. 9, that the drive chain 114 is trained around the sprockets 262 and 256 in a manner to drive the blank gripping wheel 257 and the semi-circular feeding disc 252 in opposite directions, so that the adjacent blank gripping rims thereof will cooperate to advance the rectangular blank $a$ forwardly on the table plate 61 towards the feeding device 270 located adjacent the winding station.

It will be noted, by referring to Figs. 9 and 20, that the semi-circular feeding disc 252 has a semi-circular blank gripping rim 263 which has a length approximately equal to one half the length of the blank $a$ to be advanced thereby. Rotation of the semi-circular feeding disc 252 is so synchronized that the advancing heel 264 thereof will grip the unglued advance end $a''$ of the blank, and the rim 263 of the disc 252 will then operate to advance the blank along the table plate 61 until the trailing heel 265 of the disc 252 reaches the mid line $r'$ of the blank. At this point the semi-circular disc 252 will rotate out of contact with the glue patch $r$ covering the trailing half-section of the blank.

The semi-circular feeding disc 252 rotates in synchronism with the blank advancing cylinder 97 at the printing station C, and with the vertical movement of the blank supporting roller 180 at the gluing station D. As shown in Figs. 6, 7 and 9, the advancing heel 99' of the raised arcuate wall 99 of the blank advancing cylinder 97 engages the blank $a$ at approximately the mid-line $r'$, and the raised arcuate wall 99 of the blank advancing cylinder 97 will then grip the trailing half section of the blank and advance the head end $a''$ until it is gripped by the advancing heel 264 of the semi-circular feeding disc 252. When this occurs, the trailing heel 99'' of the blank advancing cylinder 97 will have released the trailing end $a''$ of the blank $a$, and semi-circular rim 263 of the feeding disc 251 then takes over to grip and forwardly advance the front half section of the blank $a$.

When the mid-line $r'$ of the blank is in vertical alignment with the axis of the glue applicator roll 153 and the blank elevating roller 180 at the gluing station D, the head end of the blank will have been securely gripped between the semi-circular rim 263 of the feeding disc 252 and the blank gripping wheel 257, whereupon the blank elevating roller 180 is raised to press the advancing rear half section of the blank against the glue covered surface of the glue applicator roll 153, beginning at the mid-line $r'$ of the blank. The trailing half section of the blank then is pulled between the glue applicator roll 153 and the raised blank elevating roller 180 by the pulling force exerted on the advance half section of the blank by the rotating feeding disc 252 and the resilient blank gripping tire 258 of the feed wheel 257.

The final feeding device 270 of the blank feeding mechanism is so constructed and arranged as to grip the head end of the blank $a$ when the trailing heel 265 of the semi-circular feeding disc 252 has reached the mid-line $r'$ of the blank. Thus the semi-circular rim 263 of the disc 252 does not contact the glue patch $r$ on the trailing half section of the blank. The final feeding device 270, as shown generally in Figs. 6 and 7 and more particularly in Figs. 9, 31 and 32, comprises a semi-circular feeding disc 271 having a sleeve forming hub 271' which is journalled to rotate on a shaft 272. The shaft 272 is journalled in suitable bearings mounted on upright brackets 274 which are secured along the side edges of the table plate 61 as by bolts 274'. The shaft 272 is rotated by a sprocket 275 around which the drive chain 114 is trained, the sprocket 275 having a hub portion 275' which is fixed to the projecting end portion of the shaft 272.

Means are provided to resiliently connect the semi-circular feeding disc 271 to the shaft 272, comprising an arm 276 having one end thereof fixed to the shaft 272 as by set screw 277. The arm 276, which rotates with the shaft 272, has a laterally extending pin 278 which normally abuts against a flat edge 279 adjacent the following heel 280 of the semi-circular feeding disc 271. Thus, as the shaft 272 is rotated by sprocket 275 in the direction of the arrow shown in Fig. 31, the pin 278 carried by the rotating arm 276 will abut against the flat edge 279 of the semi-circular disc 271 and rotate the disc 271 with the shaft 272. A tension spring 281 has one end thereof connected to the projecting end 278' of pin 278 and the other end thereof secured to a pin 282 fixed to and extending from the side face of the semi-circular disc 271. The tension spring 281 serves a purpose which will be presently explained.

A friction wheel 285, which has a rubber tire 286 encircling the circular rim thereof, is positioned directly below the path of rotation of the semi-circular disc 271, with the upper portion thereof extending through a slot 283 cut in the table plate 61. As shown in Figs. 31 and 32, the blank gripping tire 286 contacts the under surface of the blank $a$ as it rests upon the table plate 61 between the guide strips 62 and 63 thereof. The friction wheel 285 is journalled on a shaft 288 positioned below the table plate 61, the shaft 288 being journalled in suitable bearings mounted in the side frames 51 and 52 of the machine. The shaft 288 is rotated by a sprocket 290 around which the drive chain 114 is trained, the sprocket 290 having a hub portion 290' fixed to the projecting end 288' of the shaft 288.

The blank gripping wheel 285 is fixed to the approximate mid-section of the shaft 288, directly below the path of rotation of the semi-circular feeding disc 271. A semi-circular quadrant 292 has a hub portion 293 which is fixed to the shaft 288 as by set screw 293'. A pin 294 is fixed to and extends laterally from the side face of the friction wheel 285 and is so positioned that the advancing straight edge 292' of the quadrant 292 will bear against the pin 294 when the shaft 288 is rotated in the direction of the arrow shown on Fig. 31. One end of a tension spring 295 is secured to the pin 294, the other end of the tension spring 295 being secured to a stud pin 296 projecting radially from the hub portion 293 of the quadrant 292.

The drive chain 114 is trained around a guide sprocket 297 rotatably mounted on a stud pin 298 projecting from the adjacent frame member 52 of the machine, as shown in Fig. 9. The drive chain 114 is also trained around the sprockets 290 and the sprocket 275 in a manner to rotate the friction wheel 285 and the semi-circular feeding disc 271 in opposite directions. Thus the advance half section of the blank $a$ is gripped between the arcuate rim of the semi-circular disc 271 and the tire covered friction wheel 285 so as to advance the blank forwardly over the downwardly curved platen 299 until the head end of the blank is gripped between the cylindrical parts of the winding mandrel 3 and the adjacent pressure rollers 13 in residence at the winding station.

The peripheral speed of rotation of the mandrel 3 is considerably greater than the peripheral speed of rotation of the semi-circular feeding disc 271 and the blank gripping wheel 285. Accordingly, when the head end of the blank has been positively gripped between the winding mandrel 3 and the pressure roller 13 of the blank winding mechanism, the blank is pulled forward at greater speed against the resilient drag exerted on the blank which is still pinched between the arcuate rim 280' of the semi-circular feeding disc 271 and the friction wheel 285. The tension springs 281 and 295 permit the feeding disc 271 and friction wheel 285 to rotate at greater speed than the rotative speed of the shafts 272 and 288 on which they are journalled, when blank pull is exerted on the head of the blank by the winding mandrel 3. The tension springs 281 and 295 also insure tight and compact winding of the blank on the winding mandrel 3.

Rotative movement of the semi-circular feeding disc 271 is synchronized with the rotative movement of the initial feeding disc 252 in a manner so that when the trailing heel 265 of the disc 252 meets the mid-line $r'$ of the blank, the peripheral rim 263 of the disc 252 will swing free of the blank and the advancing heel 280'' of the final feeding disc 271 will engage the head end of the blank. The semi-circular rim 280' of disc 271 will then roll against the unglued advance half-section of the blank until the head end of the blank has been partially wound on the winding mandrel 3, whereupon the following heel 280 of the disc 271 will swing out of contact with the blank at the approximate midline $r'$ of the blank.

The blank feeding mechanism 250 at the feeding station E thus operates to insure the intermittent advance of the successive printed and glue blanks into winding engagement with the winding mandrels 3 during the interval of dwell of the mandrels at the winding station. The semi-circular blank feeding discs 252 and 271 are also driven in timed synchronism with the shearing mechanism 60 at the shearing station B, with the printing mechanism 90 at the printing station C, and with the gluing mechanism 150 at the gluing station D, so as to insure the shearing, the printing, and the gluing of the blanks, and the feeding of the successively prepared blanks, in timed synchronism.

As heretofore explained, movement of the drive chain 114 may be halted by manual manipulation of the draw bolt 56 shown in Fig. 13, to thereby halt the rotation of the blank advancing cylinder 97, the reciprocating movement of the upper shearing blade 66, and the rotation of the semi-circular feeding discs 252 and 271; in which event the motor and speed reducer unit 240 takes over to continue the rotation of the glue rolls 153 and 153 so as to prevent glue hardening on the glue roll surfaces during a temporary halt in blank advance.

The rectangular blank processing division of the machine is thus substantially fool-proof in operation, readily controlled to meet all operating requirements, and may be geared and adjusted to insure the complete preparation of the blanks, including the scoring, cutting, printing and gluing thereof, and the synchronized feeding of the successive prepared blanks to the winding mandrels in timed synchronism with the various operating mechanism associated with the container shaping and forming divisions of the machine, described in our Patent Nos. 2,642,784 and 2,642,785.

*Stock feed for the arcuate blanks*

The arcuate blank processing division of the machine is shown in plan view in Fig. 6 at the right hand side of the rectangular blank processing division, and its mechanisms are driven from the main shaft section 19' which is connected by the universal coupling 19'' to the adjacent end of the shaft section 19 which drives the mechanism associated with the rectangular blank processing division. The arcuate blank processing division may be considered as comprising a first section III arranged at an acute angle to a second section IV as shown in Fig. 33.

The first section includes mechanism 330 at station F for intermittently advancing a predetermined length of the stock sheet S-1 to the blank cutting mechanism 380 at station G, and mechanism 410 at station H for stripping the cut arcuate blank *b* from the surrounding sheet stock.

The first section III embraces supporting framework comprising side frame members 300 and 301 which are spaced to conveniently receive the stock sheet S-1 therebetween. The side frame members 300 and 301 are supported at a convenient elevation on suitable legs which rest on the floor, comprising a pair of forward legs 302 and 303, and a pair of rear legs 304 and 305. The supporting legs 302, 303, 304, and 305, as shown in Figs. 6, 33, 34 and 35, are suitably secured to the adjacent side frame members 300 and 301. These legs may be channel shaped in cross section and extend some distance above the side frames 300 and 301. A heavy I-beam member 307 extends between the side frames 300 and 301 and is secured as by suitable bolts to the legs 304 and 305. An end stiffening plate 308 extends between and is secured to the adjacent rear ends of the side frames 300 and 301 as by bolts 308' as shown in Figs. 33, 34 and 35.

The driving means for the first section III and the second section IV of the arcuate blank processing division comprises a gear box 309 secured by bolts 309' to the adjacent rear leg 304, the gear box 309 providing a journal support for the end of the main drive shaft section 19' as shown in Figs. 6, 33 and 34. The end of the main drive shaft section 19' has a beveled gear 310 secured thereto which is housed within the gear box 309. The beveled gear 310 drives a vertically extending basic drive shaft 311, as shown more particularly in Fig. 34. The main drive shaft 311 has a beveled gear 312 attached to the lower end thereof which is housed within the gear box 309 and meshes with beveled gear 310. The lower end of the basic drive shaft 311 is journalled in a suitable journal box 313 forming a part of the gear box 309. The gear box 309 may be provided with a removable cover plate 314 secured by removable bolts 314' whereby convenient access may be had to the beveled gears 310 and 312 contained within the gear box 309.

The upper end of the basic drive shaft 311 carries a drive worm 315 which meshes with a worm gear 316. The worm gear 316 is detachably fixed to the projecting end of a drive shaft 317 journalled in suitable bearings 318, each bearing being mounted in a bearing block 318' secured as by bolts 318'' to the upper ends of the adjacent rear supporting legs 304 and 305, as shown more particularly in Figs. 6, 33, 34 and 37. The upper end of the vertical extending basic drive shaft 311 is journalled in a pair of spaced bearings 319 and 320 located at the opposite ends of the drive worm 315, as shown in Fig. 34. The lower bearing 319 is mounted in a bracket 321 attached as by bolts 321' to the lower edge of a horizontal strut 322 whose ends are fixed to the upper ends of the adjacent supporting legs 302 and 304. The top bearing 320 is also supported in a bracket 323 which is fixed by bolts 323' to the upper edge of the horizontal strut 322.

Thus the lower end of the basic drive shaft 311 is journalled for rotation in the journal associated with the lower journal box 313, and the upper end of the vertical shaft 311 rotates in the upper journal supporting brackets 321 and 323. The basic drive shaft 311 may also be provided with a journal collar 324 fixed thereto which rides on the inner raceway of the lower bearing 319 to thereby support the shaft 311 in its proper vertical position.

The drive shaft 317, driven from the vertically extending basic shaft 311, is operatively connected to drive the stock sheet advancing mechanism 330 at station F and the blank cutting mechanism 380 at station G which will presently be described. Means are provided to manually disconnect the continuously driven vertical shaft 311 from the horizontal drive shaft 317 which means may comprise an arm 325 whose hub portion 325' is keyed to the end of the horizontal shaft 317. The arm 325 has a draw bolt 326 extending therethrough as shown in Figs. 34 and 37. The end of the draw bolt is designed to extend in a bore hole 327 formed in the worm gear 316 which idles on the shaft 317. Suitable means such as a spring pressed ball assembly 328 extending into a groove 329 in the shank of the draw bolt 326, may be used to releasably retain the draw bolt 326 in or out of driving engagement with the worm gear 316.

The mechanism 330 for intermittently advancing a predetermined sectional length of the stock sheet S-1 to the blank cutting mechanism 380 is driven from the horizontal shaft 317, which shaft is continuously rotated by the basic drive shaft 311 connected to the main drive shaft section 19' through the driving connections above described.

The stock sheet S-1 is supplied from a stock roll carried on a roll core 331, as shown in Fig. 6, rotatably mounted on a suitable axle shaft 332 supported from the floor on a suitable supporting cradle. The stock sheet is drawn from the roll by means of a pair of cooperating pinch rolls 333 and 334 as shown in Figs. 33, 34, 35, 36, 39 and 40. The pinch rolls 333 and 334 are supported at one end thereof by an upper bracket arm 335 and a lower bracket arm 336, and the other end thereof is supported by an upper bracket arm 335' and a lower bracket arm 336'. The upper arms 335 and 335' and the lower arms 336 and 336' are secured in spaced relation to a bracket plate 337 which may be secured as by bolts 337' to the adjacent end plate 308 of the machine.

The pinch roll 334 (Fig. 36) has a stub shaft 334' extending from each end thereof, each stub shaft 334' being journalled in a bearing block 338. One of the bearing blocks 338 is slidably supported between the upper and lower bracket arms 335 and 336, and the other bearing block 338 is slidably supported between the upper and lower bracket arms 335' and 336'. Thus the pinch roll 334 may be horizontally moved for a purpose which will presently appear. The companion pinch roll 333 also has a stub shaft 333' extending from each end thereof, each stub shaft being rotatably mounted in a bearing block 339. One of the bearing blocks 339 is positioned between the upper and lower bracket arms 335 and 336 and is secured thereto as by bolts 340 and 341, as shown in Figs. 39 and 40. The other bearing block 339 is positioned between the upper and lower bracket arms 335' and 336' and is likewise secured thereto as by bolts 340' and 341'.

Means are provided for resiliently maintaining adjacent faces of the pinch rolls 333 and 334 in pinching engagement with the stock sheet threaded therebetween, as shown in Figs. 34, 35, 36 and 39. Each bearing block 339 which supports the pinch roll 333 has a pair of horizontal bore holes 342 through which the shanks of elongated bolts 343 extend. The end 343' of each bolt 343 is threaded into the adjacent bearing block 338 which supports the pinch roll 334. A compression spring 344 embraces the projecting end of each bolt 343, one end of each compression spring 344 seating against the face of the bearing block 339 and the other end of the compression spring seating against the flange of an adjustable nut 345 threaded to the projecting end of the bolt 343. The compression springs 344 serve to draw the bearing blocks 338 toward the companion bearing blocks 339 so that the adjacent faces of the pinch rolls 334 and 333 will exert a predetermined pinching pressure on the stock sheet drawn therebetween.

To facilitate unreeling of the stock sheet from the stock roll and to guide the stock sheet to the pinch rolls 333 and 334, a horizontally extending guide rod 346 is positioned below the pinch roll 334, the rod 346 being rotatably supported at each end thereof by downwardly extending brackets 347, one of the brackets 347 being secured to the lower bracket arm 336 and the other bracket 347 being secured to the other lower bracket arm 336', as shown in Figs. 35 and 40.

A swingably mounted rod 348 extends horizontally above the fixed rod 346, but below the pinch rolls 333 and 334 as shown in Figs. 35 and 40. The guide rod 348 is rotatably supported at each end thereof by a vertically extending arm 349. The upper end of each arm 349 is secured to the adjacent end of a shaft 350 rotatably journalled in brackets 351. One of the bearing brackets 351 is secured as by bolts 340 to the upper bracket arm 335, and the other bearing bracket 351 is secured as by the bolts 340' to the other upper bracket arm 335'. Thus the arms 349 are free swing with the rocking movement of the shaft 350, permitting rod 348 supported between the arm 349 to be swung into and out of contact engagement with the stock sheet S-1.

The suspended arms 349 and associated sheet guiding rod 348 are given a positive swinging movement by means of a cam roller 352 rotatably mounted on a stub shaft 353 fixed to one of the arms 349 as shown in Figs. 35 and 39. The cam roller 352 is designed to roll in contact with the cam surface of a cam member 354 which is fixed to the projecting end of one of the stub shafts 333' of the pinch roll 333 and rotates therewith. It will be noted by referring to Fig. 35, that the cam member 354 has a semi-circular track section 354' which serves to maintain the guide rod 348 in the position shown in full lines in Fig. 34, and a flat track section 354'' which permits the stock guiding rod 348 to swing to the dotted line position shown in Fig. 35. Rotation of the cam member 354 along the rotation of the pinch rolls 333 and 334 serves to periodically swing the stock sheet guide bar 348 into and out of pressing engagement with the stock sheet S-1 so as to facilitate the withdrawal of the stock sheet from the stock roll and thus reduce the pull load on the pinch rolls 333 and 334.

One of the stub shafts 333' of the pinch roll 333 has a sprocket 355 mounted thereon, as shown in Figs. 34, 39 and 40. The sprocket 355 is driven by a drive chain 356 which is trained around a sprocket 357 fixed to one end of a shaft 358 which is driven from the shaft 317 in a manner hereinafter described. The sprocket 355 is connected to the stub shaft 333' through a snubber spring assembly 359 so as to provide for driving resiliency in the unreeling of the stock sheet from the stock roll. The stub shaft 333' at the other end of the pinch roll 333 has a gear 360 secured thereto, as shown in Figs. 39 and 40, the gear 360 meshing with an adjacent gear 361 fixed to the adjacent stub shaft 334' of the companion pinch roll 334. Thus the gears 360 and 361 provide a positive driving connection between the pinch rolls 333 and 334, both of which are resiliently driven from the sprocket 355 at the other end of the pinch roll 333 through the snubber spring assembly 359.

The advancing end of the stock sheet is payed out by the pinch rolls 333 and 334 and advanced through an elongated slot 362 in the end plate 308 as shown in Fig. 35. The advance section of the stock sheet is given an intermittent advanced movement by two or more advancing discs 365 whose hub portions 365' are fixed in spaced relationship along the shaft 358, as shown in Figs. 35, 37 and 39. The shaft 358 is journalled in bearings 366 mounted on the side frames 300 and 301 of the machine. The shaft 358 is continuously rotated by a sprocket 367 secured to the reduced end portion 358' thereof. A drive chain 370 is trained around the sprocket 367 and a sprocket 371 secured to the projecting end portion 317' of the drive shaft 317, as shown in Figs. 34, 35 and 37. Rotation of the basic drive shaft 311 thus serves to rotate drive shaft 317 through the driving connection provided by the drive worm 315 and the worm gear 316, and rotation of shaft 317 in turn rotates the disc supporting shaft 358 through drive chain 370 and associated sprocket 371 and 367; the disc shaft 358 in turn rotating the pinch rolls 333 and 334 through the driving connection provided by drive chain 356 and associated sprocket 357 and 355.

A stock sheet supporting shaft 372 is positioned directly below the disc shaft 358 and its ends are rotatably mounted in suitable bearings 373 fixed on the side frames 300 and 301. The stock sheet supporting shaft 372 has a pair of friction wheels 374 fixed thereto positioned directly below the stock sheet advancing discs 365, as shown more particularly in Figs. 35 and 37. Each of the friction wheels 374 carries a resilient tire 375 on the periphery thereof which provide friction support for the advancing end of the stock sheet resting thereon. The end portion 372' of the shaft 372 has a gear 376 secured thereto which meshes with a gear 377 fixed to the adjacent end portion 358'' of the disc shaft 358, as shown in Figs. 34 and 37. Rotation of the disc shaft 358 serves to rotate friction wheel shaft 372 through the intermeshing gears 377 and 376 in the manner so that the head end of the stock sheet will be gripped between and advanced by the rotation of the friction wheels 374 and the cooperating stock sheet advancing discs 365.

It will be noted by referring to Fig. 35 that each of the stock sheet advancing discs 365 presents a raised arcuate section 378 and a depressed arcuate section 379. During rotation of the discs 365, the head end of the stock sheet is pinched between the raised rim section 378 of the discs 365 and the tires 375 of the friction wheels 374 therebelow. The raised rim section 378 is of such length as to advance a sufficient sectional length of the stock sheet to permit cutting of a complete arcuate blank from the advanced sheet section at the cutting station G located directly in advance of the stock sheet advancing discs 365. The depressed rim sections 379 of the sheet advancing discs are so shaped as to have no contact with the stock sheet when the advancing discs 365 are rotated, so that the head end of the stock sheet does not advance during the interval that the depressed rim sections 379 rotate adjacent the stock sheet. Thus the stock sheet advancing discs 365 cooperate with the friction wheels 374 therebelow to intermittently advance predetermined sectional lengths of the stock sheet in synchronism and as required by the operation of the blank cutting mechanism 380.

It will be noted that the pinch rolls 333 and 334 are continuously rotated at predetermined speed so that a section of the stock sheet will hump up above the pinch roll 334 during the interval that the rotating discs 365 are not in driving contact with the head end of the stock sheet, the forward section of the stock sheet being held in fixed position by a pressure plate 411 hereafter described. The sheet slack gathered into the hump is drawn forward and the hump straightened when the raised arcuate rims 378 of the advancing discs 365 are rotated into driving engagement with a head section of the stock sheet.

*The arcuate blank cutting mechanism*

The arcuate blank cutting mechanism 380 located at the cutting station G comprises a heavy anvil block 381 which rests upon the I-beam 307, as shown in Figs. 35 and 37. The anvil block supports a plate 382 of relatively soft steel which extends between the side frames 300 and 301 of the machine. The head end of the stock sheet S-1 is intermittently advanced to rest flatly on the top face of the plate 382, as shown in Fig. 35.

Means are provided for accurately leveling the stock sheet receiving face of the plate 382, which leveling means may comprise a series of spaced leveling bolts 383 which are threaded into the top flange of the I-beam 307, with the ends of the bolts pressing against the under face of the anvil block 381. The leveling bolts 383 may be provided with suitable lock nuts 384 to maintain the bolts 383 in adjusted position when the stock sheet supporting plate 382 has been leveled as required. A second series of bolts 385 extend through the upper flanges of the beam 307 and are threaded into the under face of the anvil block 381 to securely hold the anvil block 381 in its leveled position on the beam 307.

A heavy pressure block 386 is suspended directly over the stock sheet supporting plate 382 and the anvil block 381 and is designed to have a vertically reciprocating and tilting movement. The pressure block 386 is suspended from the shaft 317 located directly above the pressure block, as shown more particularly in Figs. 35, 37 and 38. A pair of suspension yokes 387 each provide an internal raceway for a bearing assembly 388 which rolls around an eccentric collar 389 fixed to the shaft 317 as by set screw 390. Rotation of the shaft 317 and the eccentric collars 389 fixed thereto serves to raise and lower the yokes 387 with each rotation of the shaft 317. Each yoke 387 has a downwardly extending stem 391 whose lower end is pivotally connected to a U-shaped bracket 392. The lower end of each stem extends between the legs 393 of the bracket and is secured thereto by a hinge pin 394. The base portion 395 of each bracket is secured as by bolts 395' to the upper face of the pressure block 386. The pressure block 386 is thus rockably suspended from the yokes 387. The pressure block 386 may have a vertical stroke of approximately one inch.

The vertical stroking movement of the pressure block 386 is guided by a pair of pivot arms 396, each having one end thereof fixedly secured by bolts 396' to the adjacent end of the pressure block 386. The other end of each pivot arms 396 is journaled on the neck portion of a headed stud 397, as shown in Figs. 35 and 39. Each stud 397 is fixed to a bracket 398 secured as by bolts 398' to the adjacent end frame plate 308. Thus the pressure block 386, as guided by the pivot arms 396, has a slight rocking movement as centered by the stud pins 397, as it reciprocates vertically.

The under face of the pressure block 386 has a platen plate 400 which may be advantageously made of tough wood, secured to the under face of the pressure block 386 as by screws 401. As shown generally in Figs. 33 and 35, and more particularly in Figs. 41, 42 and 43, a continuous cutting blade 402, contoured to the shape of the arcuate blank to be cut, is partially embedded in and secured to platen plate 400. The cutting edge 402' thereof extends below the lower face of the platen plate 400 for approximately ¼ of an inch or less. The arcuate blank cutting blade 402 is relatively thin and is made of cutlery steel so that its sharp cutting edge 402' will cut the arcuate blank from the advance section of the stock sheet as it is flatly supported upon the relatively soft steel plate 382 which rests on the anvil block 381 therebelow. The rocking movement of the pressure block 386 and the blade 402 supported thereby facilitates the cutting of the blank.

A plurality of resilient buttons 403, made of soft rubber or the like, are cemented to the platen plate 400 and are arranged at spaced intervals along the cutting edge 402' and the arcuate cutting blade 402. The resilient buttons 403 are preferably arranged in closely adjacent pairs between which the blade extends. When the pressure block 386 is in raised position, the resilient buttons 403 are normally expanded so that the adjacent portion of the cutting edge 402' is retracted into the space between each pair of buttons, as shown in Fig. 42. However, when the cutting edge 402' of the arcuate cutting knife 402 is pressed into the cutting engagement with the stock sheet S-1 as shown in Fig. 43, the resilient buttons 403 will be compressed. The resilient buttons 403 will expand into expanded form when the pressure block 386 is raised, to thereby push the cut stock sheet S-1 from the cutting blade 402 and prevent the cut stock sheet from clinging to the blade, leaving the cut stock sheet flatly resting on metal supporting plate 382.

The vertical reciprocating movement of the pressure block 367 and its associated cutting blade 402 is synchronized with the speed of rotation of the stock sheet advancing discs 365 so that the advancing discs 365 will advance a predetermined sectional length of the stock sheet into cutting position upon the anvil plate 382.

During the interval that the cutting blade 402 associated in the pressure block 386 is performing its blank cutting function, the stock sheet advancing discs 365 are out of contact with the stock sheet and the head section of the stock is not then advanced. However, when the cutting blade 402 is raised out of contact with the stock sheet, the advancing discs 365 operate to advance the cut section of the stock forwardly of the anvil block 381 and place the following uncut section of the stock sheet on the anvil plate 382.

*Arcuate blank stripping mechanism*

The cut made in the advance section of the stock sheet by the cutting blade 402 defines the marginal edges of the arcuate blank *b*, but the thus cut arcuate blank still clings to the surrounding sheet stock. Mechanism 410 is accordingly provided to separate and lift the arcuate blank *b* from the surrounding paper stock when the cut section of the stock sheet is advanced temporary residence position at the blank stripping station H. During the interval that one advance section of the stock sheet S-1 is being cut at the cutting station G previously described, and the further advanced section of the stock sheet is being stripped of its arcuate blank at the stripping station H, the advance sections of the stock sheet must be held in stationary position.

As shown generally in Figs. 6, 7 and 33, and more particularly in Figs. 34, 35 and 37, the arcuate blank stripping mechanism 410 includes a reciprocable device for holding the advance sections of the stock sheet stationary during the cutting and stripping interval. The stock sheet holding device includes a pressure plate 411 positioned directly above the cut section of the stock sheet as advanced to residence position directly in the advance of the blank cutting station G. The pressure plate 411 may have any convenient shape, and as shown in Fig. 33 has a generally triangular portion and a strip portion 411' extending from the triangular portion. The anvil plate 382 supported on the anvil block 381 has an extension 382' which extends forwardly beyond the anvil block as shown in Fig. 35. The overlying pressure plate 411 has a vertical reciprocating movement and when downstroked will press against the cut section of the stock sheet.

Means are provided to vertically reciprocate the pressure plate 411, comprising a vertically extending post 412 whose lower end is secured to a block 413 attached to the pressure plate 411 as by suitable bolts 414. The post 412 is designed to reciprocate vertically in a guide block 416 which is attached as by bolts 417 to the upper edge of a wall plate 418. As shown in Figs. 6, 33, 34 and 35, the wall plate 418 may be secured at one end thereof as by a bracket 419 to the adjacent front vertical leg 302 of the machine. The wall plate 418 extends at a biased angle with respect to longitudinal mid-line of the first section III of the arcuate blank processing division, as is shown in Fig. 33. The other end of the wall plate may be secured to the rear post leg 305. One edge of the pressure plate 411 extends under and slightly forwardly of the free lower edge 418' of the wall plate 418, as shown in Figs. 33 and 35.

The pressure plate manipulating post 412 is embraced by a compression spring 420, the lower end thereof seating against the top face of the pressure plate attaching block 413 and the upper end thereof seating against the under face of the superimposed guide block 416. The compression spring 420 normally operates to drive the pressure plate downwardly into pressing engagement with the cut stock sheet positioned therebelow.

Automatic means, manipulated from the horizontal shaft 317 as shown in Figs. 33, 35 and 37 is provided for periodically lifting the pressure plate 411 and its associated post 412 in timed synchronism with the vertical reciprocation of the pressure block 386. The pressure plate lifting means comprises a cam member 421 whose hub portion 421' is fixed to the approximate mid-section of the shaft 317. A cam roller 422, designed to roll over the track forming rim of the cam member 421, is rotatably mounted on the end of a lever 423 which is fulcrumed on a hinge pin 424 extending through the approximate mid-section of the lever. The hinge pin 424 is supported by a pair of spaced bracket arms 425 which are secured as by screws 425' to the guide block 416. The upper end of the post 412 has a vertical slot defining legs 412' between which a roller 426 is rotatably mounted on pin 426'. The end portion 423' of the lever 423 extends through the slot defined between the legs 412' of the post 412, with the upper edge of the lever 423 seating against the roller 426. Pivoting movement of the lever 423 serves to reciprocate the post 412 and its associated pressure plate 411.

The cam rim of the cam member 412 presents a semi-circular track section 427, as shown in Fig. 35, which serves to maintain the pressure plate 411 in elevated position during approximately one-half of the rotating interval of the shaft 317, during which interval the cutting blade 402 is also in raised non-cutting position. The cam member 412 is also provided with a depressed track section 428 which permits the compression spring 420 to drive the pressure plate 411 downwardly in pressure holding contact with the cut section of the sheet stock as the shaft 317 completes its revolution and the cutting knife 402 is moved into and out of cutting engagement with the stock sheet. During the interval that the cutting blade 402 and the pressure plate 411 are in raised position, the stock sheet advancing discs 365 operate to advance the cut section of the stock sheet forwardly from under the pressure plate 411 to residence position for stripping, the cut blank section next following being then advanced to residence position under the pressure plate 411, and simultaneously the next following uncut stock sheet section is advanced to residence position under the cutting blade 402.

Means are provided at the blank stripping station H for vertically stripping the cut arcuate blank b from the surrounding sheet stock, as shown in Figs. 33, 34 and 35. A table plate 430 is horizontally mounted directly above the front edge of the pressure plate 411. The table plate may be secured by means of brackets 431 to the front legs 302 and 303 of the machine and terminates in a front edge 430' normal to the side frames 300 and 301. The rear edge of the table plate 430 rests upon a suitable flange 432 secured to the lower edge 418' of the wall plate 418. The table plate 430 has an opening 433 cut therein whose edge contour conforms in general shape to the arcuate blank, the opening being slightly larger than the arcuate blank to be stripped, as shown in Fig. 33.

The cut arcuate blank is advanced into registry with the opening 433 in the overlying table plate 430. The anvil plate extension 382' terminates in a front edge 382" in alignment with the front edge 430' of the overlying table plate 430 as shown in Figs. 33 and 35. The anvil plate extension 382' also has an opening 434 whose edge contour substantially conforms with the shape of the arcuate blank, the openings 434 and 433 being substantially in vertical alignment.

Means are provided for vertically lifting the arcuate blank from the surrounding sheet stock as the sheet stock is pressed against the anvil plate extension 382' by the pressure plate 411. A stripper plate 435 is provided having an edge contour which is substantially similar to but smaller than the edge contour of the arcuate blank. The stripper plate 435 is vertically manipulated through the opening 434 in the anvil plate extension 382' and into the opening 433 in the overlying table plate 430, so as to place the arcuate blank stripped from the stock sheet in the plane of the upper surface of the table plate 430, as shown in Figs. 33 and 35.

The means for vertically manipulating the blank stripper plate 435 comprises a pair of arms 436 pivotally secured at one end thereof to stud pins 437 extending inwardly from the support legs 304 and 305. The lifting arms 436 extend forwardly of the anvil block 381 and their free ends are connected by a cross bar 438. A bracket 439 is secured to the approximately mid-section of the cross bar 438, the bracket 439 also being secured as by suitable screws 439' to the approximate center of the blank stripping plate 435.

The stripping plate 435 is normally maintained at an elevation slightly below the plane of the anvil plate extension 382', by a tension spring 440 whose upper end is secured as by an eyelet 441 to the under side of the cross bar 438 and its lower end is secured as by an eyelet 442 attached to a suitable strut 443 associated with the machine framework. A pivot stud 444 is secured to an approximate mid-section of one of the lifting arms 436, as indicated in Figs. 33, 34 and 35. The stud 444 has a cam roller 445 rotatably mounted thereon, the cam roller 445 being held in rolling contact with the track periphery of a cam member 446 by the tension spring 440.

The cam member 446 is secured to the approximate mid-section of a horizontal shaft 447. The ends of the shaft 447 are journalled in the side frames 300 and 301 of the machine, and one of the projecting end portions 447' of the shaft 447 carries a sprocket 448, as is shown in Figs. 33 and 34. A drive chain 449 is trained around the sprocket 448 and a sprocket 450 fixed to the projecting end portion 372' of the stock sheet supporting shaft 372, as shown in Figs. 33, 34 and 37. Thus the cam member 446 is rotated in timed synchronism with the rotation of the stock sheet advancing discs 365.

The cam member 446 has a track forming rim, as indicated in Figs. 34 and 35, comprising a raised track section 452 which raises the lifting arms 436 upwardly during rotation of the shaft 447 so as to raise the stripper plate 435 into stripping contact with the cut arcuate blank b and thence to elevate the blank to the top surface level of the table plate 430, which lifting operation is performed while the arcuate blank is in residence alignment with the opening 433 in the table plate 430 and the opening 434 in the anvil plate extension 382'. The cam member 446 also has a depressed track section 453 which permits lowering of the blank stripping plate 435 as influenced by the tension spring 440, the stripping plate 435 being in residence at its depressed position as shown in Fig. 35 during the interval of advance of the stock sheet. The stock sheet waste w remaining after the arcuate blank has been removed therefrom, moves off the front end 382'' of the anvil plate extension 382', and drops to the floor so that it in no way interferes with the operation of the machine.

To prevent curling of the heels of the arcuate blank after its removal from the stock sheet, a pair of suction holes 454 are provided in the heel portions of the arcuate stripper plate 435 so that the arcuate blank will be flatly held thereon during its elevation to the level of the superimposed table plate 430. Each suction hole 454 has a downwardly extending nipple 455 to which a flexible suction hose 456 is connected. The lower end of each suction hose 456 is connected to the nipple 457 of a suction line 458.

The suction line 458 is in turn connected to an air valve 459 having a supply line 460 connected to a suitable vacuum source. The air valve 459, as shown in Fig. 35, may be suspended by a bracket 461 attached to the adjacent side frame 300 of the machine. The air valve 459 has a piston whose end 462 is connected to a valve lever 463 fulcrumed on the valve bracket 464. The valve lever 463 carries a cam roller 463' designed to roll over the tracking rim of a cam member 465 fixed to the shaft 447. The air valve 459 has a compression spring 466 associated with its valve stem 467 which normally maintains the cam roller 463' in tracking engagement with a cam member 465.

The camming rim of the cam member 465 is so shaped as to manipulate the air valve piston in a manner to apply suction to the suction holes 454 during the raising movement of the blank stripping plate 435, and to cut off the suction when the blank stripping plate 435 has been raised to the elevation of the table plate 430. When the arcuate blank has been elevated to the plane of the table plate 430, mechanism is provided to bodily move the arcuate blank off from the raised lifting plate 435 and onto the top surface of the table plate 430 in a direction toward the container body winding mechanism and at an acute angle to its path of travel along the anvil plate extension 382'.

Arcuate blank advancing mechanism

As shown in Figs. 6 and 33, the arcuate blank is moved off from the elevated stripping plate 435 to slide across the top face of the table plate 430 in a straight line direction toward the winding mandrel 3, and with the straight trailing edge $b'''$ of the blank in guided contact with the adjacent flat face of the wall plate 418, and with the leading straight edge $b'''$ of the blank substantially parallel with the axis of the winding mandrel in residence at the winding station.

The arcuate blank advancing mechanism 470 at station I comprises a pusher device 471 which initially pushes the blank towards the winding mandrel along the top surface of the table plate 430 and along the second section IV of the arcuate blank processing division. During this initial advance movement, the outer arcuate edge $b''$ of the blank is guided by a guide strip 472 secured to the top face of the table plate 430, the guide strip 472 extending in a straight line towards the winding mandrel 3 at the winding station. The trailing straight edge $b'''$ of the blank abuts against the guide face 418'' of a groove undercut in the wall plate 418, as shown in Figs. 49 and 50, the guide face 418'' extending in a direction parallel to the guide strip 472. Thus the arcuate blank is initially advanced by the pusher device 471 towards the winding station and is guided in its sliding movement on the table plate 430 by the guiding edge of the guide strip 472 and the guide face 418'' of the wall plate 418.

The pusher device 471 comprises a continuous pusher chain 473 mounted on the wall plate 418 and supported at the ends thereof by spaced sprockets 474 and 475, as shown in Figs. 33, 47 and 49. The sprocket 474 is journalled on a stub shaft 476 fixed to a bracket plate 477 adjustably secured to the inside face of the wall plate 418 as by bolts 478 extending through elongated bolt slots 479 in the bracket 477. The other sprocket 475 is rotatably mounted on a stub shaft 480 which is fixed to a bracket plate 481 (Fig. 33) adjustably attached to the side face of the wall plate 418. A smaller drive sprocket 482 is journalled on the stub shaft 480 and attached to the drive sprocket 475 as shown in Fig. 47. The sprocket 482 carries a drive chain 483 trained around a sprocket 502 fixed to an advancing disc supporting shaft 501 associated with the second blank advancing device 500 operating to further advance the arcuate blank along the second section IV of the arcuate blank processing division.

The blank advancing chain 473 has a blank pusher dog 486 attached thereto which is designed to engage the trailing heel of the arcuate edge $b''$ of the blank. The pusher dog 486, as shown in Figs. 49 and 50, comprises a dog member 487 having a notched lip 488 at the lower end thereof designed to engage the trailing heel of the blank and slide the blank from the elevated blank stripping plate 435 and across the surface of the table plate 430 on which the blank is slidably supported. The top surface of the stripping plate 435 and the top surface of the table plate 430 may be provided with a depressed groove 489 which parallels the wall plate 418 and along which the lip 488 of the dog 487 may be dragged during its forward travel along the lower run of the pusher chain 473.

The dog member 487 is pivotally mounted on a hinge pin 490 extending from a pair of bracket elements 491 secured to one of the drive chain links, as shown in Figs. 49 and 50. A tension spring 492 has one end thereof fixed to a bracket element 493 secured to an adjacent chain link, and has the other end thereof secured to the dog member 487 in a manner to resiliently urge the lip portion 488 of the dog member 487 in dragging engagement with the lip receiving groove 49. The dog member 487 is resiliently held in blank engaging position by an abutment pin 494 extending laterally from the adjacent pusher chain link. A roller 495, rotatably mounted on a stub pin 496 fixed to and extending laterally from the dog member 487 directly above the arcuate blank, is positioned to ride onto the horizontal edge of a cam plate 497 as shown in Fig. 47, to lift the dog member 487 out of engagement with the trailing edge $b'''$ of the blank. The cam plate 497 is adjustably secured to the adjacent wall plate 418 as by screws 498 extending through elongated slots 498'.

The pusher dog 486 associated with the pusher chain 473 engages the trailing straight edge $b'''$ of the blank as it rests on the elevated lifting plate 435 directly adjacent the sprocket 474. As the lower run of the pusher chain 473 advances forwardly towards the winding station, the pusher dog 486 advances the arcuate blank along the table plate 430 until the trailing straight edge $b'''$ thereof is positioned adjacent the forward sprocket 475 around which the forward end of the pusher chain 473 is trained. The roller 495 associated with the pusher dog 486 then moves into contact with the adjustable cam plate 497 to lift the dog member 487 out of contact with the blank. The pusher dog 486 then travels around the forward sprocket 475 and along the upper run of the pusher chain. Thus the arcuate blank is advanced from the elevated lifting plate 435 to a point forward of the advance sprocket 475 with each complete revolution of the pusher chain 473.

When the pusher dog 486 moves out of pushing contact with the trailing heel of the arcuate blank, the secondary blank advancing device 500 takes over and grips the leading end of the arcuate blank to further advance the arcuate blank through glue applicator mechanism 540 which operates to apply the glue patch $t$ and the glue strip $t'$ to the upper face of the arcuate blank.

The secondary blank advancing device 500 and the following glue applicator mechanism 540 at the gluing station J, form a part of the second section IV of the arcuate blank processing division. This second section has suitable framework for supporting its mechanisms, comprising parallel side frames 503 and 504 which may be secured at one end thereof to the supporting legs 303 and 305 associated with the section III. The other end of the side frames 503 and 504 terminate adjacent the winding station, as shown in Figs. 6 and 33, and are rigidly supported in horizontal position by suitable framework. A table plate 505 is supported between the side frames 503 and 504 at the same horizontal elevation as the table plate 430, and makes a smooth edge joint 505' with the adjacent edge of the table plate 430 as shown in Fig. 33. The guide strip 472 secured to the table plate 430 also terminates adjacent the winding station. The guide strip 472 serves to guide the arcuate edge $b''$ of the blank as it slides along the table plate 505 of the second section.

The secondary blank advancing device 500, which takes over the advance movement of the blank from the lower run of the blank advancing chain 473, comprises a plurality of spaced blank advancing discs 506 whose hub portions 506' are fixed to the horizontally extending shaft 501. The shaft 501 is rotatably journalled in bearing blocks 507 set in the upper edge of the side frames 503 and 504 and are secured thereto by bolts 507' in a manner to permit vertical adjustment of the bearing stock 507, as shown in Figs. 33, 45, 47 and 48. A driving sprocket 508 is secured to the projecting end portion 501' of the horizontal shaft 501.

The blank advancing discs 506 are positioned directly above the table plate 505 and cooperate with blank advancing friction wheels 509 (Fig. 48), each having a hub portion 509' secured to a horizontal extending shaft 510 journalled in bearings 511 set in the side frames 503 and 504. A projecting end portion 510' of the shaft 510 carries a suitable driving sprocket 512. Each friction wheel 509 is positioned directly below its companion blank advancing disc 506 and is provided with a resilient tire 513 design to rotate in a slot 513' cut in the table plate 505 so as to grip the under face of the arcuate blank slidably supported on the top surface of the table plate 505.

Each blank advancing disc 506 has a raised track section 514 and a depressed track section 515, as shown in Fig. 47. During the continuous rotation of the disc supporting shaft 501, the raised track section 514 engages the upper face of the arcuate blank and presses the blank against the rim tire 513 of the continuously rotating companion friction wheel 509 in a manner to advance the blank forwardly. The depressed track section 515 does not contact the blank as it rotates adjacent the blank, and the blank remains stationary during that interval. The speed of rotation of the disc supporting shaft 501 is substantially synchronized with the speed of movement of the blank pusher chain 473, so that the successive blanks are intermittently advanced along the table plates 436 and 505 to and through the gluing mechanism 540 at the gluing station J. During this advance, the arcuate edge b'' of the blank is in guided contact with the guiding edge of the guide strip 472, and the straight trailing edge b''' of the blank is in guided contact with the guiding edge of a second guide strip 516, as shown in Figs. 33, 47 and 48.

Blank flattening means are provided to prevent warping and curling of the leading edge b''' of the blank as it slides along the table plate 505 and to insure proper feeding of the leading edge of the blank between the raised arcuate track section 514 of the blank advancing discs 506 and the resilient tires 513 of the friction wheels 509. The blank flattening means may comprise a pair of spring fingers 517 and 518, as shown in Figs. 33 and 48, which extend downwardly at a forwardly inclined angle. Each finger has a flat blank contacting toe 519 at the lower end thereof. Each of the spring fingers 517 and 518 may be secured as by screws 520 to the upper edge of the adjacent side frame 503. The blank contacting toe 519 of the spring finger 517 is designed to ride in contact with the approximate mid-section of the advancing arcuate blank, and the blank contact toe 519 of the spring finger 518 is designed to ride in contact with the adjacent arcuate edge b'' of the advancing blanks.

Means are also provided to form transverse scorings d on the trailing end of the arcuate blank with the scoring extending parallel with the straight trailing edge b''' of the blank. The scoring means may comprise a scoring wheel 521 whose hub portion 521' is fixed to the advancing disc supporting shaft 501 in the path of advance travel of the trailing edge b''' of the blank. The scoring wheel 521 is provided with scoring ribs 522 extending around the periphery thereof. A companion scoring wheel 523, positioned directly under the scoring wheel 521, has a hub portion 523' secured to the friction wheel shaft 510. The scoring wheel 523 has scoring ribs 524 extending around the periphery thereof and interfitting with the scoring ribs 522 associated with the scoring wheel 521. The table plate 505 has a slot opening 524' so that the trailing edge b''' of the blank is gripped between the scoring wheels 521 and 523 and the scorings d thus impressed therein.

It is important that the successive arcuate blanks be successively advanced by the advancing discs 506 in accurate predetermined registry with the blank gluing applicator associated with the gluing mechanism 540 at the gluing station J so that the glue patch t is precisely applied to the following half-section of the arcuate blank beginning at the mid-line t' of the blank as shown in Fig. 1, and the glue strip t'' is precisely applied along the larger arcuate edge b'' of the blank. Precise and uniform application of the glue patch t and glue strip t'' to the blanks requires that the advancing heels 514' of the advancing discs 506 grip each successive blank at the same precise points on each blank.

Stop means 525 controlling the advance movement of the successive blanks is provided which insures the desired registry between each blank and the rotating heels 514' of the advancing discs 506. The stop means 525, as shown in Figs. 33, 46 and 48, is reciprocated in timed synchronism with the rotation of the disc shaft 501 in such a manner that the blank is momentarily held in a fixed position until the advancing heels 514' of the advancing discs 506 grip the blank at the desired precise points on the blank. The stop means 525 comprises a vertical finger 526 whose lower end 526' is designed to reciprocate into and out of a slot hole 526'' in the table plate 505. The upper end of the finger 526 is adjustably secured to one end of an arm 527 as by a bolt 528 secured to the upper end of the fingers 526 and extending through an elongated slot 528' in the end of the arm 527. The other end of the arm 527 is pivotally mounted as by hinge bolt 527' to a bracket arm 529 extending laterally from and secured to the upper side of the bearing block 507 on the adjacent side frame 503.

The pivotally mounted arm 527 has a cam roller 530 rotatably mounted on stub pin 531 extending laterally from the approximate mid-section of the arm 527. The cam roller 530 is designed to roll in contact with the camming periphery of a cam member 532 fixed to the disc shaft 501. The cam member 532 has a semicircular track section 533 which maintains the stop finger 526 in raised position, as shown in full lines in Fig. 46, during the major part of the rotation of the disc supporting shaft 501, and a depressed track section 534 which lowers and raises the stop finger 526 to and from its lowermost position shown in dotted lines in Fig. 46, in which lower position the end 526' of the stop finger 526 is in the path of advance of the leading edge b''' of the arcuate blank b.

The cam member 532 is so shaped as to lower the end 526' of the stop finger just before the leading edge b''' of the blank has reached the stop finger 526, and just before the dog member 487 associated with the pusher chain 473 is lifted out of contact with the trailing edge of the blank by the cam plate 497 shown in Fig. 47. The position of the cam plate 497 is carefully adjusted to insure disengagement of the dog member 487 from the trailing edge of the blank, when the leading edge b''' of the blank is in abutment against the stop finger 526.

The stop finger 526 is lifted by the rotating cam member 532 out of engagement with the leading edge of the blank the instant that the advancing heels 514' of the blank advancing discs 506 grip the blank. The stop device 525 thus operates to insure precise advance feeding of the successive blanks forwardly into glue applying registry with the gluing mechanism 540, thereby insuring the application of the glue patch $t$ and the glue strip $t''$ to the upper face of each blank exactly as required, and thenceforth further insuring the accurate feeding of each glued arcuate blank into paired relationship with the rectangular blank advanced along the feeding station E of the rectangular blank processing division previously described, so that the both blanks are accurately paired together as fed into winding engagement with the winding mandrel 3 in residence at the winding station.

*Glue applicator mechanism for the arcuate blank*

The glue applicator mechanism 540 at the gluing station J is positioned directly in advance of the blank advancing discs 506 as generally illustrated in Fig. 33 and more particularly shown in Figs. 45, 47 and 51 to 58 inclusive. The mechanism 540 comprises a warped glue applicator roll 541 mounted horizontally between the side frames 503 and 504. The warped glue roll 541 is fixed to a shaft 542 extending axially therethrough, the ends of the shaft 542 being rotatably mounted in bearing sleeves 543.

Each bearing sleeve 543 is set in a bearing block 544 having a portion thereof adjustably fitted into a notch cutout 545 formed in the upper edge of the adjacent side frame as shown in Fig. 45. The bearing blocks 544 are vertically adjustable to position the glue applying surface of the warped glue roll 541 in proper relation to the arcuate blank moving along the table plate 505 therebelow. Each bearing block 544 presents a pair of laterally extending wing portions 544'. Each wing portion 544' rests on an underlying vertically adjustable lock nut assembly 546 threaded to the shank of a stud bolt 547 extending through the wing portion 544', the lower end of the stud bolt 547 being threaded into the upper edge of the adjacent side frame.

The warped glue roll 541 is also resiliently mounted so that the glue applying surfaces thereof may be pressed against the upper face of the blank with the desired glue applying resiliency. This roll mounting resiliency is accomplished by a compression spring 548 which encircles the upper portion of each stud bolt 547, the lower end of the spring abutting against the top surface of the adjacent wing portion 544' of the bearing block 544 and the upper end of the spring abutting against the flange of an adjustable nut 549 threaded on to the end of the stud bolt 547. Thus, the vertically adjustable and resiliently mounted bearing blocks 544 support the glue applicator roll 541 in a manner so that the glue applying surfaces thereof may be adjusted to engage the top surface of the blank with the desired glue applying pressure and resiliency.

The warped glue applying roll 541 has a semicircular glue applying surface 550 whose surface and edge contour is in matching conformity with the shape and contour of the glue patch $t$ as it is to be applied to the upper surface of the arcuate blank, as shown in Figs. 47 and 51. The warped glue applicator roll 541 also has a warped glue applying flange 551 at one end thereof whose glue applying rim 552 is so shaped as to accurately apply the glue strip $t''$ to the adjacent arcuate edge of the blank as the blank is advanced thereunder. The exact shape of the glue applying surface 550 and the glue applying rim 552 of the warp glue applicator roll 541 is made evident by the shape of the glue patch $t$ and the glue strip $t''$ applied to the blank as shown in Figs. 1 and 2.

A cooperating blank supporting pressure roller 555 is positioned directly beneath the warped glue applicator roll 541 with the upper portion thereof rotating in a horizontal slot 555' cut in the blank supporting table plate 505, so that the successively advancing arcuate blanks may be gripped between the pressure roller 555 and the glue applicator surface 550 and the glue applicator rim 552 of the warped glue applicator roll 541 during rotation thereof. As shown in Figs. 44, 45 and 47, the blank supporting roller 555 extends horizontally between the side frames 503 and 504 of the machine and is fixed to a shaft 556 whose ends are rotatably mounted in suitable bearings 557 mounted in the adjacent side frames 503 and 504 of the machine. An end portion of the roller shaft 556 extends through the side frame 503 and has a sprocket 558 secured thereto by means of which the roller 555 is rotated. An end portion of the glue applicator shaft 542 also projects through the side frame 503 of the machine, as shown in Figs. 44 and 51, and has a driving sprocket 559 attached thereto.

The glue applicator mechanism 540 also incorporates a glue handling device 560 operative to apply a measured film thickness of adhesive to the glue applicator surface 550 and glue applicator rim 552 of the warp glue applicator roll 541 as shown in Figs. 33, 47 and 55. The glue handling device 560 comprises a pair of glue transfer rolls 561 and 562 mounted directly above to the warped glue applicator roll 541, the glue transfer rolls 561 and 562 extending horizontally substantially the full axial length of the warped glue applicator roll 541. The glue transfer roll 561 is so mounted that the glue transfer surface 561' thereof will roll into contact with the glue applicator surfaces 550 and 552 of the glue applicator roll 541 during each full rotation thereof to thereby effect transfer of the glue film from the glue transfer roll 561 to the glue applicator surfaces 550 and 552.

The glue transfer rolls 561 and 562 are arranged in substantial parallelism to define a V-shaped pocket for a pool of glue $g$ deposited therebetween in controlled quantities. Glue is supplied to the pocket from an inverted glue jar 563 having a glue spout 564 extending to the glue pocket, the inverted glue jar 563 and its associated glue spout 564 being removably mounted on a suitable bracket 565 which may be secured as by bolts 565' (Fig. 47) to the upper end of the adjacent leg 305 of the machine.

The glue transfer rolls 561 and 562 are mounted within a U-shaped box frame 566 comprising parallel side wall plates 567, as shown in Figs. 33, 44, 45, 47 and 55, one end of the side plates 567 being connected by a cross plate 568 as by suitable bolts 568'. The glue transfer roll 562 has a stub shaft 569 extending from each end thereof, each stub shaft being journalled in a bearing collar 570 extending through a conformed hole in the adjacent side plate 567, each bearing collar 570 having a flange portion 570' to maintain the glue transfer roll 562 properly centered between the side plates 567.

The glue transfer roll 561 also has a stub shaft 571 extending from each end thereof, each stub shaft being rotatably mounted in a bearing collar 572 which extends through a conformed hole in the adjacent side plate 567 of the box frame 566. As will be noted by referring to Figs. 55 and 57, the bearing axis of each of the bearing collars 572 is eccentric to the axis of the stub shaft 571 supported thereby. Thus by suitable rotative adjustment of the bearing collars 572, the glue transfer surface 561' of the glue roll 561 may be adjustably spaced with respect to the adjacent surface of the companion glue roll 562 to thereby regulate the thickness of the glue film transported by the glue transfer roll 561 for application to the glue applicator surfaces 550 and 552 of the warped glue transfer roll 541.

As shown in Figs. 55, 56, and 57, a pair of shoe plates 573 are provided which bear against adjacent ends of the glue rolls 561 and 562 and serve to define the end walls of the V-shaped glue pocket whose sides are defined by the adjacent surfaces of the glue rolls. Each shoe plate 573 has two or more supporting pins 573' projecting therefrom, each pin 573' extending into a hole 573" formed in the adjacent side plate 567 so that each shoe plate 573 is free to move towards and away from the adjacent ends of the glue rolls 561 and 562. Each shoe plate 573 has a smooth face which is resiliently pressed against the adjacent smooth end faces of the glue rolls 561 and 562 by an expansion spring 574, each expansion spring 574, being supported in a pocket 574' formed in the side plate 567 and the adjacent shoe plate. Each expansion spring 574 embraces one of the pins 573' and resiliently presses the smooth inside face of its shoe plate into substantially non-leaking contact with the adjacent smooth ends of the rotatable glue rolls 561 and 562.

A mechanical device is provided for precisely regulating the spacing between the adjacent surfaces of the glue transfer roll 561 and 562. As shown in Figs. 55, 57, and 58, and adjusting shaft 575 is positioned adjacent the glue transfer roll 561 and extends through aligned conforming holes in the side walls 567 of the glue box frame 566. One of the projecting ends of the adjusting shaft 575 is provided with a gear 576 fixed thereto which is in mesh with a gear 577 fixed to the adjacent eccentric bearing collar 572 as by one or more set screws 578. Thus, when the adjusting shaft 575 is rotated, gear 576 will rotate gear 577 to thereby rotate the eccentric bearing collar 573 and thereby move the adjacent end of the glue roll 561.

The other end of the adjusting shaft 575 also carries a gear 579 indirectly connected to the shaft 575 by a hand knob 583. The gear 579 meshes with gear 580 secured to the adjacent eccentric bearing collar 572 as by one or more set screws 581. The gear 579 has a manipulating stem 582 whereby gear 579 may be rotated as desired to rotate gear 580 and adjust its associated eccentric bearing collar 572 so as to move the adjacent end of the glue roll 561 the desired amount.

The gear 579 is connected to the adjacent end of the adjusting shaft 575 by means of the small hand knob 583 which is pinned to the end of the adjusting shaft. A pin 584 is fixed to and extends laterally from the adjacent gear 579, the end of the pin 584 extending into an axial hole 585 in the hand knob 583. An expansion spring 585' seats between the hand knob 583 and the adjacent gear 579.

The adjusting shaft 575 is designed to slide endwise in the gear 579 and also in the side plates 567 of the glue box frame 556. By exerting inward axial pressure against the hand knob 583, the gear 576 fixed to the other end of the shaft may be pushed out of driving engagement with the gear 577 fixed to the adjacent eccentric bearing collar 572. When gears 576 and 577 are thus disengaged, the gear 579 may be rotated by its stem 582 to rotatably adjust only the adjacent eccentric bearing collar 572 and thereby adjust the film spacing between the adjacent ends of the cooperating filming rolls 561 and 562. When the axial pressure against the hand wheel 583 is released, both eccentric bearing collars 573 may be oriented as desired. Thus the adjusting shaft 575 may be manipulated as required to not only adjust the film thickness produced by the cooperating filming surfaces of the glue rolls 561 and 562, but the glue roll 561 may be realigned with the glue roll 562 as the worn filming surfaces thereof may require.

The glue roll 561 which operates to transfer its glue film to the warped glue applicator roll 541, may be swung out of glue transferring contact therewith as may be required from time to time, which may be accomplished by providing a pivot mounting for the glue box frame 566 which supports the glue roll 561. As shown in Figs. 45 and 47, a vertical bracket 586 has its lower end secured as by suitable bolts 587 to the adjacent side frame 504 of the machine. The bracket 586 has a horizontally extending arm portion 588 presenting a notch 589 in which the adjacent bearing collar 570 associated with the glue roll 562 is pivotally seated. The bearing collar 570 is removably retained in the notch 589 by a keeper plate 590, one end of which extends into the notch 589 to retain the bearing collar 571 therein. The other end of the keeper plate 590 may be removably secured to the bracket arm 588 as by removable bolts 590'.

The bearing collar which supports the other end of the glue roll 562 sets within the notch 592 of a sling bracket 591 as shown in Fig. 44. The last mentioned bearing collar is removably retained in the notch 592 of the sling bracket 591 by a keeper block 593 extending into the notch 592 and removably secured to the sling bracket 591 as by removable bolts 593'. The sling bracket 591 is supported by an upright bracket 594 as shown in Figs. 44 and 52, whose lower end is secured as by bolts 595 (Fig. 52) to the adjacent side frame 503 of the machine. The sling bracket 591 is secured to the upper end of the vertical bracket 594 as by removable bolts 596.

The bearing collars 570 which support the glue roll 562 are thus fulcrumed in the supporting seats of the notch 589 in bracket 586 and the notch 592 in the sling bracket 591. Since the adjacent ends of the side plates 567 of the glue box frame 566 are in turn pivotally supported by the bearing collars 571 associated with the glue roll 562, the other end of the side plates 567 of the glue box frame 566 may be raised and lowered so as to correspondingly raise and lower the glue roll 561.

In the event that the normal operating advance of the successive arcuate blanks under the warped glue applicator roll 541 should be interrupted or halted, it is desirable to thereupon prevent the further application of a glue film to the glue applicator surfaces 550 and 552 of the warped glue applicator roll 541 so that the glue applicator roll 541 may be kept reasonably clean of glue except as positively required by the arcuate blanks advancing thereunder. Means are accordingly provided to automatically lift the glue box frame 566 and its associated glue transfer roll 561 upwardly out of contact with the warped glue applicator roll 541 during rotation thereof, in the event that the normal synchronized advance of the arcuate blanks thereunder is for some reason interrupted.

The automatic means provided for this purpose comprises a pair of forwardly inclined feeler fingers 600 and 601 as shown in Figs. 44 and 47. The feeler finger 600 is pivotally mounted on a switch box 602, and feeler finger 601 is pivotally mounted on a switch box 603. Both switch boxes 602 and 603 are fixed to a plate 604 secured to a horizontal arm 604' of a bracket 605 which may be suspended from a horizontal bar 606 fixed to and extending between the upper portions of the adjacent supporting legs 303 and 305 of the machine. The free end of the feeler finger 600 is positioned directly over a hole 607 in the table plate 505, and the free end of the feeler finger 601 is positioned directly over a hole 608 in the table plate 505, the hole 608 being directly in advance of the hole 607. The free ends of the feeler fingers 601 and 602 are normally supported by the arcuate blank or blanks advancing thereunder, but if not so supported the feeler fingers 600 and 601 will selectively drop into their respective table plate holes 607 and 608.

As shown in Fig. 47, the switch boxes 602 and 603 are connected in circuit with the solenoid coil 609 of a solenoid valve 610 by power wires 611 and 612. Current lead wire 612 has a direct wire connection 613 to the switch box 602, and a shunt wire connection 614 to the switch box 603. When feeler finger 600 is in riding contact with the arcuate blank thereunder, the current switch in its switch box 602 is closed, and when the feeler finger 600 is not so supported, its free end will drop into the table plate opening 607 to open the switch in its switch box 602.

Likewise, when the feeler finger 601 is in riding contact with the arcuate blank advancing thereunder, the switch in its switch box 603 is closed, and when the feeler finger 601 is free to drop into its table plate hole 608, the switch in its switch box 603 is opened. Thus current will flow through the solenoid coil 609 of the solenoid valve 610 through lead wire 612 when the switch in either switch box 602 or 603 is closed, or when the switches in both switch boxes 602 and 603 are closed. The flow of current to the solenoid coil 609 is cut off only when the switches in both switch boxes 602 and 603 are open.

The solenoid valve 610 is supplied with compressed air by compressed air line 615. Compressed air released by the solenoid control valve 610 flows through a coupling 616 into a compressed air cylinder 617, as shown in Fig. 47. The solenoid valve 610 has a valve piston 610' which is drawn upwardly against the action of a compression spring 610'' at the lower end thereof, when the solenoid coil 609 is energized by current flowing thereto through the lead wires 611 and 612. When the valve piston 610' of the solenoid valve is retained in lifted position by the energized solenoid coil 609, compressed air will flow to the air cylinder 617. When the solenoid coil 609 is deenergized, which would only occur when the switches in both switch boxes 602 and 603 are opened, the compression spring 610'' associated with the solenoid valve 610 pulls the piston 610' downwardly to shut off compressed air flow to the air cylinder 617 and permit the compressed air to discharge from the cylinder 617 through the air discharge port 610''' in the air valve 610.

The feeler fingers 600 and 601 are so spaced that one or both of them are supported by a single blank or by two spaced arcuate blanks during their normal intermittent travel along the table plate 505 in normal production operations. However, should the normal production spacing of the blanks be interfered with, as by the removal of one of the blanks, both feeler fingers 600 and 601 will operate to open the switches in their respective switch boxes 602 and 603, so as to deenergize the solenoid coil 609. The valve piston 610' will then be pulled downwardly to permit the compressed air normally contained in the air cylinder 617, to escape through the air discharge port 610''' of the control valve 610.

The piston head 618 in the air cylinder 617 is normally supported in raised position by the compressed air contained in the air cylinder 617 during normal production operations. The glue roll 561 and its associated glue box supporting frame 566 are retained in operative position during normal production operations by the air supported piston head 618, operating against the action of a tension spring 629. However, when the piston supporting compressed air is released from the air cylinder 617, the tension spring 629 operates to swing the glue roll 561 out of contact with the rotating glue applicator roll 541 by devices which will now be explained.

As shown in Figs. 47 and 48, the air cylinder 617 may be suitably supported in the approximate mid-section of a U-shaped supporting bracket 620 having upwardly extending leg portions 621 secured to the adjacent side frames 503 and 504 of the machine as by bolts 621'. The piston rod 619 connected to the piston head 618 has a head portion 619' designed to seat against the approximate mid-section of a cross bar 622 whose ends are secured to a pair of spaced pivot arms 623. Each pivot arm 623 is pivotally mounted on a stud 624 projecting from the adjacent upwardly extending leg portion 626 of a U-shaped bracket 625, the leg portions 626 being secured as by bolts 626' to the adjacent side frames 503 and 504 of the machine. A sturdy cross bar 628 extends between and is secured to the adjacent ends of the pivot arms 623, the bar 628 extending horizontally directly above the span portion 627 of the U-shaped bracket 625.

The tension spring 629 is secured at the upper end thereof to a cross rod 630 extending between and secured to the adjacent ends of the pivot arms 623. The lower end of the tension spring 629 is secured to a suitable plate 631 fixed to the lower end of the air cylinder 617. The tension spring 629 normally operates to swing the cross bar 628 at the other end of the pivot arms 623 upwardly, except as prevented by the supporting compressed air in the air cylinder 617 which exerts a lifting pressure against the cross bar 622 attached to the pivot arms 623. However, when the supporting compressed air is permitted to escape from the air cylinder 617 by reason of the opening of the exhaust port 610''' in the air control valve 610, the tension spring 629 will drive the piston head 618 downwardly and raise the cross bar 628.

The cross bar 628 provides support for the lower ends of a pair of vertical manipulating rods 633 as shown in Figs. 47 and 51. Each rod 633 is of sufficient length so that its upper end will bear against the lower edge of the adjacent side plate 567 of the glue box frame 566. The vertical rods 633 thus provide support for the pivotally mounted glue box frame 566. Each rod 633 is guided in its vertical movement by a sleeve portion 625' associated with the adjacent bracket leg 625, and by a suitable guide sleeve portion 634' associated with an upper guide bracket 634 attached to the adjacent side frame of the machine.

When the compressed air is exhausted from the air cylinder 617, the tension spring 629 will rock the pivot arms to raise the cross bar 628 and the rods 633 supported thereon, thereby swinging the glue box frame 566 upwardly to lift the glue transfer surface 561' of the glue roll 561 out of contact with the glue applicator surfaces of the warped glue applicator roll 541. When compressed air is returned to the air cylinder 617, its piston head 621 is driven upward to exert a lifting force on the cross bar 622 against the action of the tension spring 629, which lifting force is sufficient to return the cross bar 622 and the glue roll 561 to normal operative position.

To insure proper glue transfer contact between the glue roll 561 and the glue applicator roll 541, the vertical support rods 633 may be vertically adjusted by the provision of a set screw 635 threaded through the span portion 627 of the U-shaped bracket 625. The lower face of the cross bar 628 is designed to seat against the adjusted end of the set screw 635, as shown in Fig. 47. By suitable adjustment of the set screw 635, the cross bar 628 and the support rods 633 may be vertically adjusted as gluing conditions require.

When the solenoid coil 609 is deenergized, as would be the case with no arcuate blank advancing under either of the feeler fingers 600 and 601, the valve piston 610' is pulled downwardly by its compression spring 610'', thereby opening the valve port 610''' to exhaust the air from air cylinder 617, permitting tension spring 629 to swing the glue roll 561 upwardly out of contact with the rotating glue applicator roll 541. When blank travel under the feeler fingers 600 and 601 is restored, the solenoid coil 609 is energized to permit compressed air to flow through the solenoid valve 610 and into the air cylinder 617 whose piston head 618 then operates to swing the cross bar 628 downwardly into seating position against the ends of the adjusting screw 635 to thereby lower the glue roll 561 by gravity into its normal operating position.

A tertiary drive shaft 640, located adjacent the blank discharging end of the second section IV of the arcuate blank processing division as shown in Fig. 33, provides the driving power for rotating the disc supporting shaft 501 and the friction wheel supporting shaft 510 at the arcuate blank advancing station I and also for rotating the glue applicator roll shaft 542 and the pressure roller shaft 556 at the glue applying station J. The glue transfer rolls 561 and 562 are also primarily rotated by means of a direct drive connection with the tertiary drive shaft 640 as will shortly be explained. Arcuate blank feeding mechanism 690, to be described hereinafter, also driven from the tertiary drive shaft 640, operates to feed the arcuate blanks in pair synchronism with the successive advancing rectangular blanks into winding engagement with the winding mandrels 3 during their residence at the winding station.

As shown generally in Fig. 33, and more particularly in Figs. 47 and 51, the tertiary drive shaft 640 is rotatably mounted in bearing sleeves 641 supported in bearing blocks 642 fitted into notches 643 provided in the upper edge of the side frames 503 and 504 and secured therein by screws 643'. One of the projecting end portions 640' of the tertiary drive shaft 640 has a sprocket 644 fixed thereto as shown in Figs. 33, 45 and 51 around which a drive chain 645 is trained.

The drive chain 645 which rotates the tertiary drive shaft 640 is trained around a driving sprocket 646 fixed to one end of a sturdy stub shaft 647, as shown in Figs. 33, 37 and 51. The stub shaft 647 is rotatably journalled in a bearing block 648 fixed to and supported by a bracket plate 649 attached to the adjacent side frame 504 of the first section III of the arcuate blank processing division, and the adjacent side frame 300 of the second section II of the rectangular blank processing division. A beveled gear 650 fixed to the end of the stub shaft 646 is in mesh with a beveled transfer gear 651 rotatably mounted on a stub pin 652 whose lower end is secured to the bracket plate 649. The beveled transfer gear 652 also meshes with beveled gear 653 fixed to the projecting end 358' of the disc shaft 358 which is driven to advance the stock sheet S-1 along the first section III of the arcuate blank processing division.

As heretofore described, the disc shaft 358 also carries the sprocket 367 which is driven by drive chain 370 trained around the sprocket 371 fixed to the secondary shaft 317 of the first section III of the arcuate blank processing division, as shown in Fig. 37, and the secondary shaft 317 is driven from the vertical basic drive shaft 311 as heretofore described. Thus the basic drive shaft 311 associated with the first section and driven from the main shaft section 19' of the machine, provides the driving power for rotating the tertiary drive shaft 640.

The tertiary drive shaft 640 has a driving sprocket 655 fixed to the other projecting end portion 640'' thereof, as shown in Figs. 33, 44 and 51. The sprocket 655 supports a drive chain 656 which travels in the direction of the arrow shown in Fig. 44. The upper run of the drive chain 656 is trained around the sprocket 559 fixed to the projecting end portion 542' of the shaft 542 which supports the warped glue applicator roll 541. The upper run of the drive chain 556 is also trained around a guide sprocket 657 rotatably mounted on a stud shaft 658 secured to and projecting from the adjacent side frame 503 of the machine. The upper run of the drive chain 656 is also trained around the sprocket 508 fixed to the end portion 501' of the shaft 501 which supports the arcuate blank advancing discs 506, as shown in Figs. 44 and 48.

The drive chain 656 is then trained around the sprocket 512 fixed to the projecting end portion 510' of the shaft 510 which supports the blank gripping wheels 509 as shown in Figs. 44 and 48. The lower run of the drive chain 656 is trained around a guide sprocket 659 rotatably mounted on a stud pin 660 projecting from a supporting bracket 661 fixed to the adjacent leg 621 of U-shaped bracket 620, as by bolts 661', as shown in Figs. 33, 44 and 48. The lower run of the drive chain 656 is also trained around the sprocket 558 fixed to the adjacent projecting end portion of the shaft 556 which carries the pressure roller 555 at the glue applying station J, and from the sprocket 558 the lower run of the drive chain 656 returns into engagement with the driving sprocket 655 fixed to the tertiary drive shaft 640.

Thus the drive chain 656 is driven from the tertiary drive shaft 640 and operates to rotate the warped glue applicator roll 541 and its associated pressure roll 555, and additionally operates to rotate the arcuate blank advancing discs 506 and associated blank gripping wheels 509 in timed synchronism. As heretofore explained, the tertiary drive shaft 640 is driven by the driving chain 645 on the right hand side of the second section IV of the arcuate blank processing division as shown in Fig. 33, the drive chain 645 being driven in turn from the disc supporting shaft 358 which operates to advance the stock sheet along the first section II of the arcuate blank processing division as shown in Fig. 37.

The glue rolls 561 and 562 are primarily driven by gearing from the tertiary drive shaft 640. As shown in Figs. 33, 44, 51 and 55, a large driving gear 665 is mounted on the projecting end portion 640'' of the tertiary drive shaft 640 and is secured to the adjacent driving sprocket 655 thereof as by bolts 666. The driving gear 665 meshes with a gear 667 which is rotatably mounted on a stub shaft 668, as shown in Figs. 44, 51 and 52. One end of the stub shaft 668 is rotatably mounted in a bearing sleeve 669 mounted in the vertical leg 670 of the upright bracket 594 previously described. The vertical bracket 594 has a horizontal portion 671 and a downwardly extending leg 672 which carries a bearing sleeve 673 through which the stub shaft 668 extends. The stub shaft 668 is thus rotatably mounted in horizontal position in the bearing sleeves 669 and 673 of the bracket 594.

As shown in Figs. 52 and 53 the gear 667 has a bearing sleeve 674 which freely rotates on the stub shaft 668. The gear 667 has a slip clutch driving connection with an adjacent gear 675 fixed to the stub shaft 668 and positioned between the legs 672 and 670 of the supporting bracket 594. The slip clutch connection between the gears 667 and 675 may comprise ball and spring assemblies 676 of well known construction, whereby driving rotation of the gear 667 will serve to rotate the gear 675, but power applied to the shaft 668 to rotate gear 675 will not rotate the idler gear 667. The slip clutch connection 676 between the gears 667 and 675 is provided for a purpose which will presently appear.

The gear 675 is in mesh with a gear 677 fixed to the projecting stub shaft 569 extending from one end of the glue roll 562, as shown in Figs. 44 and 55. The glue roll gear 677 is in mesh with the glue roll gear 678 fixed to the adjacent stub shaft 571 associated with glue roll 561 as shown in Figs. 44, 55 and 57. Thus the driving gear 665 fixed to the projecting end porion 640'' of the tertiary drive shaft 640, operates to rotate the glue roll gears 677 and 678 through the slip clutch assembly 676 which connects the adjacent gears 667 and 675 mounted on the stub shaft 668, to thereby rotate glue rolls 561 and 562 in opposite directions.

To prevent undesirable caking or hardening of the glue on the surfaces of the glue rolls 561 and 562, it is desirable that these glue rolls be continuously rotated during periods when the drive chains 645 and 656 are not being driven. Such temporary halting of the drive chains 645 and 656 may be necessary when minor adjustments are to be made to the various mechanisms associated with the arcuate blank processing division of the machine. Rotation of the tertiary drive shaft 640 which drives the chain 656 may be halted by an outward pull on the draw bolt 326 to disconnect the driving arm 325 fixed to the shaft 317 from the adjacent driven worm gear 316, as shown in Fig. 37.

Auxiliary driving means is accordingly provided to take over the continuous rotation of the glue rolls 561 and 562 when driving movement of the tertiary drive shaft 640 is halted. As shown in Figs. 44 and 45, an auxiliary driving motor and speed reducer unit 680 is mounted on a bracket 681 fixed to the adjacent side frame 503 of the machine. The driving motor and speed reducer unit 680 has a small driving sprocket 682 associated therewith which drives the auxiliary drive chain 683. The drive chain 683 drives a larger sprocket 684 which is rotatably mounted on a projecting end portion 668' of the stub shaft 668, as shown in Figs. 44, 52 and 54.

The sprocket 684 has a bearing sleeve 685 (Fig. 54) which idles on the shaft portion 668'. The sprocket 684 has a slip clutch driving connection with a clutch collar 686 which is fixed to the shaft portion 668'. The slip clutch driving connection between the clutch collar 686 and the sprocket 684 may comprise ball and spring assemblies 687 of well known construction. The sprocket 684 is driven at slower speed than the driven speed of the gear 667 so that when driving power is applied to the sprocket 684, the clutch collar 686 will not be driven thereby since it would be rotated at greater speed than the sprocket 684 from the gear 667 and gear 675. Thus when the gear 667 is being driven from the tertiary drive shaft 640, the gear 667 will rotate its companion clutch gear 675, and the glue rolls 561 and 562, and the more slower rotating sprocket 684 will idle on the stub shaft 668.

However, when the gear 667 is no longer driven from the tertiary drive shaft 640, the auxiliary drive sprocket 684 takes over to rotate the clutch collar 686, stub shaft 668 and the gear 675 to continue the rotation of the glue rolls 561 and 562 at somewhat slower speed, the gear 667 then not rotating. The auxiliary driving means thus provided insure rotation of the glue rolls 561 and 562 when rotation of the tertiary drive shaft 640 is halted as operating conditions may require, thereby avoiding glue hardening or caking on the surfaces of the glue rolls 561 and 562, and further insuring constant agitation of the glue in the glue pocket defined therebetween.

*Arcuate blank feeding mechanism*

Mechanism 690 is provided at the arcuate blank feeding station K to positively advance the glued arcuate blanks b from the gluing mechanism 540 into paired relationship with the intermittently advancing rectangular blanks a and thence into winding engagement with the winding mandrels 3 successively brought into dwelling position at the winding station. The arcuate blank feeding mechanism 690 engages the underface of the arcuate blanks as they move forwardly from the glue applicator surfaces 550 and 552 of the warped glue applicator roll 541, and advances the blanks forwardly along the table plate 505. The advance end of the table plate 505 has a discharge edge 691 to which a curvilinear platen plate 692 is secured, as shown in Figs. 33, 44, 45 and 47. The curvilinear platen plate 692 is designed to overhang the conical portion of the adjacent pressure roller 13 at the winding station so as to guide the advance end of the arcuate blank into winding engagement with the conical part of the winding mandrel during its residence at the winding station.

To prevent the leading edge of the arcuate blank from clinging to the glue applicator rim 552 of the warped glue applicator roll 541 during its rotation, and to insure retention of the leading edge of the arcuate blank in flat position on the table plate 505, a resilient stripper finger 693 is secured as by screws 694 to the inside face of the warped flanged portion 551 of the glue applicator roll 541, as shown in Fig. 51. The resilient finger 693 has an end portion 693' adjacent to the advancing heel 551' of the flange portion 551 and normally extends slightly beyond the outer rim surface 552 of the applicator roll 541. As the advancing heel 551' of the applicator roll 541 is rotated in contact with the upper surface of the arcuate blank, the end portion 693' of the stripper finger 693 is depressed so as not to interfere with the proper application of the adhesive strip t' along the arcuate edge b'' of the blank. However, when the heel 551' of the rotating glue applicator roll 541 leaves the blank, expansion of the end portion 693' of the resilient stripper finger 693 separates the leading end of the blank from the heel 551' of the applicator roll so that the leading end thereof will extend forwardly.

A resilient guide finger 695 has one end thereof secured to a rod 696 as by means of a set screw 697, the rod 696 extending between and secured to the side frame 503 and 504 of the machine, as shown in Fig. 47. The resilient guide finger 695 has a curved end portion 695' positioned to resiliently engage the leading edge of the arcuate blank, as peeled from the rim surface of the glue applicator roll 541 by the resilient stripper finger 693. The blank engaging end portion 695' of the guide finger is slightly elevated above the arcuate blank as it flatly travels forwardly along the table plate 505 so that it does not contact the adhesive patch t, but operates in cooperation with the stripper finger 693 to insure positive separation of the leading edge of the blank from the glue applicator surfaces of the warped glue applying roll 541.

The arcuate blank feeding mechanism 690 incorporates suction devices for retaining the arcuate blank in flat position against the top surface of the table plate 505, the suction devices also operating to positively advance the successive arcuate blanks along the table plate 505 and over the arcuate platen 692, as shown in Figs. 33, 44, 47 and 51. The suction devices comprise a pair of suction blocks 701 and 702 each having a suction passage 703 extending therethrough. Each of the suction blocks 701 and 702 is supported for horizontal sliding movement by a guide member 704 fixed to the underface of the table plate 505 and having a groove which provides a trackway for a rib 705 extending laterally from one side of the adjacent suction block. The other side of each suction block also has a companion rib 706 which slides in a horizontal channel 707 having vertically extending leg portions 708 which are secured to the underside of the table plate 505.

Each of the suction blocks 701 and 702 also has a resilient suction pad 709 set in the upper face thereof. The suction pad 709 associated with the suction block 701 is designed to travel along a longitudinally extending slot 710 (Figs. 33 and 47) cut in the table plate 505, and the other suction block 702 has its resilient suction pad 709 designed to travel along the longitudinally extending slot 711 cut in the table plate 505. It will be noted by referring to Fig. 33 that the slots 710 and 711 in the table plate 505 are arranged in staggered but parallel relationship, with the slot 711 being located somewhat forwardly of the slot 710. The suction block 702 travelling along the slot 711 is designed to engage the arcuate blank adjacent the larger arcuate edge b'' thereof, and the suction block 701 moving along the slot 710 is designed to engage the arcuate blank adjacent the inner arcuate edge b' thereof.

Means are provided for reciprocating the suction blocks 701 and 702 along the slots 710 and 711 so as to positively advance the leading end of the arcuate blank over the platen plate 692 and into engagement with the winding mandrel, and thence to return the suction blocks 701 and 702 to starting position. This reciprocating movement of the suction blocks 701 and 702 is accomplished by a pair of continuous drive chains 715 and 716 located parallel under the table plate 505 as shown in Figs. 44, 47 and 51. Each of the chains 715 and 716 is supported on a forward sprocket 717 journalled on a horizontal stub shaft 718 whose end is secured in the adjacent side frame 503 or 504 of the machine. The other ends of the reciprocating chains 715 and 716 are each trained over a supporting sprocket 720 fixed to a horizontal shaft 721 whose ends are journalled in bearing sleeves 722 mounted in the adjacent frames 503 and 504 of the machine.

The reciprocating chain 715 has a pin 723 (Fig. 51) connected to one of the links in the upper run thereof and secured to the adjacent suction block 701. The chain 716 is connected to the suction block 702 by a link 716 (Fig. 44), one end of which is pivotally attached to suction block 702 and the other end pivotally attached to the chain 716 by a pin 723'. By reciprocating the upper runs of the chains 715 and 716, their associated suction blocks 701 and 702 may be reciprocated along their respective slots 710 and 711 in the table plate 505.

The chains 715 and 716 and their associated suction blocks 701 and 702 are reciprocated in timed relation with the rotation of the warped glue applicator roll 541 by reciprocating means shown in Figs. 47 and 51. The lower run of the reciprocating chain 715 is trained over a sprocket 725 having a bearing sleeve 726 journalled on a horizontal shaft 727. One end of the shaft 727 is journalled in a bearing sleeve 728 associated with a bearing block 729 secured as by bolts 729' to the lower edge of the side frame 503, as shown in Figs. 44 and 51. The other end of the shaft 727 is rotatably journalled in a bearing collar 730 supported by a bearing block 731 secured to the lower edge to the adjacent side frame 504, as shown in Figs. 45 and 51. The bearing collar 730 may be adjustably oriented in its bearing block 731 and secured in the desired adjusted position by a set screw 732. The bearing collar 730 has an enlarged neck portion 730' to which a cam member 733 is secured. The cam member 733 has a face cam 734 which operates to insure periodic partial rotation of the sprocket 725.

As shown in Fig. 51, a connecting block 735 is fixed to the shaft 727 adjacent the sprocket 725. The connecting block 735 carries a piston 736 designed to reciprocate in a horizontal bore hole 737 in the connecting block 735. The piston 736 has a slot in its outer end defining leg portions 738 between which a cam roller 739 is positioned, the cam roller 739 being journalled on a pin 740 supported by the leg portions 738. The cam roller 739 is designed to roll over the cam track of the face cam 734 of the normally stationary cam member 733 as the connecting block 735 rotates with the shaft 727.

The piston 736 has a pin extension 741 projecting from the inner end thereof slidable in a conforming hole 742 in the connecting block 735. A compression spring 743 surrounds the pin 741 and seats within the bore cavity 737 in the connecting block so as to normally urge the cam roller 739 into face camming contact with the stationary cam member. A slot hole 744 is provided in the face of the sprocket 725 into which the free end of the pin extension 741 may be driven when the cam roller 739 rolls over the raised track section 734 of the normally stationary cam 733.

The cam member 733 may be rotatively adjusted on its bearing collar 730 to which it is adjustably secured so that the raised track section 734 thereof is properly positioned to drive the pin extension 741 into the slot hole 744 of the sprocket 725 at the proper point during the angular rotation of the connecting block 735 and thereby rotate the sprocket 725 in a clockwise direction for a predetermined angular distance. When the cam roller 739 rolls off the raised cam track 734, the compression spring 743 will laterally withdraw the end of the pin extension 741 from the slot hole 744 in the sprocket 725. Thus with each complete rotation of the shaft 727, the stationary face cam 734 manipulates the rotating piston 726 to effect rotation of the sprocket 725 a predetermined angular distance.

As shown in Fig. 47, the lower run of the reciprocating chain 715 is maintained in driven engagement with the sprocket 725 by a suitable guide sprocket 745 rotatably mounted on the stub pin 746 fixed to the lower end of a swingable arm 747 which may be adjustably fixed to a stub pin 748 secured to the adjacent side frame 504 of the machine. Clockwise rotation of the sprocket 725, through a predetermined arc as determined by the arcuate length of the raised cam track 734 on the stationary face cam 733, operates to forwardly advance the upper runs of the reciprocating chains 715 and 716 and thereby advance the arcuate blank to the winding station.

The upper runs of the reciprocating chains 715 and 716 are manipulated to carry their associated suction blocks 701 and 702 to starting position by a tension spring 750 one end of which is secured as by a eyelet 751 to the adjacent U-shaped spanning bracket 625, the other end of the tension spring 750 being secured to a pin 752 extending laterally from the sprocket 725. The normally retracted tension spring 750, as shown in Fig. 47, resiliently holds the sprocket pin 752 at a point nearest to the eyelet 751, with the slot hole 744 in the sprocket 725 in a definite angular location which corresponds to the lead end of the cam track 734 on the stationary cam member 733.

When the cam roller 739 is rotated onto the cam track 734, the pin extension 741 is driven into the slot hole 744 and rotates the sprocket 725 clockwise, causing the tension spring 750 to stretch until the pin extension 741 is withdrawn by roller 739 rolling off the cam surface, whereupon the tension spring 750 quickly rotates the sprocket 725 counterclockwise to the starting position shown in Fig. 47. Thus the angular counterclockwise rotation of the sprocket 725, as propelled by the tension spring 750, operates to quickly manipulate the upper runs of the reciprocating chains 715 and 716 to return the suction blocks 701 and 702 associated therewith to starting position.

The shaft 727 which operates to move the suction blocks 701 and 702 forwardly, is continuously rotated by a sprocket 753 fixed to the projecting end portion 727' thereof. The sprocket 753 is driven by the lower run of the drive chain 645 as shown in Fig. 45, which in turn is driven from the tertiary drive shaft 640 as heretofore explained. A guide sprocket 754 journalled on a stub pin 755 projecting from the adjacent side frame 504, serves to guide the lower run of the drive chain 645 around the sprocket 753.

Automatic control means 760 is provided for controlling the suction applied to the suction blocks 701 and 702. As shown in Figs. 33, 44, 45 and 47, the suction passage 703 associated with each of the suction blocks 701 and 702 is connected to a nipple 761 to which a branch suction hose 762 is attached. Each of the branch suction hoses 762 is connected by a nipple 763 to a suction line 764 leading to a control valve 765 which is connected as by a suction supply line 766 to a suitable suction source.

The control valve 765 as shown in Figs. 33 and 45, may be mounted on a suitable bracket 767 fixed to the adjacent side frame 504 of the machine. The head end 769 of the valve piston 768 is connected to a cam lever 770 pivotally mounted on the valve bracket 771. The cam lever 770 carries a cam roll 772 designed to roll over the cam track of a cam member 773 fixed to the projecting end portion 640' of the tertiary drive shaft 640, as is shown in Figs. 45 and 51. The cam roller 772 is maintained in tracking engagement with the cam track of the cam member 773 by a compression spring 774 associated with the projecting end portion of the valve piston 768.

The cam track of the cam member 773 is shaped and oriented on the tertiary drive shaft 640 so as to open the cam operated suction valve 765 and apply suction to the suction blocks 701 and 702, when the advanced blank *b* is in proper position thereover and they are in residence position at the starting end of the guide slots 710 and 711 in the table plate 505, as shown in Fig. 33. The suction control valve 765 is maintained in open position by the cam member 773 during partial rotation thereof and during the advance movement of the suction blocks 701 and 702 to the head end of the guide slots 710 and 711. When the cam member 773 has been rotated to close off the suction supply to the suction blocks 701 and 702, the suction blocks 701 and 702 release their suction grip on the arcuate blank, the head end of the blank then having been advanced into winding engagement with a winding mandrel 3 in residence at the winding station. The suction blocks 701 and 702, with the suction force cut off, then return to starting position at the starting end of the slots 710 and 711, to which position they are propelled by the tension spring 750. Each successive arcuate blank is guided to the winding mandrel by the guide strip 516 with which the straight trailing edge *b'''* of the blank is in contact during its final feeding advance. The suction applied to the suction blocks 701 and 702 also insures precise advance movement of the successive arcuate blanks b during their final feeding travel. It will be noted by referring to Figs. 2, 6 and 33, that the successive rectangular blanks a are given their final feeding advance along the second section II of the rectangular blank processing division, in precise synchronism with the corresponding advance of the successive arcuate blanks b along the discharge of the second section IV of the arcuate blank processing division, so as to accurately pair each rectangular blank with an adjacent arcuate blank, and with the glue strip t'' extending along the larger arcuate edge b'' of the arcuate blank overlapped by the adjacent marginal edge of the rectangular blank as paired therewith.

Marginal overlapping of the paired blanks is facilitated by the positioned contour of the platen plates 299 and 692 at the discharge end of the second sections of the rectangular and arcuate blank processing divisions. The adjacent discharge edges of the table plates 61 and 505 are also so shaped and arranged as to insure accurate pairing and feeding of the successive rectangular and arcuate blanks over the associated platen plates, as indicated in Figs. 2, 6 and 33. The prepared and accurately paired blanks are positively advanced by the final feeding mechanisms 250 and 690 associated with the second sections of the rectangular and arcuate blank processing divisions, in a manner so that their leading edges are positively gripped between the adjacent pressure roller 13 and the surface of the mandrel 3 during residence of the mandrel at the winding station, the feeding movement of the paired blanks being synchronized with the operation of the container body forming division and the container assembly division of the composite machine.

*Operation of the machine*

To operate the rectangular blank processing division, the stock sheet roll is mounted on a suitable supporting cradle and the lead end of the stock sheet is threaded between the pinch rolls 25 and 26 and placed on the table plate 22. The lead end of the stock sheet is easily threaded between the pinch rolls 25 and 26 by manipulating the eccentric handle 41 to lift the upper pinch roll 25 in convenient spaced relation from the lower pinch roll 26.

The foot bar 79 of the shearing mechanism 60 is adjusted to the proper position by manipulating the adjusting nuts 80' associated with the support bolts 80 so that the foot bar 79 will grip and hold the stock sheet against the discharge end of the table plate 22 for the proper time interval during the latter part of the down stroke movement and the first part of the upstroke movement of the upper shearing blade 66. The width of the rectangular blank transversely cut from the lead end of the stock sheet is determined by the diameter and synchronized revolutions of the pinch rolls 25 and 26. The adjusted position of the foot bar 79 assures that the leading edge of the stock sheet will be permitted to advance into substantial alignment with the guide edge of the guide strip 62, associated with the table plate 61 only during the stroking interval in which the foot bar 79 is raised out of holding contact with the stock sheet S.

The printing mat p, having the selected printing indicia p' thereon, is cemented to the cylindrical wall 92 of the printing cylinder 91 in such location that the continuous rotation of the printing cylinder 91 will apply the printing matter to the underface of the trailing half section of the rectangular blank, so that when the blank is double wound into container body form, the printing matter will appear on the outside face of the cylindrical container body as wound. Ink i is supplied to the ink pot 121, and the position of the ink transfer roll 130 is adjusted with reference to the printing cylinder 91 by a proper manipulation setting of the wing bolts 137 and adjusting bolts 136 which operate to move the ink pot 121 in relation to the printing cylinder 91, as shown in Fig. 18. Final pressure contact adjustment of the ink transfer roll 130 with the ink pick up roll 128 and the mat p carried by the printing cylinder 91 is effected by suitable adjustment of the pressure adjusting bolts 133. The proper pinching pressure exerted on the blanks as they advance between the rim portion 93 of the printing cylinder 91 and the raised arcuate wall 99 of the blank feeding cylinder 97, is adjusted as desired by manipulating the nuts 108' associated with bearing blocks 105. Manipulation of hand lever 111 attached to shaft 98 serves to raise feeding cylinder out of contact with rim portions 93 of cylinder 91 if removal of a defective blank is necessary.

The glue container 151 associated with the gluing mechanism 150 is mounted in inverted position on its supporting bracket 156, and a pool of glue is supplied to the V-shaped pocket defined between the glue transfer rolls 153 and 154, as shown in Fig. 23. Axial alignment and adjustment of the glue roll 153 with reference to its companion glue roll 154, is effected by the proper manipulation of the hand knob 176 to thereby establish the desired thickness of the glue film coating to be applied to the successive blanks advancing between the glue roll 153 and the associated blank elevating roller 180, as shown in Figs. 23 and 24. The secondary driving motor 240 is then switched into operation to continuously rotate the glue rolls 153 and 154 by means of the secondary drive therebetween, thereby preventing the glue from hardening or caking on the surfaces of the glue rolls. The air pressure supply is also opened to supply the requisite pressure to the solenoid valve 219, as shown in Fig. 20, to thereby control the elevating movement of the blank elevating roller 180 so as to halt the normal synchronized reciprocating movement of the blank lifting roller 180 when no blank is placed in gluing position.

The feeding disc 252 of the blank feeding mechanism 250 is adjustably secured to its drive shaft 253 so that the advancing heel 264 of the disc 252 will grip the lead end of the advancing blank an instant before the trailing end of the blank is released by the trailing heel 99' of the blank feeding cylinder 97, as shown in Figs. 7, 8 and 20, thereby insuring precise advance movement of the blanks through the gluing mechanism and the precise application of the glue patch to the upper face of only the trailing half section of the blank. The disc pushing arm 276 of the second blank feeding device 270 is also adjustably secured to its driving shaft 272 by set screw 277, so that the advancing heel 280'' of the second feeding disc 271 will grip the leading edge of the advancing blank an instant before the trailing heel 265 of the first feeding disc 252 swings out of contact with the blank at a point adjacent the mid-line r' thereof. As thus adjusted, the second feeding disc 271 will precisely advance the leading edge of the blank in a manner to be gripped between the adjacent surfaces of the pressure roller 13 at the winding station and the winding roller 3 which has been arrived in residence at the winding station.

Suitable adjustments having thus been made, the draw bolt 56 is manipulated by its handle 56" to connect the idler sprocket 55, continuously driven from the speed reducer unit 59 associated with main drive shaft section 19, with the adjacent sprocket 54 which rotates the basic drive shaft 49. The basic drive shaft 49 provides the primary driving power for the various processing mechanisms associated with the rectangular blank processing division of the machine. Providing proper adjustments have been made, this processing division will thence operate automatically to advance the stock sheet, to cut successive rectangular blanks from the lead end of the advancing stock sheet, to print the successive blanks, to precisely apply a patch of adhesive to cover only a predetermined area of each advancing blank, and to feed the successive printed and glued blanks into engagement with the winding mechanism of the associated container body forming machine in correlated synchronism with the operation thereof.

When a stock sheet roll has been used up, the primary drive may be temporarily disconnected by an outward pull exerted on the draw bolt 56. A second stock roll can then be placed in position on its supporting cradle and the lead end thereof threaded between the stock sheet pinch rolls 25 and 26, whereupon the draw bolt 56 is manipulated to put the primary drive into operation, and blank preparation and processing then continued.

To place the arcuate blank processing division in operation, the stock sheet roll is mounted on the axle shaft 332 of the roll supporting cradle, and the lead end of the stock sheet S-1 drawn therefrom is threaded between the pinch rolls 333 and 334, as shown in Fig. 35. To facilitate threading of the stock sheet, the pinch roll 334 may be separated from the pinch roll 333 by exerting a pushing pressure against the outer ends of the bolts 343 so as to push the bearing blocks 338 which rotatably support the pinch roll 344 inwardly toward the end plate 308. The lead end of the stock sheet is then threaded through the slot 362 in the end plate 308, then between the friction wheels 374 and the associated stock sheet advancing discs 365, and the lead end of the stock sheet placed on the anvil plate 382.

The platen plate 400, having attached thereto a cutting knife 402 shaped to conform to the blank to be cut, is secured by the screws 401 to the pressure block 386. The anvil block 381 is levelled so as to place the anvil plate 382 at a cutting level which conforms to the final downstroke position of the cutting knife 402 directly thereabove, as shown in Fig. 34. Levelling adjustments of the anvil plate 382 are effected by a proper manipulation of the levelling bolts 383 and associated lock nuts 384, the holding bolts 385 then being tightened to firmly retain the anvil block 381 and associated anvil plate 382 at the proper adjusted level.

The eccentric collars 389, having been properly oriented on the shaft 317 which supports the pressure block 386, the cutting knife 402 associated with the pressure block 386 will reciprocate in proper timed synchronism with the intermittent advancing movement of the head end of the stock sheet, as propelled by the rotation of the driven sheet advancing discs 365. The disc supporting shaft 358 is also oriented so that the raised arcuate rims 378 of the advancing discs 365 will operate to advance an advance section of the stock sheet to residence cutting position on the anvil plate 382 during the interval that the cutting knife 402 secured to the pressure block 386 is raised out of contact with the stock sheet as it advances on to the anvil plate 382.

Since the shaft 317, which reciprocates the cutting blade 402, drives the disc shaft 358 through the drive chain 370, proper correlated and oriented adjustment of the eccentric collars 389 and associated supporting shaft 317 in relation to the oriented adjustment of the shaft 358 to which the advancing discs 365 are secured, may be accomplished by removing the drive chain 370 from the advancing disc driving sprocket 367, then effecting the desired orienting adjustment of the disc supporting shaft 358 and the cutting knife supporting shaft 317, and then reapplying the drive chain 370 to the disc sprocket 367. By a proper orienting adjustment of the disc shaft 358 in relation to the pressure block reciprocating shaft 317, a predetermined advance section of the stock sheet may be made to advance to residence position on the anvil plate 382 during the interval that the cutting knife 402 associated with the pressure block 386 is raised and out of contact with the stock sheet.

The cam member 421 which manipulates the stock sheet holding plate 411 is also oriented on the shaft 317 so that the cam member 421 will permit the holding plate 411 to remain in resilient pressing contact against the cut section of the stock sheet advanced thereunder, during the interval that the cutting blade 402 is in cutting contact with the immediately preceding stock sheet section in residence at the cutting station. When the cam member 421 is thus adjusted, the pressure plate 411 will also be lifted thereby out of pressure contact with the cut sheet section thereunder, during synchronized advance of the stock sheet as propelled by the advancing discs 365.

The raised arcuate rims 378 of the advancing discs 365 are of such length as to advance the third cut section of the stock sheet in aligning registry with the blank stripping hole 433 in the table plate 430, and in registry with the reciprocable stripping plate 435 therebelow. Proper orientation of the advancing discs 365 assures synchronized advance of the third cut section of the stock sheet to residence position and in aligned registry with the reciprocable stripping plate 435 when the stripping plate is below the level of the plate extension 382' which supports the stock sheet. Proper synchronized movement of the stripping plate 435 in relation to the stock sheet advancing movement of the advancing discs 365 may be further assured by a proper adjustment of the cam member 446 on the shaft 447, so as to permit the stripping plate 435 to remain below the level of the plate extension 382' during the advance movement of the stock sheet, and so that when the third cut section of the stock sheet is in registry residence at the stripping station, to swing the blank stripping plate upwardly to the level of the superimposed table plate 430, during which upward movement, the blank is stripped from the stock sheet.

The cam member 465 which manipulates the air valve 459 is also adjusted on its supporting shaft 447 so as to apply suction to the cut blank section as it arrives in residence position immediately over the depressed stripping plate 435, and thence to continue the application of suction to the blank until it has been elevated to the level of the upper plate 430, whereupon suction application to the blank is cut off. When this adjustment has been made, the valve which controls the suction from the suction source to the control valve 459 is opened. Thenceforth, the control valve 459, as actuated by the adjusted cam member 465, controls the application of suction to the blank stripping plate 435 in synchronized relation to the intermittent advance movement of the cut blank sections to residence position at the stripping station. The cam shaft 447, to which the cam members 446 and 465 are secured, may also be oriented in synchronized adjustment with the disc shaft 358 by proper adjustment of its drive chain 449, which is driven by gearing from the shaft 358, as shown in Fig. 34.

At the arcuate blank advancing station, the advancing chain 473 of the blank pushing device 471 is so applied to its supporting sprockets 474 and 475 that its blank pushing dog 486 is in position to engage the blank and push the blank forwardly toward the winding station, the moment the stripped blank has been lifted by the stripping plate 435 to the elevation of the upper table plate 430. The pusher chain 473 as applied to its supporting sprockets 474 and 475 is made taut by a proper adjustment of the bracket 477 which supports the chain sprocket 474. The cam plate 497, which operates to trip the dog member 487 of the pusher dog 486, is also accurately adjusted so that the pusher member 487 will disengage the blank an instant after the blank advancing discs 506 have engaged the leading end of the arcuate blank, as shown in Figs. 44 and 47.

The blank advancing discs 506 associated with the secondary blank advancing device 500 may be oriented so that the advancing heel of the raised rim sections 514 thereof grip the lead end of the blank at the proper moment, by first orienting the disc supporting shaft 501 when the drive chain 483 is removed from the shaft sprocket 502, and then reapplying the drive chain to the sprocket when the orienting adjustment has been made.

By removing and reapplying the drive chain 656 from and to the driving sprocket 508 attached to disc shaft 501, the disc shaft 501 may be oriented so as to place the advancing heels of the blank advancing discs 506 in position to grip the lead end of the blank at the proper moment and in synchronized relation with the movement of the pusher dog 486 associated with the pusher chain 473. Adjustment of the disc shaft 501 also serves to orient the cam member 532 so that the stop finger 526 is manipulated in proper timed synchronism with the intermittent advance movement of the blanks.

Proper operative orientation of the glue applicator roll 541 may also be effected by detaching drive chain 656 from the sprocket 559 fixed to the shaft 542 of the glue applicator roll 541, then orienting the glue applicator roll so as to place its glue applicator surfaces 550 and 552 in proper glue applying registry with intermittently advancing blanks, and then replacing the drive chain 556 on the sprocket 559 which drives the glue applicator roll. The glue transfer roll 561 is aligned with respect to the companion glue transfer roll 562 by manipulating the hand knob 583, and thereby establishing the desired thickness of the glue film to be applied to the advancing blanks by the glue applicator surfaces 550 and 552 of the glue applicator roll 541.

Glue is then supplied to the V-shaped pocket defined between the glue transfer rolls 561 and 562, and the secondary motor unit 689 is switched into operation to continuously drive the glue applicator rolls 561 and 562 to prevent glue hardening on the surfaces thereof. The valve which controls the supply of compressed air to the solenoid operated valve 610 is turned on to supply the necessary compressed air to support the piston head 618 in the air cylinder 617, which compressed air serves to maintain the glue transfer roll 561 in its lower operative position when blanks are advanced into residence position at the gluing station.

The valve which controls the source of suction supplied to the suction control valve 765, may be turned on after the cam member 773 which controls the operation of the valve 765 has been suitably oriented and adjusted. Suction is thus provided for the suction blocks 701 and 702 associated with the arcuate blank feeding mechanism 690. The face cam 733 is also adjusted on the reduced end portion 727' of its driving shaft 727 so as to place the cam track 734 forming a part thereof in proper position to effect forward advance of the suction blocks 701 and 702 when each intermittently advancing blank has been advanced forwardly by the glue applicator roll 541 to residence position at the blank feeding station.

When suitable adjustments have been made, the connecting pin 326, as shown in Fig. 37, is pushed inwardly into driving engagement with the continuously driven worm gear 316, which is continuously driven from main drive shaft section 19'. The arcuate blank processing division is then placed in operation and thenceforth requires little or no further attention from the operator, and proceeds to automatically advance predetermined sectional lengths of the stock sheet, to cut the blanks from the intermittently advanced sections of the stock sheet, to strip the blanks from the stock sheet, to intermittently advance the successive blanks to gluing position, to precisely apply the adhesive patch $t$ and the adhesive strip $t''$ to only a predetermined area of each advancing blank, and to feed the successive glued blanks into engagement with the winding mechanism of the associated container body forming machine in correlated synchronism with the operation thereof.

When the stock sheet roll has been used up, the primary drive may be temporarily disconnected by an outward pull exerted on the connecting pin 326. A second stock roll can then be placed in position on its supporting cradle and the lead end thereof inserted between the stock pinch rolls 333 and 334, through the slot 362 in the end plate 308, between the advancing discs 365 and associated friction wheels 374, and the lead end of the stock sheet placed on the anvil plate 382. The connecting pin 326 can then be manipulated to put the primary drive into operation, and blank preparation and processing then continued.

The rectangular blank processing division may be driven in synchronism with the arcuate blank processing division so as to automatically prepare and feed adhesively connected paired blanks into the winding mechanism of the container body forming machine. Both divisions of the blank preparing machine may be operatively connected to the main drive of the container body forming machine, and thus driven in synchronism therewith, and in the proper correlated speed ratio with the ability of the container body forming machine to wind and produce the container bodies. Production output in excess of thirty container bodies per minute may be readily attained.

Blank preparing machine divisions constructed in accordance with this invention, require very little attention by the operator during production operations, have the ability to produce printed and glued blanks with remarkable uniformity, and are substantially foolproof and automatic in operation. This machine is remarkably adapted for the automatic preparation and processing of container forming blanks of difficult shape, such as container blanks which closely simulate the shape of glass bottles. This blank preparing machine, when operatively connected to the main drive and thus driven in synchronism with the container making machine divisions disclosed in our copending applications Ser. Nos. 85,781 and 85,782, filed April 6, 1949, and in proper correlated speed ratio with the ability of the latter divisions to wind and produce container bodies, provides a composite machine which has the ability to produce finished containers from stock sheet rolls supplied thereto economically, at high production speeds, substantially automatically and can be maintained in continuous production with reliability of output assured.

This improved blank preparing machine is compactly designed, and when operatively associated with the divisions of our container making machine as disclosed in our copending applications identified above, provides a composite container production assembly which occupies a minimum floor space, and whose operating parts are readily accessible for adjustment and repair. The divisions of the composite machine as thus assembled in operating synchronism, may be constructed at a cost which makes its use economical and feasible for processors and product manufacturers, permitting containers to be constructed on the premises, ready to receive the product contents, from strip rolls of stock sheet. Containers can thus be manufactured and made by the product processor as conveniently needed for packaging purposes, thereby most effectively serving his production needs, and effecting substantial savings in transportation and storage of empty bulk containers, as otherwise supplied.

While certain novel features of the invention have been disclosed herein, and are pointed out in the claims, it will be understood that various omissions, substitutions, modifications and changes may be made by those skilled in the art without departing from the principles of this invention.

What is claimed is:

1. An improved machine for preparing and feeding paired container forming blanks to a container body winding machine including in combination, two adjacently arranged, synchronously operated machine divisions each having mechanism for intermittently advancing successive sections of a related stock sheet to a cutting station, means associated with the advancing means of one of said divisions to form crimps along one longitudinal edge of the related stock sheet and extending parallel to the direction of advancement of the latter to the related cutting station, mechanism at the cutting station of said one division for transversely cutting the sections of the stock sheet intermittently advanced thereto to form successive rectangular container forming blanks having said crimps at one end thereof, mechanism at the cutting station of the other of said divisions for cutting successive arcuate container forming blanks from sections of the related stock sheet advanced thereto and having substantially concentric inner and outer arcuate side edges, mechanism associated with said one division for intermittently advancing the rectangular cut blanks to a gluing station with said crimps in trailing position and extending at right angles to the direction of advancement of the rectangular cut blanks to the related gluing station, mechanism associated with said other division for intermittently advancing the arcuate cut blanks to a gluing station with the trailing end edge of each arcuate cut blank parallel to the direction of advancement of the latter toward the related gluing station and for forming crimps along the trailing end edge thereof and extending parallel to said direction of advancement of the arcuate cut blank to the related gluing station, mechanism at the gluing station of each division for applying adhesive to a predetermined area only of one surface of each of the intermittently advanced cut blanks, and mechanism associated with each division for correlating the blanks as processed in each division into paired arrangement with the leading portion of the outer arcuate edge of each arcuate cut blank and the leading portion of a side edge of the respective rectangular cut blank overlapped and for intermittently feeding the correlated blanks into position for winding into two piece container bodies by the container body winding machine.

2. An improved machine for preparing and feeding paired container forming blanks to a container body winding machine including in combination, two adjacently arranged, synchronously operated machine divisions, mechanism associated with one of said divisions for intermittently advancing successive sections of a stock sheet to a cutting station, mechanism at said cutting station for transversely cutting said stock sheet sections into successive rectangular cut blanks, mechanism associated with said one division for intermittently advancing said rectangular cut blanks to a gluing station along a path of travel at right angles to the direction of advancement of the stock sheet to said cutting station, means at said gluing station for applying adhesive to a predetermined area only of the intermittently advanced rectangular cut blanks, mechanism associated with the other of said divisions for intermittently advancing successive sections of a stock sheet to a cutting station along a path of travel disposed obtusely relative to said path of travel of said rectangular cut blanks and in a direction generally opposed to the direction of movement of the latter, mechanism at the last mentioned cutting station for cutting successive arcuate cut blanks from the last mentioned stock sheet and having substantially concentric inner and outer arcuate side edges extending transversely of said sheet and straight end edges converging in the direction opposed to the direction of advancement of the stock sheet to the cutting station of said other division, mechanism associated with said other division for intermittently advancing said arcuate cut blanks to a gluing station along a path of travel parallel to the trailing end edges of the arcuate cut blanks and converging acutely toward said path of travel of said rectangular cut blanks, means at the last mentioned gluing station for applying adhesive to a predetermined area only of the intermittently advanced arcuate cut blanks, and mechanism associated with each division feeding said cut blanks from the respective gluing stations and along continuations of their respective paths of travel for correlating the blanks as processed in each division into paired arrangement with the leading portion of the outer arcuate edge of each arcuate cut blank and the leading portion of the adjacent side edge of the related rectangular cut blank overlapped and for intermittently feeding the paired blanks into position for winding into two piece container bodies by the container body winding machine.

3. An improved machine for preparing and feeding paired container forming blanks to a container body winding machine according to claim 2, wherein the first mentioned adhesive applying means successively applies adhesive to substantially the trailing half of the upper surface of said rectangular cut blanks and the last mentioned adhesive applying means successively applies adhesive to substantially the trailing half and along the entire outer arcuate edge portion of the upper surface of said arcuate cut blanks, and wherein said mechanism correlating the blanks as processed in each division arranges said rectangular and arcuate cut blanks in pairs with the leading portion of the outer arcuate edge of each of the latter underlying the leading portion of the adjacent side edge of the related rectangular cut blank.

4. In combination with a container body winding machine including a rotatable mandrel for positioning at a winding station and formed with contiguous cylindrical and frusto-conical portions, and pressure rolls engaging against the surfaces of said portions; an improved machine for preparing and feeding paired container forming blanks to said mandrel of the container body winding machine comprising two adjacently arranged, synchronously operated machine divisions each having mechanism for intermittently advancing successive sections of a related stock sheet to a cutting station, said advancing mechanism of one of said divisions effecting advancement of the related stock sheet to the corresponding cutting station along a direction parallel to the axis of the mandrel at the winding station and said advancing mechanism of the other of said divisions effecting advancement of the related stock sheet to the corresponding cutting station along a direction which converges at an obtuse angle with respect to said direction of advancement of the stock sheet in said one machine division and is generally away from said winding station, mechanism at the cutting station of said one division for cutting successive rectangular container forming blanks from sections of the stock sheet advanced intermittently thereto, mechanism at the cutting station of the other of said divisions for cutting successive arcuate container forming blanks having substantially concentric inner and outer arcuate side edges and radial, converging opposite end edges from sections of the sheet stock advanced intermittently thereto, mechanism in said one division for intermittently advancing the successive rectangular cut blanks to a gluing station along a path of travel directed towards said winding station and at right angles to said direction of advancement of the related stock sheet to the corresponding cutting station, mechanism in said other division for intermittently advancing the successive arcuate cut blanks towards said winding station and along a path of travel parallel to the trailing end edges of the successive arcuate cut blanks and converging toward said path of travel of the rectangular cut blanks, mechanism at the gluing station of each division for applying adhesive to a predetermined area only of one surface of each of the intermittently advanced cut blanks, and mechanism associated with each division feeding said arcuate cut blanks and said rectangular cut blanks from the respective gluing stations to a winding station at said mandrel and along converging paths of travel which are continuations of the paths of travel of the respective blanks to the related gluing stations and are substantially normal to the surfaces of said frusto-conical portion and said cylindrical portion respectively and for correlating said rectangular and arcuate cut blanks in paired arrangement at said winding station with the leading portion of the outer arcuate side edge of each of the latter and the leading portion of the adjacent side edge of the related rectangular cut blank overlapped.

5. The combination according to claim 4, wherein said mechanism at the gluing station of said one division applies adhesive to substantially the trailing half of the upper surface of each of the rectangular cut blanks and said mechanism at the gluing station of said other division applies adhesive to substantially the trailing half and along the entire outer arcuate edge portion of the top surface of each of the arcuate cut blanks, and wherein said mechanism feeding the cut blanks to a winding station correlates said blanks in paired arrangements with the leading portion of the outer arcuate edge of each of said arcuate cut blanks underlying the leading portion of the adjacent side edge of the related rectangular cut blank.

6. The combination according to claim 4; including means associated with said mechanism advancing successive sections of the related stock sheet to the cutting station of said one machine division operative to form crimps along one longitudinal edge of said related stock sheet and extending parallel to said direction of advancement of the related stock sheet to the corresponding cutting station so that each rectangular container forming blank is provided with crimps extending across an end portion thereof.

7. The combinatoin according to claim 4; including means associated with the mechanism of said other division intermittently advancing the cut arcuate blanks to the gluing station thereof operative to form crimps in the trailing end edge portion of each of the arcuate blanks and extending parallel to said path of travel of the arcuate cut blanks to the related gluing station.

8. The combination according to claim 7; including means associated with said mechanism advancing successive sections of the related stock sheet to the cutting station of said one machine division operative to form crimps along one longitudinal edge of said related stock sheet and extending parallel to said direction of advancement of the related stock sheet to the corresponding cutting station so that each rectangular container forming blank is provided with crimps extending across an end portion thereof.

9. The combination according to claim 4; including mechanism in said other machine division operative to strip the successive cut arcuate blanks from the related stock sheet.

10. An improved machine for preparing and feeding paired container forming blanks to a container body winding machine according to claim 2; including means associated with the mechanism advancing successive sections of a stock sheet to the cutting station of said one division operative to form crimps longitudinally along the side edge portion of said stock sheet remote from said winding station so that each rectangular cut blank is provided with a crimped trailing end edge portion.

11. An improved machine for preparing and feeding paired container forming blanks to a container body winding machine according to claim 2; further comprising means associated with said mechanism advancing the arcuate cut blanks to the related gluing station operative to form crimps along the trailing end edge of each arcuate blank and extending parallel to said path of travel of said arcuate cut blanks during advancement of the latter to the gluing station.

12. An improved machine for preparing and feeding paired container forming blanks to a container body winding machine according to claim 11; including means associated with the mechanism advancing successive sections of a stock sheet to the cutting station of said one division operative to form crimps longitudinally along the side edge portion of said stock sheet remote from said winding station so that each rectangular cut blank is provided with a crimped trailing end edge portion.

13. An improved machine for preparing and feeding paired container forming blanks to a container body winding machine according to claim 2; including means associated with said other machine division operative to strip successive arcuate cut blanks from the stock sheet from which said blanks are cut.

14. An improved machine for preparing and feeding paired container forming blanks to a container body winding machine according to claim 13; wherein the last mentioned means includes two cooperating stripper plates disposed at a stripping station adjacent said cutting station of said other division, one of said plates having a stripping opening whose edge contour substantially conforms to the edge contours of the successive arcuate blanks and the other of said stripper plates having an area substantially conforming to the areas of the successive arcuate blanks to be stripped, mechanism for advancing each successive cut section of the stock sheet from the cutting station to said stripping station for registration of the cut arcuate blank with said stripper plates, and means for manipulating one of said stripper plates to a position in which the stripper plates are co-planar when a cut arcuate blank is registered with the stripper plates.

References Cited in the file of this patent

UNITED STATES PATENTS

| Number | Name | Date |
|---|---|---|
| 417,830 | Mergoninsky | Dec. 24, 1889 |
| 656,355 | Jacobs | Aug. 21, 1900 |
| 700,807 | Palmer | May 27, 1902 |
| 1,107,348 | Powers | Aug. 18, 1914 |
| 1,303,680 | Kent | May 13, 1919 |
| 1,489,691 | Barbieri | Apr. 8, 1924 |
| 1,668,258 | Adsit | May 1, 1928 |
| 1,702,602 | Gerritson | Feb. 19, 1929 |
| 1,742,967 | Patterson | Jan. 7, 1930 |
| 1,833,557 | Bergstein | Nov. 24, 1931 |
| 1,836,837 | Claff | Dec. 15, 1931 |
| 1,942,988 | Taylor | Jan. 9, 1934 |
| 1,962,199 | Koch | June 12, 1934 |
| 2,000,325 | Ford | May 7, 1935 |
| 2,001,177 | Bodor | May 14, 1935 |
| 2,016,462 | Stokes | Oct. 8, 1935 |
| 2,066,130 | Von Hofe | Dec. 29, 1936 |
| 2,110,478 | Wood | Mar. 8, 1938 |
| 2,219,682 | Doble | Oct. 29, 1940 |
| 2,247,766 | Boerger | July 1, 1941 |
| 2,288,720 | Knowlton | July 7, 1942 |
| 2,383,797 | Hilliard | Aug. 28, 1945 |
| 2,406,470 | Maxim | Aug. 27, 1946 |